(12) United States Patent
Dietz

(10) Patent No.: US 10,662,394 B2
(45) Date of Patent: May 26, 2020

(54) AQUEOUS EXTRACTION PROCESS FOR THE RECOVERY OF MUCILAGE AND DEMULSIFICATION

(71) Applicant: Drei Lilien PVG GmbH & Co. KG, Wiesbaden (DE)

(72) Inventor: Max Dietz, Wiesbaden (DE)

(73) Assignee: Drei Lilien PVG GmbH & Co. KG, Wiesbaden (DE)

( * ) Notice: Subject to any disclaimer, the term of this patent is extended or adjusted under 35 U.S.C. 154(b) by 0 days.

(21) Appl. No.: 16/308,561

(22) PCT Filed: Jun. 12, 2017

(86) PCT No.: PCT/EP2017/064327
§ 371 (c)(1),
(2) Date: Dec. 10, 2018

(87) PCT Pub. No.: WO2017/212076
PCT Pub. Date: Dec. 14, 2017

(65) Prior Publication Data
US 2019/0153353 A1 May 23, 2019

(30) Foreign Application Priority Data
Jun. 10, 2016 (DE) .......................... 10 2016 007 351

(51) Int. Cl.
*C11B 3/00* (2006.01)
*C11B 1/04* (2006.01)
(Continued)

(52) U.S. Cl.
CPC ................ *C11B 3/006* (2013.01); *C11B 1/04* (2013.01); *C11B 1/10* (2013.01); *C11B 3/008* (2013.01);
(Continued)

(58) Field of Classification Search
CPC ... C11B 3/006; C11B 1/04; C11B 1/10; C11B 3/008; C11B 3/02; C11B 3/04; C11B 3/06; B01D 17/045
(Continued)

(56) References Cited

U.S. PATENT DOCUMENTS 9,932,540 B2 * 4/2018 Dietz ........................ A23D 9/04
10,239,906 B2 * 3/2019 Dietz ........................ C07H 1/06
(Continued)

FOREIGN PATENT DOCUMENTS

EP          0612548 A1 * 8/1994 ........... B01D 17/047
WO     2015185516       10/2015
(Continued)

OTHER PUBLICATIONS

US-10239906-B2 English equivalent of 2015-78147Y (WO 2015-185675).*
US-9932540-B2 English equivalent of 2015-76460V (WO 2015-181341).*
(Continued)

*Primary Examiner* — Deborah D Carr
(74) *Attorney, Agent, or Firm* — Amin, Turocy & Watson, LLP

(57) ABSTRACT

The present invention relates to a method of admixing a volume of water in which acid- or base-forming compounds are contained and whose volume fraction is >5% by volume in the ratio to be purified lipid phase and/or in a volume ratio that allows the formation of a water phase in order to separate hydratable mucilage from a lipid phase, to purify a lipid phase and/or to obtain the hydratable mucilages.

15 Claims, 5 Drawing Sheets

(51) Int. Cl.
 *C11B 3/04* (2006.01)
 *C11B 3/06* (2006.01)
 *C11B 3/02* (2006.01)
 *C11B 1/10* (2006.01)
 *B01D 17/04* (2006.01)

(52) U.S. Cl.
 CPC ............ *C11B 3/02* (2013.01); *C11B 3/04* (2013.01); *C11B 3/06* (2013.01); *B01D 17/045* (2013.01)

(58) Field of Classification Search
 USPC ........................................ 544/206
 See application file for complete search history.

(56) References Cited

U.S. PATENT DOCUMENTS

| 2017/0121360 A1 | 5/2017 | Dietz et al. |
| 2017/0135363 A1 | 5/2017 | Dietz et al. |

FOREIGN PATENT DOCUMENTS

| WO | WO2015181341 A1 | * | 12/2015 | |
| WO | WO-2015185516 | * | 12/2015 | ........... B01D 17/047 |
| WO | WO2015185675 A1 | * | 12/2015 | |

OTHER PUBLICATIONS

International Search Report and Written Opinion for International Patent Application No. PCT/EP2017/064327 dated Aug. 22, 2017, 15 pages.

* cited by examiner

Fig. 1

Table 1a

| | Concentration (wt%) | Water volume addition ratio W:O (% v:v) | Temperature reaction mixture (°C) | Time until phase separation (min) | Residual content of water (wt%) | | | | DW mucilage phase (g) | | | |
|---|---|---|---|---|---|---|---|---|---|---|---|---|
| time/compound | | | | | 1 h | 2 h | 3 h | 4 h | 1 h | 2 h | 3 h | 4 h |
| Na-Carbonate | 10 | 5 | 25 | -- | 4,8 | 4,5 | 4,1 | 4 | 0,5 | 0,5 | 0,7 | 0,9 |
| Na-Carbonate | 10 | 10 | 25 | -- | 3,9 | 3,5 | 3 | 2,8 | 0,8 | 0,8 | 1 | 1,1 |
| Na-Carbonate | 10 | 15 | 25 | 40 | 3,3 | 2,9 | 2,6 | 2,3 | 1 | 1,1 | 1,3 | 1,5 |
| Na-Carbonate | 10 | 20 | 25 | 25 | 1,9 | 1,3 | 0,8 | 0,6 | 1,8 | 2,5 | 3,7 | 4 |
| Na-Carbonate | 10 | 25 | 25 | 10 | 1,1 | 0,8 | 0,6 | 0,4 | 2,2 | 3,5 | 3,9 | 4,5 |
| Na-Carbonate | 10 | 30 | 25 | 5 | 0,7 | 0,5 | 0,4 | 0,3 | 3,8 | 4,5 | 4,9 | 5 |
| Na-Carbonate | 10 | 35 | 25 | 1 | 0,6 | 0,6 | 0,4 | 0,3 | 3,8 | 4,5 | 5,2 | 5,3 |
| Na-Carbonate | 20 | 5 | 25 | -- | 4,8 | 4,7 | 4,5 | 4,2 | 0,4 | 0,4 | 0,6 | 0,7 |
| Na-Carbonate | 20 | 10 | 25 | -- | 4,3 | 4 | 3,8 | 3,5 | 0,6 | 0,9 | 1,2 | 1,3 |
| Na-Carbonate | 20 | 15 | 25 | 50 | 3,8 | 3,1 | 2,7 | 2,4 | 1,3 | 1,9 | 2,5 | 3 |
| Na-Carbonate | 20 | 20 | 25 | 35 | 2 | 1,5 | 1 | 0,9 | 1,9 | 2,6 | 4 | 4,5 |
| Na-Carbonate | 20 | 25 | 25 | 10 | 1,1 | 0,8 | 0,7 | 0,5 | 2,5 | 3,6 | 4 | 4,4 |
| Na-Carbonate | 20 | 30 | 25 | 5 | 0,7 | 0,6 | 0,4 | 0,4 | 2,4 | 3,5 | 4,2 | 4,6 |
| Na-Carbonate | 20 | 35 | 25 | 1 | 0,7 | 0,5 | 0,4 | 0,3 | 3,6 | 4,6 | 4,8 | 5,3 |
| Na-Carbonate | 10 | 5 | 40 | -- | 2,9 | 2,2 | 1,8 | 1,7 | 0,9 | 1,3 | 1,9 | 2,2 |
| Na-Carbonate | 10 | 10 | 40 | 40 | 2,1 | 1,8 | 1,5 | 1,3 | 1,2 | 2 | 2,3 | 2,6 |
| Na-Carbonate | 10 | 15 | 40 | 20 | 1,6 | 1,2 | 0,9 | 0,8 | 1 | 1,1 | 1,3 | 1,5 |
| Na-Carbonate | 10 | 20 | 40 | 10 | 1 | 0,8 | 0,6 | 0,6 | 2,2 | 3,4 | 3,7 | 4,2 |
| Na-Carbonate | 10 | 25 | 40 | 5 | 0,6 | 0,5 | 0,5 | 0,4 | 2,6 | 3,6 | 4 | 4,6 |
| Na-Carbonate | 10 | 30 | 40 | 1 | 0,7 | 0,5 | 0,4 | 0,3 | 3,9 | 4,4 | 4,8 | 5,1 |
| Na-Carbonate | 10 | 35 | 40 | 1 | 0,5 | 0,5 | 0,4 | 0,4 | 4 | 4,6 | 4,8 | 5,6 |
| Na-Carbonate | 20 | 5 | 40 | -- | 3,5 | 3 | 2,8 | 2,4 | 0,6 | 0,8 | 1,1 | 1,5 |
| Na-Carbonate | 20 | 10 | 40 | 50 | 3,1 | 2,9 | 2,6 | 2,6 | 0,9 | 1,3 | 2,2 | 2,9 |
| Na-Carbonate | 20 | 15 | 40 | 40 | 2,7 | 2,1 | 1,8 | 1,3 | 1,4 | 2,2 | 2,5 | 2,9 |
| Na-Carbonate | 20 | 20 | 40 | 20 | 1,8 | 1,2 | 0,9 | 0,7 | 2 | 2,5 | 3,9 | 4,4 |
| Na-Carbonate | 20 | 25 | 40 | 10 | 1,1 | 0,7 | 0,5 | 0,4 | 2,6 | 3,8 | 4,2 | 4,8 |
| Na-Carbonate | 20 | 30 | 40 | 5 | 0,6 | 0,6 | 0,4 | 0,5 | 2,8 | 3,7 | 4,1 | 4,6 |
| Na-Carbonate | 20 | 35 | 40 | 1 | 0,6 | 0,4 | 0,5 | 0,4 | 3,9 | 4,5 | 4,9 | 5,4 |
| Na-Carbonate | 10 | 5 | 60 | 30 | 1,5 | 1,2 | 0,9 | 0,8 | 1,3 | 2,5 | 2,9 | 3,2 |
| Na-Carbonate | 10 | 10 | 60 | 10 | 1 | 0,8 | 0,7 | 0,7 | 1,8 | 2,6 | 3 | 3,6 |
| Na-Carbonate | 10 | 15 | 60 | 10 | 0,8 | 0,7 | 0,6 | 0,6 | 2,5 | 3,3 | 4 | 4,5 |
| Na-Carbonate | 10 | 20 | 60 | 5 | 0,6 | 0,5 | 0,4 | 0,4 | 3,3 | 4,1 | 4,8 | 5,2 |
| Na-Carbonate | 10 | 25 | 60 | 1 | 0,6 | 0,5 | 0,5 | 0,4 | 4,1 | 4,5 | 5,2 | 5,8 |
| Na-Carbonate | 10 | 30 | 60 | 1 | 0,4 | 0,3 | 0,3 | 0,2 | 4,1 | 4,4 | 5,3 | 5,7 |
| Na-Carbonate | 10 | 35 | 60 | 1 | 0,4 | 0,3 | 0,4 | 0,3 | 4,2 | 5,7 | 5,4 | 5,8 |
| Na-Carbonate | 20 | 5 | 60 | 30 | 1,8 | 1,1 | 0,9 | 0,8 | 1,7 | 2,8 | 3,1 | 3,6 |
| Na-Carbonate | 20 | 10 | 60 | 15 | 3,3 | 2,9 | 2,5 | 2,4 | 2,4 | 3,2 | 3,8 | 4,4 |
| Na-Carbonate | 20 | 15 | 60 | 10 | 2,4 | 1,9 | 1,6 | 1 | 3,4 | 4,1 | 4,7 | 5,5 |
| Na-Carbonate | 20 | 20 | 60 | 5 | 0,9 | 0,7 | 0,5 | 0,5 | 4,2 | 4,8 | 5,5 | 5,8 |
| Na-Carbonate | 20 | 25 | 60 | 1 | 0,6 | 0,5 | 0,4 | 0,3 | 4,3 | 4,5 | 5,2 | 5,8 |
| Na-Carbonate | 20 | 30 | 60 | 1 | 0,5 | 0,5 | 0,4 | 0,3 | 4,4 | 5,6 | 5,5 | 5,8 |
| Na-Carbonate | 20 | 35 | 60 | 1 | 0,5 | 0,4 | 0,3 | 0,3 | 4,4 | 4,8 | 4,8 | 5,7 |
| Na-Carbonate | 10 | 5 | 80 | 20 | 1,1 | 0,9 | 0,6 | 0,6 | 2,5 | 3,2 | 3,5 | 3,8 |
| Na-Carbonate | 10 | 10 | 80 | 10 | 0,8 | 0,6 | 0,5 | 0,5 | 2,9 | 3,4 | 3,8 | 4,2 |
| Na-Carbonate | 10 | 15 | 80 | 5 | 0,5 | 0,4 | 0,3 | 0,3 | 3,4 | 3,9 | 4,5 | 5,1 |
| Na-Carbonate | 10 | 20 | 80 | 1 | 0,4 | 0,4 | 0,3 | 0,2 | 4,3 | 4,8 | 5,2 | 5,6 |
| Na-Carbonate | 10 | 25 | 80 | 1 | 0,4 | 0,3 | 0,3 | 0,3 | 4,5 | 5 | 5,1 | 5,8 |
| Na-Carbonate | 10 | 30 | 80 | 1 | 0,4 | 0,3 | 0,2 | 0,2 | 4,6 | 4,8 | 5,5 | 5,9 |
| Na-Carbonate | 10 | 35 | 80 | 1 | 0,3 | 0,3 | 0,2 | 0,3 | 4,6 | 5,4 | 5,9 | 5,9 |
| Na-Carbonate | 20 | 5 | 80 | 20 | 1 | 0,8 | 0,5 | 0,5 | 2,6 | 3,3 | 3,6 | 3,7 |
| Na-Carbonate | 20 | 10 | 80 | 10 | 0,9 | 0,7 | 0,5 | 0,4 | 3,1 | 3,5 | 4 | 4,1 |
| Na-Carbonate | 20 | 15 | 80 | 5 | 0,6 | 0,5 | 0,3 | 0,3 | 3,5 | 3,8 | 4,6 | 5,2 |
| Na-Carbonate | 20 | 20 | 80 | 1 | 0,5 | 0,4 | 0,3 | 0,3 | 4,4 | 4,8 | 5,3 | 5,5 |
| Na-Carbonate | 20 | 25 | 80 | 1 | 0,4 | 0,3 | 0,2 | 0,2 | 4,5 | 5,1 | 5,2 | 5,6 |
| Na-Carbonate | 20 | 30 | 80 | 1 | 0,4 | 0,4 | 0,2 | 0,3 | 4,7 | 5 | 5,6 | 5,8 |
| Na-Carbonate | 20 | 35 | 80 | 1 | 0,3 | 0,2 | 0,3 | 0,2 | 4,6 | 5,2 | 5,7 | 5,9 | time until phase separation: -- = no visible phase separation after 60 minutes.
DW = dry weight of mucilage mass
h = hour

Fig. 2

Table 1b

| | Concen-tration (wt%) | Water volume addition ratio W:O (% v:v) | Temperature reaction mixture (°C) | Time until phase separation (min) | Residual content of water (wt%) | | | | DW mucilage phase (g) | | | |
|---|---|---|---|---|---|---|---|---|---|---|---|---|
| time/compound | | | | | 1 h | 2 h | 3 h | 4 h | 1 h | 2 h | 3 h | 4 h |
| Na-Metasilicate | 10 | 5 | 25 | -- | 4,8 | 4,6 | 4,2 | 3,9 | 0,4 | 0,5 | 0,8 | 0,9 |
| Na-Metasilicate | 10 | 10 | 25 | -- | 4,5 | 4 | 3,7 | 3,1 | 0,6 | 0,7 | 1 | 1 |
| Na-Metasilicate | 10 | 15 | 25 | 60 | 3,9 | 3,1 | 2,9 | 2,4 | 0,9 | 1,2 | 1,3 | 1,6 |
| Na-Metasilicate | 10 | 20 | 25 | 45 | 2,5 | 1,5 | 1 | 0,8 | 2 | 2,3 | 4 | 4,2 |
| Na-Metasilicate | 10 | 25 | 25 | 20 | 1,6 | 1,2 | 0,8 | 0,6 | 2,4 | 3,6 | 3,8 | 4,3 |
| Na-Metasilicate | 10 | 30 | 25 | 5 | 0,9 | 0,6 | 0,5 | 0,4 | 3,9 | 4,6 | 5 | 5,2 |
| Na-Metasilicate | 10 | 35 | 25 | 5 | 0,8 | 0,5 | 0,4 | 0,3 | 3,8 | 4,8 | 5,2 | 5,4 |
| Na-Metasilicate | 20 | 5 | 25 | -- | 4,9 | 4,7 | 4,4 | 4,1 | 0,4 | 0,6 | 0,6 | 0,8 |
| Na-Metasilicate | 20 | 10 | 25 | -- | 5,1 | 4,2 | 4 | 3,6 | 0,7 | 0,9 | 1,1 | 1,4 |
| Na-Metasilicate | 20 | 15 | 25 | 60 | 4,6 | 3,2 | 2,7 | 2,5 | 1,6 | 2 | 2,5 | 2,9 |
| Na-Metasilicate | 20 | 20 | 25 | 50 | 3,2 | 2,2 | 1,3 | 0,9 | 2 | 2,6 | 3,9 | 4,6 |
| Na-Metasilicate | 20 | 25 | 25 | 30 | 2,9 | 1 | 0,8 | 0,6 | 2,7 | 3,8 | 4,1 | 4,5 |
| Na-Metasilicate | 20 | 30 | 25 | 10 | 1,1 | 0,7 | 0,4 | 0,4 | 2,4 | 3,7 | 4,4 | 4,6 |
| Na-Metasilicate | 20 | 35 | 25 | 5 | 0,9 | 0,5 | 0,4 | 0,4 | 3,6 | 4,5 | 4,9 | 5,5 |
| Na-Metasilicate | 10 | 5 | 40 | -- | 3,9 | 2,5 | 2,1 | 2 | 1 | 1,3 | 2 | 2,3 |
| Na-Metasilicate | 10 | 10 | 40 | 50 | 3,3 | 2,1 | 1,8 | 1,4 | 1,2 | 1,9 | 2,2 | 2,4 |
| Na-Metasilicate | 10 | 15 | 40 | 30 | 2,2 | 1,6 | 1,1 | 0,8 | 1,9 | 2,1 | 2,9 | 3,3 |
| Na-Metasilicate | 10 | 20 | 40 | 20 | 1,5 | 0,9 | 0,7 | 0,6 | 2,2 | 3,3 | 3,8 | 4,3 |
| Na-Metasilicate | 10 | 25 | 40 | 10 | 0,9 | 0,7 | 0,6 | 0,5 | 2,8 | 3,8 | 4,1 | 4,6 |
| Na-Metasilicate | 10 | 30 | 40 | 5 | 0,6 | 0,5 | 0,5 | 0,4 | 3,9 | 4,5 | 5 | 5,2 |
| Na-Metasilicate | 10 | 35 | 40 | 5 | 0,5 | 0,5 | 0,4 | 0,4 | 4,1 | 4,8 | 5,1 | 5,6 |
| Na-Metasilicate | 20 | 5 | 40 | -- | 3,6 | 3,2 | 3 | 2,3 | 0,8 | 1,1 | 1,9 | 2,1 |
| Na-Metasilicate | 20 | 10 | 40 | 60 | 3,3 | 3 | 2,7 | 2,6 | 0,9 | 1,4 | 2,1 | 2,8 |
| Na-Metasilicate | 20 | 15 | 40 | 50 | 2,8 | 2,1 | 1,8 | 1,3 | 1,5 | 2,3 | 2,9 | 3,2 |
| Na-Metasilicate | 20 | 20 | 40 | 30 | 1,7 | 1,3 | 1 | 0,7 | 2 | 2,9 | 4,1 | 4,9 |
| Na-Metasilicate | 20 | 25 | 40 | 20 | 1,2 | 0,8 | 0,6 | 0,5 | 2,8 | 4,1 | 4,9 | 5,2 |
| Na-Metasilicate | 20 | 30 | 40 | 10 | 0,8 | 0,6 | 0,5 | 0,5 | 3,2 | 3,9 | 4,4 | 4,9 |
| Na-Metasilicate | 20 | 35 | 40 | 5 | 0,5 | 0,5 | 0,5 | 0,4 | 3,9 | 4,7 | 5,2 | 5,5 |
| Na-Metasilicate | 10 | 5 | 60 | 30 | 1,8 | 1,2 | 0,9 | 0,8 | 1,2 | 2,4 | 3,4 | 3,8 |
| Na-Metasilicate | 10 | 10 | 60 | 20 | 1,1 | 0,9 | 0,8 | 0,7 | 1,9 | 2,8 | 3,4 | 3,9 |
| Na-Metasilicate | 10 | 15 | 60 | 20 | 0,9 | 0,7 | 0,7 | 0,6 | 2,6 | 3,4 | 4 | 4,6 |
| Na-Metasilicate | 10 | 20 | 60 | 10 | 0,7 | 0,5 | 0,4 | 0,3 | 3,4 | 4,2 | 5,1 | 5,5 |
| Na-Metasilicate | 10 | 25 | 60 | 5 | 0,6 | 0,5 | 0,4 | 0,4 | 4,1 | 4,6 | 5,3 | 5,8 |
| Na-Metasilicate | 10 | 30 | 60 | 5 | 0,5 | 0,4 | 0,3 | 0,3 | 4,1 | 4,7 | 5,2 | 5,8 |
| Na-Metasilicate | 10 | 35 | 60 | 1 | 0,4 | 0,3 | 0,4 | 0,2 | 4,2 | 5,6 | 5,7 | 5,7 |
| Na-Metasilicate | 20 | 5 | 60 | 30 | 2,3 | 1,5 | 0,9 | 0,8 | 1,9 | 2,6 | 3,1 | 3,7 |
| Na-Metasilicate | 20 | 10 | 60 | 20 | 2,9 | 2,1 | 2,2 | 1,9 | 2,6 | 3,5 | 4,1 | 5 |
| Na-Metasilicate | 20 | 15 | 60 | 20 | 2,5 | 1,8 | 1,5 | 1,1 | 3,3 | 4 | 4,8 | 5,3 |
| Na-Metasilicate | 20 | 20 | 60 | 10 | 1,4 | 0,8 | 0,6 | 0,5 | 4,1 | 4,9 | 5,4 | 5,8 |
| Na-Metasilicate | 20 | 25 | 60 | 10 | 0,8 | 0,6 | 0,4 | 0,4 | 4,1 | 5,2 | 5,5 | 5,8 |
| Na-Metasilicate | 20 | 30 | 60 | 5 | 0,6 | 0,5 | 0,4 | 0,4 | 4,5 | 5,2 | 5,6 | 5,8 |
| Na-Metasilicate | 20 | 35 | 60 | 5 | 0,5 | 0,4 | 0,2 | 0,1 | 4,5 | 5,3 | 5,5 | 5,7 |
| Na-Metasilicate | 10 | 5 | 80 | 20 | 1,2 | 0,8 | 0,6 | 0,6 | 2,4 | 3,3 | 3,9 | 4,1 |
| Na-Metasilicate | 10 | 10 | 80 | 10 | 1 | 0,6 | 0,5 | 0,5 | 2,9 | 3,5 | 4 | 4,4 |
| Na-Metasilicate | 10 | 15 | 80 | 10 | 0,7 | 0,5 | 0,4 | 0,3 | 3,3 | 4 | 4,4 | 5,1 |
| Na-Metasilicate | 10 | 20 | 80 | 5 | 0,5 | 0,4 | 0,3 | 0,2 | 4,3 | 5 | 5,4 | 5,6 |
| Na-Metasilicate | 10 | 25 | 80 | 5 | 0,4 | 0,3 | 0,3 | 0,2 | 4,4 | 5,2 | 5,6 | 5,8 |
| Na-Metasilicate | 10 | 30 | 80 | 1 | 0,4 | 0,3 | 0,2 | 0,2 | 4,6 | 5,5 | 5,7 | 5,9 |
| Na-Metasilicate | 10 | 35 | 80 | 1 | 0,3 | 0,3 | 0,2 | 0,1 | 4,8 | 5,6 | 5,9 | 5,9 |
| Na-Metasilicate | 20 | 5 | 80 | 30 | 0,9 | 0,7 | 0,5 | 0,4 | 2,4 | 3 | 3,4 | 3,6 |
| Na-Metasilicate | 20 | 10 | 80 | 20 | 0,8 | 0,7 | 0,4 | 0,4 | 2,9 | 3,4 | 4,1 | 4,8 |
| Na-Metasilicate | 20 | 15 | 80 | 10 | 0,8 | 0,5 | 0,3 | 0,2 | 3,5 | 4,1 | 4,9 | 5,4 |
| Na-Metasilicate | 20 | 20 | 80 | 10 | 0,6 | 0,4 | 0,3 | 0,3 | 4,5 | 5,2 | 5,7 | 5,9 |
| Na-Metasilicate | 20 | 25 | 80 | 5 | 0,4 | 0,3 | 0,2 | 0,2 | 4,5 | 5,6 | 5,6 | 5,9 |
| Na-Metasilicate | 20 | 30 | 80 | 5 | 0,4 | 0,3 | 0,2 | 0,3 | 4,8 | 5,5 | 5,6 | 5,9 |
| Na-Metasilicate | 20 | 35 | 80 | 1 | 0,3 | 0,2 | 0,2 | 0,1 | 5 | 5,6 | 5,9 | 5,9 | time until phase separation: -- = no visible phase separation after 60 minutes
DW = dry weight of mucilage mass
h = hour

Fig. 3

Table 2

| Experiment No. | Type of admixing procedure | Compound | Concentration (wt%/mol/l) | Temperature of reaction mixture (°C) | Water volume addition ratio W:O (% v:v) |
|---|---|---|---|---|---|
| V-I.2.a | propeller mixer | Citric acid | 8,4 | 25 | 20 |
| V-I.2.a | propeller mixer | Citric acid | 8,4 | 40 | 10 |
| V-I.2.a | propeller mixer | Citric acid | 8,4 | 60 | 5 |
| V-II.2.a | intensive mixer | Citric acid | 8,4 | 25 | 30 |
| V-II.2.a | intensive mixer | Citric acid | 8,4 | 40 | 25 |
| V-II.2.a | intensive mixer | Citric acid | 8,4 | 60 | 10 |
| V-I.2.a | propeller mixer | Na-Carbonate | 10 | 25 | 25 |
| V-I.2.a | propeller mixer | Na-Carbonate | 10 | 40 | 15 |
| V-I.2.a | propeller mixer | Na-Carbonate | 10 | 60 | 10 |
| V-I.2.a | propeller mixer | Na-Carbonate | 20 | 25 | 30 |
| V-I.2.a | propeller mixer | Na-Carbonate | 20 | 40 | 25 |
| V-I.2.a | propeller mixer | Na-Carbonate | 20 | 60 | 15 |
| V-II.2.a | intensive mixer | Na-Carbonate | 10 | 25 | 35 |
| V-II.2.a | intensive mixer | Na-Carbonate | 10 | 40 | 25 |
| V-II.2.a | intensive mixer | Na-Carbonate | 10 | 60 | 20 |
| V-II.2.a | intensive mixer | Na-Carbonate | 20 | 25 | 40 |
| V-II.2.a | intensive mixer | Na-Carbonate | 20 | 40 | 35 |
| V-II.2.a | intensive mixer | Na-Carbonate | 20 | 60 | 25 |
| V-I.2.a | propeller mixer | Arginine | 0,3 | 25 | 30 |
| V-I.2.a | propeller mixer | Arginine | 0,3 | 40 | 20 |
| V-I.2.a | propeller mixer | Arginine | 0,3 | 60 | 10 |
| V-II.2.a | intensive mixer | Arginine | 0,3 | 25 | 35 |
| V-II.2.a | intensive mixer | Arginine | 0,3 | 40 | 15 |
| V-II.2.a | intensive mixer | Arginine | 0,3 | 60 | 5 |
| I.3.a | propeller mixer | Na-Carbonate | 10 | 25 | 30 |
| I.3.a | propeller mixer | Na-Carbonate | 10 | 40 | 25 |
| I.3.a | propeller mixer | Na-Carbonate | 10 | 60 | 15 |
| II.3.a | intensive mixer | Na-Carbonate | 10 | 25 | 45 |
| II.3.a | intensive mixer | Na-Carbonate | 10 | 40 | 35 |
| II.3.a | intensive mixer | Na-Carbonate | 10 | 60 | 20 |
| I.3.a | propeller mixer | Na-Metasilicate | 15 | 25 | 20 |
| I.3.a | propeller mixer | Na-Metasilicate | 15 | 40 | 10 |
| I.3.a | propeller mixer | Na-Metasilicate | 15 | 60 | 5 |
| II.3.a | intensive mixer | Na-Metasilicate | 15 | 25 | 25 |
| II.3.a | intensive mixer | Na-Metasilicate | 15 | 40 | 10 |
| II.3.a | intensive mixer | Na-Metasilicate | 15 | 60 | 10 |
| I.3.a | propeller mixer | Arginine | 0,3 | 25 | 20 |
| I.3.a | propeller mixer | Arginine | 0,3 | 40 | 10 |
| I.3.a | propeller mixer | Arginine | 0,3 | 60 | 5 |
| II.3.a | intensive mixer | Arginine | 0,3 | 25 | 25 |
| II.3.a | intensive mixer | Arginine | 0,3 | 40 | 10 |
| II.3.a | intensive mixer | Arginine | 0,3 | 60 | 10 |

Fig. 4

Table 3

| Experiment V1 secondary experiment | Water volume addition ratio W:O (% v:v) | Content of water in oil phase (wt%) before sep. | Content of water in oil phase (wt%) after sep. | Content of oil in water phase (wt%) | Experiment V2 secondary experiment | Water volume addition ratio W:O (% v:v) | Content of water in oil phase (wt%) before sep. | Content of water in oil phase (wt%) after sep. | Content of oil in water phase (wt%) |
|---|---|---|---|---|---|---|---|---|---|
| 1 | 2,5 | 2,1 | 1,2 | 15,2 | 1 | 2,5 | 2,4 | 2 | 21,3 |
| 1 | 5 | 3,2 | 1,6 | 10,1 | 1 | 5 | 4,2 | 2,4 | 16,2 |
| 1 | 7,5 | 3,5 | 1,3 | 8,4 | 1 | 7,5 | 5,2 | 1,8 | 10,2 |
| 1 | 10 | 1,5 | 0,5 | 4,2 | 1 | 10 | 4,9 | 1,1 | 8,6 |
| 1 | 15 | 0,9 | 0,3 | 1,3 | 1 | 15 | 2,3 | 0,7 | 2,5 |
| 1 | 20 | 0,8 | 0,2 | 0,9 | 1 | 20 | 1,8 | 0,5 | 1 |
| 1 | 25 | 0,8 | 0,2 | 0,5 | 1 | 25 | 0,7 | 0,3 | 0,5 |
| 1 | 30 | 0,7 | 0,1 | 0,5 | 1 | 30 | 0,6 | 0,2 | 0,5 |
| 1 | 35 | 0,8 | 0,2 | 0,3 | 1 | 35 | 0,5 | 0,1 | 0,4 |
| 1 | 40 | 0,7 | 0,1 | 0,4 | 1 | 40 | 0,5 | 0,2 | 0,4 |
| 2 | 2,5 | 2,3 | 1,9 | 26,4 | 2 | 2,5 | 2,2 | 2 | 22,5 |
| 2 | 5 | 3,9 | 2,8 | 18,3 | 2 | 5 | 3,4 | 2,9 | 17,6 |
| 2 | 7,5 | 4,5 | 2,1 | 15,8 | 2 | 7,5 | 4,8 | 2,5 | 14,6 |
| 2 | 10 | 2,4 | 1,4 | 10,5 | 2 | 10 | 3,9 | 2,1 | 8,6 |
| 2 | 15 | 2 | 0,9 | 7,2 | 2 | 15 | 2,2 | 0,8 | 4,7 |
| 2 | 20 | 1,4 | 0,7 | 1,5 | 2 | 20 | 1,1 | 0,7 | 1,6 |
| 2 | 25 | 0,9 | 0,6 | 0,8 | 2 | 25 | 0,7 | 0,5 | 0,7 |
| 2 | 30 | 0,8 | 0,5 | 0,5 | 2 | 30 | 0,5 | 0,4 | 0,5 |
| 2 | 35 | 0,8 | 0,3 | 0,4 | 2 | 35 | 0,4 | 0,4 | 0,5 |
| 2 | 40 | 0,8 | 0,2 | 0,5 | 2 | 40 | 0,4 | 0,3 | 0,4 |
| 3 | 2,5 | 1,3 | 0,4 | 2,8 | 3 | 2,5 | 1,9 | 0,4 | 1,6 |
| 3 | 5 | 2,2 | 0,3 | 1,5 | 3 | 5 | 2,1 | 0,4 | 1 |
| 3 | 7,5 | 1,4 | 0,2 | 0,7 | 3 | 7,5 | 1,3 | 0,3 | 0,6 |
| 3 | 10 | 1 | 0,2 | 0,5 | 3 | 10 | 0,9 | 0,2 | 0,5 |
| 3 | 15 | 0,8 | 0,1 | 0,4 | 3 | 15 | 0,5 | 0,1 | 0,5 |
| 3 | 20 | 0,8 | 0,1 | 0,4 | 3 | 20 | 0,5 | 0,1 | 0,4 |
| 3 | 25 | 0,7 | 0,1 | 0,3 | 3 | 25 | 0,4 | 0,1 | 0,4 |
| 3 | 30 | 0,7 | 0,1 | 0,4 | 3 | 30 | 0,4 | 0,1 | 0,3 |
| 3 | 35 | 0,7 | 0,1 | 0,4 | 3 | 35 | 0,3 | 0,1 | 0,3 |
| 3 | 40 | 0,6 | 0,1 | 0,3 | 3 | 40 | 0,4 | 0,1 | 0,4 | sep. = separator treatment

AQUEOUS EXTRACTION PROCESS FOR THE RECOVERY OF MUCILAGE AND DEMULSIFICATION

The present invention relates to a method by which it is possible to purify a lipid phase and/or to obtain hydratable mucilage by adding a volume of water containing acid- or base-forming compounds and whose volume fraction is >5% by volume in relation to the lipid phase to be purified and/or a volume ratio, enabling the formation of a water phase (aqueous phase) to separate hydratable mucilage from a lipid phase.

BACKGROUND OF THE INVENTION

Vegetable oils and animal fats, but other lipid phases, contain a variable proportion of accompanying substances (also called gums or concomitant substances) that must be removed to achieve quality requirements for the use of these oils, fats, and other lipid phases. These impurities are mostly at least partially hydrophilic and result in the formation of an emulsion upon contact with water. Examples of these accompanying substances are phospholipids, glycolipids, free fatty acids or polyphenols. While phospholipids have a high water binding capacity, this is true only to a small extent for free fatty acids. However, it is known that in the presence of a mixture of these accompanying substances in an oil, very stable emulsions occur when water is mixed into the oil. This leads to a situation where the resulting emulsion can no longer be separated by physical measures. Further, it is known from the prior art that the stability of such an emulsion increases with increasing water content. For the removal of these accompanying substances in an oil, aqueous extraction processes are known from the prior art in which, for the abovementioned reasons, removal of the accompanying substances is performed by adding the lowest possible volume of water. In WO 1994/021762 A1 (Removal of Phospholipids from Glyceride Oil), a degumming process is presented, in which first citric acid at a concentration of 50% by weight using a mixing ratio of 0.1 to 0.4% by weight is mixed with the oil to be purified. After a reaction time 0.2 to 5% by volume of water is admixed and then the emulsion is separated by means of a separator into an oil and a mucilage phase. The separation of the water phase from a water-in-oil emulsion is carried out by centrifugal processes from the prior art (separator, decanter, centrifuge). It is known that the energy expenditure for the separation of the water phase correlates with the amount of added water which is bound in the emulsion. It is therefore the aim of the methods known from the prior art to use only the minimum amount of water necessary.

When using basic solutions for degumming of lipid phases usually much more stable emulsions arise than is the case when an acidic solution is used. Methods are known in the prior art in which emulsions are produced by mixing a basic solution into an oil to be purified; these are then separated again by centrifugation to give a generally turbid oil and aqueous-emulsified mucilage phase. Since the types of mucilages that are present in an oil exist in variable quantities and in varying proportions to each other, it is not possible to calculate the amount of basic compounds and/or a required amount of water that is necessary for separation of hydratable mucilages (gums) from the lipid phases. From the prior art, no methods are known which are universally applicable to different lipid phases and lead to a consistently good separation efficiency of the accompanying substances in oil. The object of the invention is therefore to provide a method with which to reliably and consistently separate accompanying substances, which are present in variable proportions in oils, for further utilization.

It is known from the prior art that alkali solutions lead to saponification of free fatty acids and hydration of phospholipids (see WO 2000/68347, WO2012/173281A1, EP0473985A2). If more than three percent by volume of an alkaline solution is added to an oil containing hydratable accompanying substances and mixed with it, an emulsion is formed which does not spontaneously separate. The document WO2015/185675A1 (process for obtaining glycoglycerolipids and glycosphingolipids from lipoid phases) describes a process in which basic aqueous solutions containing silicates, carbonates or borates in a volume ratio of 0.1 to 3% by volume of vegetable oils or animal fats are admixed, resulting in the formation of a complex with the glycolipids present herein, which can then be separated by centrifugal separation techniques. At larger water volume ratios, the heavy phases obtained after phase separation with a separator were cream-like emulsions containing relevant amounts of neutral lipids.

The patent WO2015/1811341A1 (method for refining lipid phases and use) describes a method in which an aqueous solution containing an amidine and/or guanidine group-containing compound, are admixed to oils or fats, which are subsequently separated by means of centrifugal separation methods together with herein dissolved compounds (free fatty acids, phospholipids, glycolipids, etc.). In this case, an intensive admixture of the aqueous solution showed a significantly improved effect in terms of the depletion of odorants, flavors and colorants, than addition of the aqueous solutions that were only admixed by stirring. It could be documented that, despite the same volume of water which was added and the same concentration of amidine and/or guanidine group-containing compounds in the aqueous solutions, it resulted in a different separation efficiency of odorants and dyes (colorants) through the use of an intensive admixture or a stirring mixing procedure. The volume fractions (volumes) of aqueous solutions required for efficient removal of odorants and dyes were between 2 and 3% by volume. Separation of the water phase was possible only by centrifugal processes. The mucilages were separated in an emulsified form.

EP 0269277 A2 describes a process for the removal of phospholipids or mucilages from triglyceride oils. Therefore, an organic acid or acid anhydride is dispersed in the oil at a temperature not greater than about 40° C. Subsequently, water is dispersed in the oil and the sewage sludge containing mucilage (gums) is removed from the oil to obtain an oil with a reduced content of phosphorus containing compounds. To obtain a refined oil, a further bleaching step is carried out. Bleaching earth (fuller's earth) can be used for this purpose. As organic acids citric acid, maleic anhydride, maleic acid, lactic acid, oxalic acid and acetic anhydride are mentioned, wherein 50% by weight of the aqueous organic acid solution is preferred. The listed amount of added organic acid is between 0.1 to 1.0% by weight. In this case, the addition of water with a content of 0.1 to 3% by weight is disclosed. As a result of the addition of the water and the organic acid or acid anhydride, the phospholipids precipitate in the form of an aqueous sewage sludge. A phase separation to form a water phase is not described. It is clear to a person skilled in the art that the formation of a sewage sludge leads to a significant inclusion of the oil to be purified in the water phase, and thus a high oil loss is associated with the aforementioned method. As a result of the forming sewage sludge and the high proportion of oil in the aqueous phase, this method has the further disadvantage that the phase separation is difficult to accomplish.

DE 1058184B describes a process for degumming vegetable oils, e.g., of soybean, cottonseed, perilla, linseed, peanut, corn and fuel oil by means of water and at least one of the following acid anhydrides acetic, propionic, butyric, maleic, succinic, monomethylsuccinic or dimethylsuccinic anhydride. The acid anhydride and the water may be added to the oil separately or added at the same time. At least 1.5% by weight of water, based on oil, is added. However, it is recommended to limit the amount of water to a minimum, since increased water volumes increase the oil losses and reduce the required contact time especially at temperatures below 60° C. Furthermore, an amount of water of at least 1.5% by weight is described only in connection with a separate addition of acid and water. The examples described contain only examples with at most 3% by weight of water, based on the oil, whereby the oil is first mixed with an acid anhydride and then at most 3% by weight of water is added. After the acid-water treatment, the oil is centrifuged to separate the aqueous mucilage (gum) phase from the oil. It is clear to a person skilled in the art that a sewage sludge results from this, which leads to a significant inclusion of the oil to be purified in the water phase and thus a high oil loss is associated with the aforementioned method. As a result of the sewage sludge formation and the high proportion of oil in the aqueous phase, this method has the further disadvantage that the phase separation is difficult to accomplish.

AT 356 229 B describes a process for degumming triglyceride oils using an acid and water to remove an aqueous sludge containing the accompanying substances after the oil, the degumming agent and the water have been kept in contact with each other for least 5 min. The degumming agents are inorganic or organic acids such as phosphoric acid, acetic acid, citric acid, tartaric acid, succinic acid, etc. or mixtures thereof. First, 0.001 to 0.5% by weight of an acid having a pH of at least 0.5 in a 1 molar solution or its anhydride is dispersed in the oil, then 0.2 to 5 wt. % water is added in the dispersed mixture and finally the aqueous slurry is separated, whereby the mixture of oil, water and acid is maintained at a temperature below 40° C. before the aqueous slurry is separated. Preferably, the aqueous slurry is separated by centrifugation. The oil can be further treated, for example, by bleaching and deodorization process. However, during the acid treatment process, significant amounts of the oil are transferred to the aqueous phase, resulting in a large loss of the oil to be purified. As a result of the sewage sludge formation and the high proportion of oil in the aqueous phase, this method has the further disadvantage that the phase separation is difficult to accomplish.

So far, there is no method in which it is possible to hydrate mucilages, which are present in a lipid phase in an anhydrous form, in such a way that they are extractable by sedimentation from the lipid phase. Furthermore, in the prior art, no aqueous process is known by which only small amounts of the lipid to be purified are being lost during the aqueous treatment of a lipid phase containing mucilages of different origin and composition and with constant effectiveness.

It is therefore an objective of the present invention to provide an aqueous process for the simple and inexpensive purification of a lipid phase and/or for the separation of a mucilage and its recovery from a lipid phase. This objective is achieved by the technical teaching of the independent claims. Further advantageous embodiments of the invention will become apparent from the dependent claims, the description, the figures and the examples.

DESCRIPTION OF THE INVENTION

Surprisingly, it has been found that the solution of the present object is achieved by the water volume of an acidic or basic solution added to the oil or fat to be purified is selected to be so large that a free water phase spontaneously forms/is obtained after the solution has been mixed with the oil. It has been found that if the amount of water added is significantly greater than that required by prior art methods of separating mucilages (gums), however, the aqueous solution separation efficiency of acid or base forming compounds can be improved in such way that the hydrated mucilages can be separated and removed from an oil phase or lipid phase already by sedimentative methods. At the same time, the economical use of the compounds which can be used for this purpose is further improved, since free water phases are obtained which can be separated from the aggregated mucilages contained therein by simple measures, such as filtration, for example, and used repeatedly in the process. Surprisingly, the process sequence of the purification process is also significantly simplified, whereby despite the use of larger volume flows, which are required for this purpose, the purification process can be significantly economized. It has been found that due to the inventive excess of the amount of water required for the hydration of mucilages, the separation of these hydrated mucilages is considerably easier, since they can be easily removed from the lipid phase because they partially or completely pass into the water phase spontaneously and can be removed by simple separation measures (e.g. by a settling tank). As a result, energy costs, can be reduced significantly, since for example a higher separation performance through a separator or decanter is not required. The selection of suitable process stages and their combination is possible by a simple preliminary test by adding different water volume ratios, thereby reducing the analytical effort for the application of the method over the methods of the prior art.

Thus, the present invention is directed at a method to purify lipid phases and/or separate mucilage from a lipid phase, comprising the following steps:

a) providing a lipid phase containing mucilage, b adding and admixing a water phase containing at least one acid- or base-forming compound having a volume ratio of >5% by volume between the volume of the water phase and the total volume of lipid phase and water phase before admixing the water phase, c) sedimentary phase separation obtaining formation of a free water phase containing hydrated mucilages d1) separation of the free water phase containing the hydrated mucilages, d2) Separation of the mucilage-poor lipid phase.

Preference is given to a process for purifying lipid phases and/or for separating mucilages, in which the hydration of all mucilages contained therein is recognized by the formation of a visible free water phase after admixing of the water phase, consisting of an acidic or basic aqueous solution.

A stirring or intensive addition of even a small amount of aqueous solutions into an oil, which contains accompanying substances in an oil, hereinafter also called mucilage(s), leads to a significant emulsion formation. A spontaneous phase separation does not take place with time. In good agreement with state-of-the-art findings, it has been shown that the stability of water-in-oil emulsions correlates with the concentration of mucilage, in particular with that of phospholipids, glycolipids and also of free fatty acids, but also with the amount of water and the intensity of the addition of the aqueous phase into the oil. There was also no spontaneous settling of a free water phase over the course of several days when using a water volume fraction (volume ratio) of <5% by volume to an oil phase containing hydratable mucilage. Surprisingly, when the same oils were treated identically but in which the volume fraction (volume ratio) of the aqueous solutions added to the lipid phases was significantly increased, there was spontaneous separation of a free water phase. The phase separation process then continues, so that during the course of a sedimentary phase separation the oil phase contains only small residual amounts of water and there is a separation of hydrated mucilage. The emulsions that are formed immediately after a stirring or an intensive mixing procedure of a large volume of water (water volume ratio) (>3% by volume) into an oil containing mucilage did not differ in appearance from those produced with a small amount of added water. Over the course of a few minutes to a few days, however, lipid phases, in which a free water phase had spontaneously separated off shortly after the admixing of the water phase, led to a clearly visible separation of the oil and water phases, so that the resulting oils only had a slight to minor turbidity and the water phases that had separated, were slightly turbid to almost clear and in which a mucus layer in the area of the phase boundary was present and had settled to the container bottom (FIGS. 5 and 6). From the investigations to clarify the required volumes of water to be added, (in the following called also water-addition-volume), it has been shown that an increase in the addition volume to 5-15 vol % significantly enhances the formation of emulsions and with the use of a stirring admixture procedure the viscosity of the emulsions significantly increased. When mixing even larger volumes of aqueous solutions into the oil phase, emulsions were formed that did not visually differ from an emulsion achieved by adding 2-3% by volume.

However, after only a few minutes it became clear that in the case of emulsions in which a spontaneous settling of a free water phase occurred after emulsion formation (15-30% water-addition-volume), clarification in the form of a spontaneous settling the emulsion layer occurred. It could further be shown that using a volume fraction of the aqueous phase greater than three percent by volume, no clear relationship could be predicted between the concentrations of hydratable mucilages present in an oil or fat (phospholipids, free fatty acids, ion concentrations) and the added water volume at which there is a saturation of the water absorption in the emulsion and in which a spontaneous separation of a free water phase then takes place. Furthermore, no relationship could be established between the required volume ratio of an aqueous solution to be added and the formation of a free water phase using a stirrer or an intensive mixing device; in both instances, the added volume of the aqueous phase which resulted in the formation of a spontaneous free water phase was different. In all investigations it could be found, however, that a spontaneous settling of a free water phase, which can be detected by the naked eye after admixture of an aqueous solution into an oil or fat, subsequently leads to a spontaneous separation of the main portion of the water that had been admixed to the oil phase, together with the mucilage phase. Therefore, it is advantageous to use an aqueous solution for separating hydratable mucilages and for purifying oils or fats in a volume ratio to the oil or fat phase that is equal to or greater than the water volume necessary for complete hydration of the mucilages within the lipid phase that can be achieved with the aqueous solution used. If the water volume required for this purpose is reached or exceeded, then a settling of a free water phase occurs. This can be used as an indicator to determine the amount of aqueous solution to be added, with which the process according to the invention can preferably be carried out. A volume fraction of an acid- or base-containing aqueous solution admixed to the lipid phase may be >3% by volume, more preferably >5% by volume, more preferably >6% by volume, more preferably >7% by volume preferably from >8% by volume, more preferably >9% by volume, more preferably >10% by volume, more preferably >12.5% by volume, more preferably >15% by volume, more preferably >17.5% by volume, more preferably >20% by volume, more preferably >25% by volume, and most preferably >30% by volume.

The volume fraction of an aqueous acidic or base solution admixed to the lipid phase may be in a range of 3 to 300% by volume, in a range of 3 to 150% by volume, in a range of 3 to 100% by volume, further in a range of 3 to 80 vol. %, further in a range of 3 to 60 vol. %, further in a range of 3 to 50 vol. %, or further in a range of 3 to 30 vol. %.

Preferably, the volume fraction of a water phase containing an acid- or base-forming compound admixed to the lipid phase is in the range of 5 to 300% by volume, in the range of 5 to 150% by volume, in the range of 5 to 100% by volume, in a range of 5 to 80% by volume, in a range of 5 to 60% by volume, in a range of 5 to 50% by volume, or in a range of 5 to 30% by volume.

Further preferably, the volume fraction of a water phase containing an acid- or base-forming compound added to the lipid phase is in the range of 6 to 300% by volume, in a range of 6 to 150% by volume, in a range of 6 to 100% by volume, a range of 6 to 80% by volume, in a range of 6 to 60% by volume, in a range of 6 to 50% by volume, or in a range of 6 to 30% by volume.

Further preferably, the volume fraction of a water phase containing an acid- or base-forming compound admixed to the lipid phase is in the range of 7 to 300% by volume, in the range of 7 to 150% by volume, in the range of 7-100 vol %, in a range of 7 to 80% by volume, in a range of 7 to 60% by volume, in a range of 7 to 50% by volume, or in a range of 7 to 30% by volume.

More preferably, the volume fraction of a water phase containing an acid- or base-forming compound admixed to the lipid phase is in the range of 8 to 300% by volume, in a range of 8 to 150% by volume, in the range of 8-100 vol. %, in a range of 8-80 vol. %, in a range of 8-60 vol. %, in a range of 8-50 vol. % or in a range of 8-30 vol. %.

Further preferably, the volume fraction of a water phase containing an acid- or base-forming compound admixed to the lipid phase is in the range of 9-300% by volume, in a range of 9-150% by volume, in a range of 9-100% by volume, in a range of 9 to 80% by volume, in a range of 9 to 60% by volume, in a range of 9 to 50% by volume, or in a range of 9 to 30% by volume.

Further preferably, the volume fraction of a water phase containing an acid- or base-forming compound admixed to the lipid phase is in the range of 10 to 300% by volume, in a range of 10 to 150% by volume, in a range of 10 to 100% by volume, in a range of 10-100% by volume, in a range of 10-60% by volume, in a range of 10-50% by volume, or in a range of 10-30% by volume.

Further preferably, the volume fraction of a water phase containing an acid- or base-forming compound admixed to the lipid phase is in a range of 12.5 to 300% by volume, in a range of 12.5 to 150% by volume a range of 12.5 to 100% by volume, in a range of 12.5 to 100% by volume, in a range of 12.5 to 60% by volume, in a range of 12.5 to 50% by volume or in a range of 12.5-30 vol %.

Further preferably, the volume fraction of a water phase containing an acid- or base-forming compound admixed to the lipid phase is in the range of 15-300% by volume, in a range of 15-150% by volume, in a range of 15% to 100 vol %, in a range of 15-60 vol. %, in a range of 15-50 vol. % or in a range of 15-30 vol. %.

Further preferably, the volume fraction of a water phase containing an acid- or base-forming compound admixed to the lipid phase is in a range of from 17.5 to 300% by volume, in a range of from 17.5 to 150% by volume, in a range of 17.5 to 100% by volume, in a range of 17.5 to 60% by volume, in the range of 17.5 to 50% by volume or in a range of 17.5-30% by volume.

Further preferably, the volume fraction of a water phase containing an acid- or base-forming compound admixed to the lipid phase is in a range of 20-300 vol %, in a range of 20-150 vol %, in a range of 20-100% by volume, in a range of 20-80% by volume, in a range of 20-60% by volume, in a range of 20-50% by volume or in a range of 20-30% by volume.

Further preferably, the volume fraction of a water phase containing an acid- or base-forming compound admixed to the lipid phase is in a range of 25-300 vol %, in a range of 25-150 vol %, in a range of 25-100% by volume, in a range of 25-80% by volume, in a range of 25-60% by volume, in a range of 25-50% by volume or in a range of 25-30% by volume.

Further preferably, the volume fraction of a water phase containing an acid- or base-forming compound admixed to the lipid phase is in a range of 30 to 300 vol %, in a range of 30 to 150 vol %, in a range of 30-100% by volume, in a range of 30-80% by volume, in a range of 30-60% by volume or in a range of 30-50% by volume.

More preferably, the volume fraction of a water phase containing an acid- or base-forming compound admixed to the lipid phase ranges from 5% to 50% by volume.

The volume ratio is preferably chosen so that the formation of a free water phase is ensured after the mixing process.

To detect and control the volume fraction (volume ratio) of the water phase required for this purpose, a visual/optical recognition of the settling of a free water phase following the admixture is suitable. This criterion can be used to control the metered addition of the water phase to a lipid phase by gradually increasing the volume fraction of the water phase and removing a sample from the emulsion formed after admixing. From these samples, preferably within the first 24 hours, more preferably within the first 6 hours, more preferably within the first ¼ hour and most preferably within the first 5 minutes, the settling of a free water phase can be observed and used as a criterion for the added water volume ratio.

Therefore, the present invention is also directed at a method to purify lipid phases and/or separate mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining formation of a free water phase containing hydrated mucilages d1) separation of the free water phase containing the hydrated mucilages, d2) separation of the mucilage-poor lipid phase.

Thus, a preferred embodiment of the invention is a method to purify a lipid phase and/or separate mucus/mucilage from a lipid phase comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, c) sedimentary phase separation obtaining formation of a free water phase containing hydrated mucilages d1) separation of the free water phase containing the hydrated mucilages d2) separation of the mucilage-poor lipid phase.

Therefore, the present invention is also directed at a method for purifying a lipid phase and/or for separating mucilages from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, which ensures formation of a free water phase after the admixing, c) sedimentary phase separation obtaining formation of a free water phase containing hydrated mucilages d1) separation of the free water phase containing the hydrated mucilages, d2) separation of the mucilage-poor lipid phase.

A preferred embodiment of the present invention relates to a method for purifying a lipid phase and/or for separating mucilages from a lipid phase comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, which ensures formation of a free water phase after the admixing, c) sedimentary phase separation obtaining formation of a free water phase containing hydrated mucilages d1) separation of the free water phase containing the hydrated mucilages, d2) separation of the mucilage-poor lipid phase.

Therefore, the present invention is also directed at a method for purifying a lipid phase and/or for separating mucilages from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, which ensures formation of a free water phase after the admixing, c) sedimentary phase separation obtaining formation of a free water phase containing hydrated mucilages d1) separation of the free water phase containing the hydrated mucilages, d2) separation of the mucilage-poor lipid phase.

A preferred embodiment of the present invention relates to a method for purifying a lipid phase and/or for separating mucus from a lipid phase comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, which ensures formation of a free water phase after the admixing, c) sedimentary phase separation obtaining formation of a free water phase containing hydrated mucilages d1) separation of the free water phase containing the hydrated mucilages, d2) separation of the mucilage-poor lipid phase.

One embodiment of the present invention is a method for purifying lipid phases and/or for separating mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, and/or a water volume ratio which ensures formation of a free water phase after the admixing, c) sedimentary phase separation obtaining formation of a free water phase containing hydrated mucilages d1) separation of the free water phase containing the hydrated mucilages, d2) separation of the mucilage-poor lipid phase.

An embodiment of the present invention is also a method for purifying lipid phases and/or for separating mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, and/or a water volume ratio which ensures formation of a free water phase after the admixing, c) sedimentary phase separation obtaining formation of a free water phase containing hydrated mucilages d1) separation of the mucilages-containing water phase, d2) Separation of the mucilages-poor lipid phase.

Due to the high water content, only very small amounts of the lipid (the neutral lipid fraction) to be purified are transferred into the aqueous phase. This has the advantage that only a small loss of the lipid phase (the neutral lipids) results and, further, due to the small proportion of the lipid to be purified (the neutral lipids) in the aqueous phase, a much better separation of the aqueous phase containing the acid- or base-forming compounds is possible by phase separation or can take place via sedimentation, respectively.

Preference is given to a process in which, in step b), a water phase containing at least one acid- or base-forming compound having a volume ratio of >5% by volume, which ensures complete hydration of hydratable mucilage, is added and mixed.

One embodiment of the present invention is thus a process for the purification of lipid phases and/or the separation of mucilages from a lipid phase comprising the following steps:

a) preparation of a lipid phase containing mucilage, b) adding and admixing a water phase containing at least one acid- or base-forming compound having a volume ratio of >5% by volume between the volume of the water phase and the total volume of lipid phase and water phase before admixing the water phase, and/or a water volume ratio which ensures formation of a free water phase after the admixing, c) sedimentary phase separation obtaining formation of a free water phase containing hydrated mucilages d1) separation of the mucilage-containing water phase, d2) separation of the mucilage-poor lipid phase.

A further embodiment of the present invention is thus a method for purifying lipid phases and/or for separating mucilage substances from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, which ensures formation of a free water phase after the admixing, c) sedimentary phase separation obtaining formation of a free water phase containing hydrated mucilages d1) separation of free water phase containing the hydrated mucilage, d2) separation of the mucilage-poor lipid phase.

Preference is given to a process in which an acidic or basic aqueous solution in a volume fraction that is at least as large so as to ensure complete hydration of all mucilages which can be hydrated with the process step is admixed into a lipid phase which contains mucilage by means of a stirring and/or intensive mixing device. Accordingly, it is preferred in step b) of a method according to the invention to choose a volume fraction of the acidic or basic aqueous solution which is admixed into a lipid phase from step a) by means of a stirring and/or intensive mixing process that is at least as large so as to achieve complete hydration all of the hydratable mucilages by this process step.

A preferred embodiment of the present invention therefore relates to a method for purifying lipid phases and/or for separating mucilages from a lipid phase comprising the following steps:

a) providing a lipid phase containing mucilage, b) adding and mixing a water phase containing at least one acid- or base-forming compound, with a water volume ratio, volume of the water phase to the total volume of lipid phase and water phase before mixing the water phase, of >5% by volume and/or a water volume ratio, which allows forming of a free water phase after the mixing process, by means of a stirring and/or intensive mixing procedure, so that a complete hydration of all mucilages which can be hydrated with the process step, is achieved.

c) sedimentary phase separation obtaining a water phase containing hydrated mucilages, d1) separation of the mucilages-containing water phase, d2) separation of the mucilage-poor lipid phase.

Preference is given to a process for purifying lipid phases and/or for separating mucilages, in which the complete hydratability (hydration) and/or separability of the mucilages contained therein, which can be achieved with the aqueous acidic or basic solution used, is thereby recognized, in that, after mixing in a water phase consisting of an acidic or basic aqueous solution to form an emulsion, a visible free water phase containing hydrated mucilages spontaneously forms. Preference is therefore given to a method according to the invention for purifying lipid phases and/or for separating mucilages, in which the hydratability and/or separability of the mucilages contained in step a) is detected in step a1), which may also be optional, in that after mixing in a water phase consisting of an acidic or basic aqueous solution to form an emulsion, a visible free water phase containing hydrated mucilages is formed spontaneously.

Preference is given to a process for purifying lipid phases and/or for separating mucous substances, in which an acidic or basic aqueous solution with a volume fraction of the lipid phase is admixed until, after mixing, a free water phase containing hydrated mucilages forms spontaneously. Accordingly, it is preferred in step b) of an inventive method, to add an acidic or basic aqueous solution with a large volume fraction to the lipid phase and perform admixture by means of an intensive mixing procedure such that spontaneous formation of a free water phase after mixing occurs.

Thus, one embodiment of the present invention relates to a method for purifying lipid phases and/or for separating mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, which ensures formation of a free water phase after the admixing, accomplished by means of an intensive mixing procedure until spontaneous formation of a free water phase after mixing occurs.

c) sedimentary phase separation obtaining a water phase containing hydrated mucilage, d1) separation of the mucilage-containing water phase, d2) separation of the mucilage-poor lipid phase.

Therefore, the present invention is also directed at a method for purifying lipid phases and/or for separating mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, being mixed by means of an intensive mixing procedure until a free water phase spontaneously forms after mixing, c) sedimentary phase separation to form a free water phase containing hydrated mucilage, d1) separation of the free water phase containing the hydrated mucilages, d2) separation of the mucilage-poor lipid phase.

Preference is given to a method for purifying lipid phases and/or for separating mucilage substances, in which the selection of acid- or base-forming compounds from aqueous solutions and their volume addition to a lipid phase is decided according to whether a free water phase spontaneously forms after mixing with the lipid phase.

In comparative studies it has been found that in lipid phases which have been treated by the method according to the invention, upon renewed admixture of an aqueous solution which contains a compound with which sufficient hydration of mucilage has already taken place, virtually no further mucilages can be transferred into the water phase, not even if a larger addition volume or a higher concentration of the acidic or basic compound is used. In contrast, in lipid phases treated with the same aqueous solutions but with a small volume fraction of aqueous solutions according to the art, after centrifugal separation of the lipid phase from the water phase, there may still be a relevant amount of mucilage in the oil that can be hydrated, which are then transferrable into a water phase when an aqueous solution, in which the identical compound is dissolved, is admixed again and with a volume fraction that is required for complete hydration. Thus, in an aqueous cleaning process where the same compounds are used for hydration and/or complexation of mucilages and in which the water volume fraction (water volume ratio) is <5%, only a portion of the mucilages become hydrated and/or complexed in a form that can be separated with the water phase during a centrifugal separation. Thus, the mucilages that have not been separated must be depleted in further purification step(s), which can increase the process costs.

Further, comparative studies between application of the aqueous purification steps having a large water volume ratio to otherwise similar treatment with an aqueous solution but with a small water volume ratio have shown that by using a low water volume ratio an emulsification occurs; the centrifugation of which results in co-discharge of neutral fats in the resulting water phase(s) and thus in the separable mucilage phases. This leads, on the one hand, to a loss of product (the neutral lipids of the lipid phase) and, on the other hand, to increased efforts for the purification of the resulting mucilaginous phases. Furthermore, it has been found in comparative studies that when using the method according to the invention, the amount of residual water present in the lipid phase before and after centrifugal phase separation are lower than in those lipid phases treated in an identical manner but with a low water volume ratio of the aqueous solutions containing the same compounds. Thus the method according to the invention enables lipid phases to be clarified of a residual water and/or mucilage fraction contained therein with a low centrifugal expenditure of energy or even to completely dispense with centrifugal separation. Furthermore, this can result in cost savings in the drying of the final lipid products.

A particular advantage of the inventive method is its simple applicability. In order to carry out the inventive mixing procedure, it is not necessary to analyze the liquid phase to be purified with regard to its indicators for accompanying/mucilage substances (e.g., phospholipids, free fatty acids, electrolytes). By means of a test series in which gradually increasing volumes of different basic or acidic solutions are admixed to the lipid phase, simple visual examination can be used to determine which volume ratio of the aqueous solution to the lipid phase is sufficient for hydration of the mucilages contained therein and with which aqueous solution or which added water volume ratio the process can be carried out. For the execution of the method according to the invention larger volume ratios between the water and the lipid phase can also then be used than those which were determined in the sample described above for the determination of a minimum amount of volume required. The simple test procedure for complete hydration of mucilages (see Methods) also leads to a clear economization of the purification of a lipid phase. The method is also characterized by its universal applicability, since the amount and proportion of hydratable mucilage(s) present in a lipid phase are irrelevant.

Preference is given to a preliminary test for the selection of a method for purifying lipid phases and/or for the separation of mucilages and their recovery, in which increasing amounts of added water volume of various acidic or basic aqueous solutions are admixed to a lipid phase until a visible free water phase is formed after mixing.

The objects of the invention are further achieved by a method comprising the following steps:

a) providing a lipid phase containing mucilage, a1) investigating the hydratability of the mucilages present in the lipid phase of step a) by admixing increasing volumes of water with at least one acid- or base-forming compound until a free water phase is formed after the mixing process, b) admixing a water phase which contains at least one acid- or base-forming compound to the lipid phase from process step a) with an added volume fraction which was sufficient to obtain formation of a free water phase after mixing in process step a1), c) sedimentary phase separation obtaining a mucilage-containing water phase and a mucilage-poor lipid phase.

d1) separation of the mucilage-poor lipid phase, d2) separation of the mucilage-containing water phase.

Therefore, the present invention is also directed at a method for purifying lipid phases and/or for separating mucilages from a lipid phase comprising the following steps:

a) providing a lipid phase containing mucilage, a1) investigating the hydratability of the mucilages present in the lipid phase of step a) by admixing increasing volumes of water with at least one acid- or base-forming compound until a free water phase is formed after the mixing process, b) adding and mixing a water phase containing at least one acid- or base-forming compound, with a water volume ratio, volume of the water phase to the total volume of lipid phase and water phase before mixing the water phase, in the process step a1) to obtain a free water phase, and where the water volume ratio is >5 vol %, c) sedimentary phase separation obtaining formation of a free water phase containing hydrated mucilages, d1) separation of the free water phase containing the hydrated mucilages, d2) separation of the mucilage-poor lipid phase.

The manner of introducing a basic or acidic aqueous solution, e.g., in the form of an agitating or intensive mixing procedure, influences the degree of hydration of the mucilages present in the lipid phase by affecting the volume fraction of a water shell around hydrated mucilage. In this case, a more complete and faster hydration of the mucilage present in a lipid phase is achieved by an intensive mixing procedure. However, the resulting water droplets that arise after an intensive mixing procedure are smaller and more distributed, as is the case after mixing using a stirring mixing device, which usually also needs a larger amount of water to achieve sufficient hydration of the mucilages for their removal. In this manner, it can be explained that in the case of an intensive mixing procedure, a larger added volume fraction of the aqueous solutions may be required than in the case of a stirring mixing procedure in order to carry out a method according to the invention. Also, the effectiveness of hydration can be increased by an intensive mixing procedure.

Preference is given to a method for purifying lipid phases and/or for separating mucilage/mucous substances, in which an acidic or basic aqueous solution is admixed to the lipid phase by means of an intensive mixing procedure using a volume fraction sufficiently large to spontaneously achieve formation of a free water phase after mixing.

Thus, a method for purifying a lipid phase and/or separation of mucous substances is also preferred, wherein in step b) the water phase containing at least one acid- or base-forming compound is admixed by means of an intensive mixing procedure.

A preferred embodiment of the present invention is a process for the purification of a lipid phase and/or separation of mucilages from the lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, where admixing is accomplished by means of an intensive mixing procedure, c) sedimentary phase separation obtaining a free water phase containing hydrated mucilage, d1) separation of the free water phase containing the hydrated mucilage, d2) separation of the mucilage-poor lipid phase.

Surprisingly, it could be shown that, when carrying out the method according to the invention with a stirring mixer, a comparable amount of hydrated mucilages can be transferred into the water phase and separated, as is the case with an intensive mixing procedure of the aqueous solutions. It has been found that in the process application with intensive mixing of the aqueous solutions a partially larger volume fraction of the added water volume is required, as this is the case using a stirring device for mixing in order to obtain formation of a free water phase and a phase separation.

The addition of the water phase can take place in the form of a continuous or discontinuous feed. The lipid phase and/or the water phase can have any desired temperature, but mixing is only possible if both phases have a liquid state of aggregation. Therefore, a temperature range for the lipid phase and/or water phase between 0° and 120° C. is preferred, more preferably between 15° and 90° C. and more preferably between 25° and 75° C. The duration of the admixture of the water phase depends on the amount of hydratable mucilages, the type of mixing procedure used and the proportion of the water volume (water volume ratio). It is therefore advisable to carry out a series of tests in which different periods of time and types of mixing procedures with different amounts of water phase addition ratios are preformed (see: Test method for the hydration of mucilage). With the constellation in which a maximum of hydratable mucilages can be separated (as evidenced, for example, by centrifugation of a test sample), the process should preferably be carried out. In general, it is advantageous to choose a mixing duration of 1 second to 60 minutes, more preferably this should be between 1 minute and 30 minutes and further preferred between 3 minutes and 15 minutes.

Therefore, a preferred embodiment of the present invention relates to a method for purifying a lipid phase and/or separation of mucilages from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, where the mixing duration is between 1 second to 60 minutes, c) sedimentary phase separation obtaining formation of a free water phase containing hydrated mucilage, d1) separation of the free water phase containing the hydrated mucilage, d2) separation of the mucilage-poor lipid phase.

A particularly preferred embodiment of the present invention is a method for purifying a lipid phase and/or separation of mucilage from a lipid phase, comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, where the mixing duration is between 1 second to 60 minutes, c) sedimentary phase separation obtaining formation of a free water phase containing hydrated mucilage, d1) separation of the free water phase containing the hydrated mucilage, d2) separation of the mucilage-poor lipid phase.

Furthermore, a preferred embodiment of the present invention relates to a method for purifying a lipid phase and/or separation of mucous substances from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, wherein the mixing is performed by means of an intensive mixing process and the where the mixing duration is between 1 second to 60 minutes, c) sedimentary phase separation obtaining a free water phase containing hydrated mucilage, d1) separation of the free water phase containing the hydrated mucilage, d2) separation of the mucilage-poor lipid phase.

A particularly preferred embodiment of the present invention is a method for purifying a lipid phase and/or separation of mucous substances from a lipid phase, comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, wherein the mixing is performed by means of an intensive mixing process and the where the mixing duration is between 1 second to 60 minutes, c) sedimentary phase separation obtaining formation of a free water phase containing hydrated mucilage, d1) separation of the free water phase containing the hydrated mucilage, d2) separation of the mucilage-poor lipid phase.

After mixing the water phase with the lipid phase, in one embodiment the mixture is introduced into a container which is suitable for the separation of the phases.

Preference is given to containers which permit continuous or discontinuous filling with the mixture and which have separate outlets, via which the phases which have formed can be drained. The removal of the separated phases can also be carried out continuously or discontinuously. It is furthermore advantageous if the device additionally has an outlet, via which a mucilage layer, which forms in the region of the phase boundary and/or in the region at the bottom of the container, can be discharged separately. Preference is given to containers with a high aspect ratio between the height and the width. Preference is given to containers which have a conical bottom shape. Also preferred is a device which allows visual inspection of phase formation as well as the detection of the phase boundaries, e.g., provided by an inspection glass (viewing glass). The required duration of the phase separation depends on the amount and composition of the hydratable mucilages contained in the lipid phase, the added volume of the aqueous phase and other process parameters (intensity of the mixed process, temperature of the water or the lipid phase, etc.). To utilize the advantageous aspects of the process according to the invention, the duration of phase separation should be selected such that the water content in the clarified lipid phase is preferably <3% by weight, more preferably <1.5% by weight and more preferably <0.5 wt.-%. This period of time is also referred to below as "settling time" or "separation time" or "sedimentation time". Preferably, the duration of the sedimentary phase separation should be between 10 seconds and 7 days, more preferably between 5 minutes and 48 hours, and more preferably between 15 minutes and 6 hours.

If more rapid phase separation is desired than is achieved by pure sedimentation, either the process parameters of a previously described process may be varied (e.g., use of a larger water volume fraction (water volume ratio) or selection of another acid or base forming compound) or one of the methods described below for accelerating the phase separation may be used.

The lipid phases obtained after the separation of phases preferably contain <20% by weight of the amount of mucilage which was present before the process and which can be hydrated with the process step carried out, more preferably the lipid phases contain <10% by weight of the amount of mucilage as compared prior to the process step and more preferred are lipid phases in which the amount of mucilage that can be hydrated with the process step carried out is reduced to <5% by weight compared to the amount that was present before the process step was carried out. Further preferred is a process wherein >80% by weight of the mucilage present in the lipid phase prior to separation of phases and hydratable with the process step is obtained in a water phase, more preferably >90% by weight and most preferred is to obtain >95% by weight of the hydratable mucilages from a lipid phase in a water phase. Depending on the content of hydratable mucilages, the obtained lipid phase can have the desired specification or can undergo further downstream purification.

The invention thus also relates to a process for the multistage aqueous purification of lipid phases.

In a variant of the method, a process for separation of phases from the prior art is carried out in order to improve the separation of hydrated mucilages still present in the lipid phase or the water phase. Preferred for this purpose are centrifugal processes using e.g. separators or decanters and methods for coalescence of phases, e.g. using coalescers. However, this is preferably done after the spontaneous formation of a free water phase or a separation time, respectively, which is required for the completion of a complete hydration/complexation. In another variant of the method, the lipid phase obtained after a separation of phases is fed to a further process stage according to the invention.

Preference is given to a process for purifying a lipid phase and/or for separating mucous substances, in which an acidic or basic aqueous solution having a volume fraction that is as high as required to enable spontaneous phase separation after admixing to the lipid phase and where the residual content of water and/or mucilage within the sedimentively clarified lipid phase is removed by means of centrifugal or coalescing processes.

According to the invention, the object is achieved by a method for purifying lipid phases containing mucilage, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, assuring formation of a free water phase after the mixing process c) sedimentary phase separation obtaining a mucilage-containing water phase and a mucilage-poor lipid phase, c1) clarifying the lipid phase of process step c) by a coalescence and/or centrifugal process, d1) separation of the mucilage-containing water phase obtainable from c) and/or c1), d2) separation of the mucilage-poor lipid phase, obtainable from c) and/or c1).

Therefore, the present invention is also directed at a method for purifying a lipid phase and/or for separating mucilage from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase c) sedimentary phase separation obtaining a free water phase containing hydrated mucilage and a low-mucus lipid phase c1) clarifying the lipid phase of process step c) by a coalescence and/or centrifugal process, d1) separation of the free water phase containing the hydrated mucilage, d2) Separation of the mucilage-poor lipid phase.

However, the clarification of the lipid phase by means of coalescence and/or centrifugal processes can also take place in a step d2a) after step d2).

Thus, one embodiment of the present invention is a method of purifying a lipid phase and/or separating lipid phase mucilages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining formation of a free water phase containing hydrated mucilage, d1) separation of the free water phase containing the hydrated mucilage, d2) separation of the mucilage-poor lipid phase, d2a) clarification of the lipid phase of process step d2) by a coalescence and/or centrifugal process.

A further embodiment of the present invention is a method for purifying a lipid phase and/or for separating mucilage from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, assuring formation of a free water phase after the mixing process c) sedimentary phase separation obtaining formation of a water phase containing hydrated mucilage, d1) separation of the free water phase containing the hydrated mucilages, d2) separation of the mucilage-poor lipid phase, d2a) clarification of the lipid phase of process step d2) by a coalescence and/or centrifugal process.

The aqueous phase, which forms during the phase separation, can be discharged continuously or discontinuously from the separation vessel. In a variant of the method, the discharged water phase is passed into a further settling tank in order to sedimentively separate solid and/or suspended matter present in the water phase.

In other process variants, methods from the prior art for the separation of solid/suspended matter can be used. Suitable methods include the use of filters, separators or decanters. The resulting clear water phases can then be repeatedly used for the purification steps.

For carrying out the purification of lipid phases according to the invention, aqueous solutions containing base- or acid-forming compounds are used. These aqueous solutions enable and/or improve the hydration of mucilage. The effect on the different mucilages varies with the different compounds. In order to select one or more base- or acid-forming compound (s) suitable for a process step of the invention, a preliminary test may be conducted by a test method for the hydration of mucilages as described herein. By this method, it can be quickly and easily determined which aqueous solution of base- or acid-forming compounds and with which volume ratio of these aqueous solutions to the liquid phase it is possible to completely hydrate mucilages and that then will be transferred into an aqueous phase. It is advantageous to use a basic or acidic solution which hydrates the largest possible number of mucilages at the same time. However, this can lead to a very large volume fraction of the aqueous solution (e.g., >50% by volume) having to be added to the lipid phase and/or a long settling time for a spontaneous separation (phase separation) of the water/mucilage phase from the lipid phase. In such a case, it is advantageous to first carry out a cleaning step from the prior art or according to the method for the invention, with which at least partial removal of mucilage can be achieved. On the other hand, the process of the present invention makes it very easy to ascertain whether mucilage substances can be hydrated with an aqueous solution containing a base- or acid-forming compound and/or can be separated. With a very low or absent hydration of mucilage a phase separation occurs very quickly and/or only a small amount of hydrated mucilage will be present at the phase boundary, even after admixture of a small volume ratio of an aqueous solution containing base- or acid-forming compounds. In this case, it is advantageous to choose an aqueous solution with another base- or acid-forming compound with which a more effective separation of hydratable mucilages contained in the lipid phase can be separated. From these aspects of the method according to the invention, there are further extremely advantageous effects of the process technology. Thus, without prior knowledge of the type and amount of mucilaginous substances present in a lipid phase it can be determined whether complete hydration and separation of mucilage by or in an aqueous medium can be carried out and in which order the process procedures can be performed, without equipment (analytical) effort, by performing a series of tests, as described herein, with variations of the procedures of the invention and, with one or more of the method step(s) and/or a combination with process steps of the prior art. According to the technical teaching of the present invention, it is advantageous in lipid phases that have a high proportion of mucilage, which is measurable e.g. by the determination of the content of phosphorus-containing compounds (e.g., a phosphorus content of >50 mg/kg) or of free fatty acids (e.g. >1.5% by weight), to use a prepurification method according the art, such as a water degumming, or apply the inventive method with an acid-forming aqueous solution. The prepurified lipid phase is then suitable to be processed with an aqueous solution containing a base-forming compound according to one of the methods of the invention.

With the method according to the invention, lipid phases of different origin and composition can be treated and the hydratable mucilages contained herein extracted. The lipid phases may be oils or fats of plant, animal, microbial, synthetic or fossil origin. In this case, the lipid phases to be treated can be present in a native form or the lipid phases to be treated have already been subjected to a purification process.

The aqueous solutions of the invention contain compounds which are acid or base forming. Such compounds are known in the art. Particularly suitable base-forming compounds are sodium hydroxide, potassium hydroxide, aluminum hydroxide, ammonium hydroxide, carbonates such as sodium carbonate, sodium hydrogen carbonate, sodium bicarbonate, potassium carbonate and potassium bicarbonate, silicates such as sodium metasilicate, sodium orthosilicate, sodium disilicate, sodium trisilicate and potassium silicate, furthermore acetates such as sodium acetate, borates, such as sodium borate, amidino and/or guanidine group-carrying compounds, such as arginine, according to the formula given in the Definitions section, as well as mixtures of the aforementioned compounds and with other compounds. Also suitable are calcium hydroxide, sodium sulfate, potassium sulfate, calcium sulfate, sodium phosphate, potassium phosphate, calcium phosphate, sodium citrate, potassium citrate, calcium citrate, aluminum citrate, and mixtures thereof or hereby. Preferred are sodium carbonate, sodium hydrogen carbonate, sodium bicarbonate, sodium metasilicate, amidino and/or guanidine group containing compounds, especially arginine, as well as combinations thereof.

The application according to the invention also extends to other base-forming substances and to combinations of the abovementioned and other compounds. The concentration and/or mixing ratio is freely selectable, the appropriate concentrations of the aqueous phases are easy to determine by a person skilled in the art.

This is due to the process technology according to the invention, in which even with a low concentration of the acid- or base-forming compound in the water phase, a sufficient amount of these compounds can be ensured by adding an excess of the water phase with respect to the compounds to be hydrated. At the same time, despite the excess of basic or acidic compounds added, loss of these compounds can be avoided since the compounds not involved in hydration and/or complexation with the hydratable mucilage compounds are not bound and therefore remain unbound in the free water phase. The reusability of the aqueous phases and of the acid- or base-forming compounds contained therein is also promoted by the fact that the aqueous phases obtained by sedimentation are virtually free of emulsions. This is not the case with the so-called "heavy phases" which are obtained by centrifugal separation of water-in-oil emulsions prepared using a small volume of water (water volume ratio). Furthermore, the separability of hydrated mucilage discharged as sediment into the water phase is greatly simplified by the absence of neutral fats, the mucilages present in the process step d1) are filterable solid complexes in many applications.

The process technology according to the invention considerably simplifies the selection of a suitable concentration, or a concentration range, of the acid- or base-forming compounds which can be used, in which sufficient hydration of the mucilages is possible. Preferably, concentrations of the basic solutions are between 0.01 and 5 molar, more preferably between 0.5 and 2 molar, and most preferably between 0.8 and 1.5 molar.

In one embodiment, compounds containing amidine and/or guanidine groups are used as basic compounds as described herein. These compounds are used completely dissolved in an aqueous medium, which should preferably be ion-free or ion-poor, in a concentration range of from 0.001 to 0.8 molar, more preferably from 0.01 to 0.7 molar, and most preferably from 0.1 to 0.6 molar.

The base-forming compounds are preferably dissolved in ion-free or ionic water, but it is also possible to use mineral salt-containing process water to dissolve the compounds. Methods for dissolving such compounds are known to the person skilled in the art. The pH of the solutions is preferably in a range between 7 and 14, more preferably between 8 and 13 and more preferably between 9 and 12.

For the hydration of mucilage acid-forming compounds are also suitable. Particularly suitable are acid-forming compounds, for example, hydrochloride, phosphoric acid, sulfuric acid, boric acid, citric acid or oxalic acid. Other acids of the prior art are also suitable. The selection of the concentrations, a mixture of different acids or the mixing ratio of different acids is carried out analogously to that of the basic compounds. The same applies to the preparation of the aqueous solutions containing acid-forming compounds. The pH of the solutions is preferably in a range between 6.9 and 1, more preferably between 5 and 1.5 and more preferably between 3 and 1.8.

It is advantageous if, in addition to the hydration of all hydratable oil accompanying substances which is accomplished by the acidic or basic excess of water, complexation of the hydrated oil accompanying substances is achieved at the same time.

With the test method for the complete hydration of mucilages described herein, it is possible for the skilled person to decide which of the possible process steps and/or in which combination and sequence of acidic or a basic aqueous solution the procedure should be performed in a multistage purification process. The procedure is basically freely selectable, so that different possibilities of the arrangement of the method result:

I. sole acid treatment,
  II. sole base treatment,
  III. first acid treatment, then base treatment,
  IV. first base treatment, then acid treatment,
  V. repeated acid treatment,
  VI. repeated base treatment.

Sole acid treatment according to I. means that process step b) is carried out with a water phase containing at least one acid-forming compound. Accordingly, the sole base treatment according to II. is to be understood as meaning that process step b) is carried out with a water phase containing at least one base-forming compound.

The method arrangement III. is carried out so that first the acid treatment is carried out and following the process step d2) the base treatment is performed. The process arrangement IV. differs only in the order of addition of the acid solution and base solution.

The selection of the most suitable and cost-effective method or method arrangement can easily be made by a person skilled in the art, since it can be very easily and reliably assessed with the method of investigation given here whether complete depletion of hydratable mucilages is possible with the method steps or method arrangement. This is achieved when no mucilages can be separated off anymore from the lipid phase treated with an aqueous solution of the basic or acidic compounds with one or more processing devices, which is evident, e.g. by visibly dissolved mucilage which are in the water phase. However, the completeness of the depletion of mucilage can also be determined by an analysis of oil indices (e.g., phosphorus, alkaline earth metals, free fatty acids).

Another aspect of the invention relates to procedures and methods which have an influence on the sedimentation and/or separation time of the emulsions prepared by one of the process steps according to the invention until sufficient phase separation has been achieved.

The spontaneous separation (phase separation) of the water and the lipid phase according to the invention can be accelerated by various procedural embodiments. Surprisingly, it has been shown that the separation of phases (phase separation) proceeds significantly faster when the emulsion consisting of the water and the lipid phase was heated.

In this case, moderate heating, which can be done before, during and/or after admixture of the water phase into the lipid phase, is sufficient. It is advantageous to mix the heated emulsion for a period of up to 3 hours, more preferably between 1 and 60 minutes and more preferably between 5 and 15 minutes. It is advantageous to heat the emulsion to a temperature between 30° C. and 100° C., more preferably between 35° C. and 80° C. and most preferably between 40° C. and 65° C.

A preferred embodiment according to the invention is a method for purifying a lipid phase and/or for separating mucus from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining formation of a free water phase containing hydrated mucilages, wherein the sedimentary phase separation takes place at a temperature between 40° C. and 65° C., d1) separation of the mucilage-containing water phase, d2) separation of the mucilage-poor lipid phase.

A particularly preferred embodiment according to the invention is a method for purifying a lipid phase and/or for separating mucus from a lipid phase comprising the following steps:

a) provision of a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentative phase separation obtaining a free water phase containing hydrated mucilages, wherein the sedimentary phase separation takes place at a temperature between 40° C. and 65° C., d1) separation of the free water phase containing the hydrated mucilage, d2) separation of the mucilage-poor lipid phase.

Another particularly embodiment according to the invention is a method for purifying a lipid phase and/or for separating mucous substances from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentative phase separation obtaining formation of a free water phase containing hydrated mucilages, wherein the sedimentary phase separation takes place at a temperature of between 40° and 65° C., d1) separation of the free water phase containing the hydrated mucilage, d2) separation of the mucilage-poor lipid phase.

In a further particularly advantageous embodiment of the process technology, an acceleration of the phase separation of the emulsions produced is achieved by coalescing. Coalescence separators are known from the prior art. The mode of action is based on two immiscible liquids, which are in the form of an emulsion, coming into contact with a hydrophilic or hydrophobic surface to adhere hydrophilic or lipophilic droplets to the surfaces of the precipitator and coalescing the adhering droplets with each other to form larger droplets, thus, forming a uniform phase. In the presence of surfactants, the effectiveness of this deposition technique is significantly reduced. It has thus been found that in emulsions in which basic or acidic aqueous solutions containing one of the compounds listed herein have been admixed to the oils in a volume ratio of up to 3%, separation of phases (phase separation) by means of a coalescing separator is not possible.

On the other hand, with adequate hydration of the mucilaginous substances according to one of the methods according to the invention, the formation of a mucilage-containing water phase and a clarified lipid phase was achieved by passage through a coalescence separator. Therefore, it is particularly advantageous to carry out a separation of phases (phase separation) by a coalescence separator following an admixture of a water phase into a lipid phase according to the invention. It is particularly advantageous to carry out a coalescence separation, but also other separation processes, of the clarified lipid phase after the settling of a water/mucous phase have taken place already. In a particularly advantageous manner, the methods described herein for accelerating the separation of phases (phase separation) can be combined with one another. It has thus been found that the separation efficiency of a coalescence separator is increased by first heating an emulsion prepared according to the invention and subsequently passing it through a coalescence separator. It is irrelevant whether the emulsion is supplied to a coalescer in the heated state or after heating at ambient temperatures. Also, the reverse order or combinations with other processing techniques that result in coalescence, such as sonication, are suitable for accelerating phase separation.

In another embodiment, an acceleration of the separation of phases (phase separation) is accomplished by a hydrocyclone. Hydrocyclones are known in the art, they are used for the separation of liquids and solids. Surprisingly, a separation of the water and the lipid phase after a purification step according to the invention can be carried out with this method. Preferably, the emulsion should be fed to such a separator after the onset of spontaneous sedimentative phase separation. It has been found that, in particular, the forming solids and suspended matter can be separated off very efficiently together with the water phase by the abovementioned processes. In another preferred embodiment, the emulsion of a purification stage according to the invention is introduced into a settling tank, which is subjected to an elevated pressure.

In one embodiment of the process technology, a centrifugal separation process can also be used to accelerate the separation of phases (phase separation).

Preference is given to processes for accelerated separation of the lipid and water phases in emulsions which are prepared with acidic or basic aqueous solutions in which a large volume fraction of the water phase has been added to the lipid phase such that a free water phase spontaneously forms after mixing.

Preferred processes for accelerated phase separation of the emulsion produced according to the invention are heating of the emulsions and/or coalescence separation and/or ultrasound treatment.

Preferred methods for accelerated separation of phases (phase separation) of the emulsions according to the invention are centrifugal separation techniques.

An increase in the phase separation rate is also made possible by centrifugal separation techniques known in the art, such as separators, centrifuges, decanters or hydrocyclones. The aim of this process step is to accelerate the otherwise spontaneously occurring separation (sedimentation) process in which most of the water phase introduced into the lipid phase is combined with the hydrated mucilages to form a separate phase.

After the treatment of oils with a different volume fraction of aqueous solutions, and after a spontaneous (sedimentative) phase separation, an approximately equal proportion of the aqueous solution resided in the oil, independently the basic or acidic compounds used with the water phases. This was in a range of 0.1 to 5% by weight. This proportion correlated with the total amount of mucilage, which was still present in the lipid phase. At very high levels of mucilage, the water volume fraction (water volume ratio) in the oil phase after spontaneous phase separation was up to 15% by weight for the oils investigated.

Since at a high residual water content in the lipid phase after sedimentation of the water phase may be due to insufficient hydration of mucilage or a complexation of these, it should be checked whether the spontaneous separation result can be improved by selecting a different process sequence (see above). Preference is given to obtaining a lipid phase according to one or more process stages in which, after spontaneous separation or acceleration of the phase separation achieved by heating, coalescence or ultrasound or centrifugal techniques, the content of hydrated mucilages is <0.5% by weight, more preferably <0.2% by weight and more preferably <0.1% by weight, and/or the water content is <1.0% by weight, more preferably <0.5% by weight, and further preferably <0.1% by weight. Such lipid phases are clear or slightly turbid. The content of hydrated mucilages or the amount of water contained in the lipid phase can be quantified by a centrifugal or analytical method.

The time required until complete spontaneous phase separation of the emulsions is accomplished depends on the type and amount of accompanying substances present in the oil. Therefore, according to the invention, a separation time for completing a spontaneous phase separation is preferred between 10 seconds and 7 days, more preferably between 5 minutes and 48 hours, and more preferably between 15 minutes and 6 hours. The completeness of spontaneous sedimentation can be recognized by the fact that within 24 hours, following the complete spontaneous phase separation, <0.5% by weight of a free water/mucilage phase additionally settles.

The free water phases obtained by sedimentation or the use of previously described techniques for accelerating the separation were clear after a short settling time the aggregated mucilage could be separated easily.

An embodiment according to the invention is a method for purifying a lipid phase and/or for separating mucous substances from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentative phase separation with the formation of a free water phase containing hydrated mucilages, a mucilage-poor lipid phase and formation of mucilage aggregates, d1) separation of the free water phase containing the hydrated mucilage, d2) separation of the mucilage-poor lipid phase.

A particularly advantageous effect resulting from the process technology according to the invention is that, after a phase separation which has taken place either spontaneously or by the processes described herein for accelerating the phase separation, condensation of the mucilages in the region of the phase boundary occurs. This "mucilaginous phase" can be in the form of a continuous mucous-like aqueous phase up to macroscopically visible complex aggregates of semisolid consistency (see FIGS. 5 and 6). In principle, different phase separation methods known to the person skilled in the art are also suitable here. However, sedimentation, coalescence and centrifugal processes are preferred, and particularly preferred is sedimentation.

Therefore, one embodiment of the present invention is a method for purifying a lipid phase and/or for separating mucilage from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilages and/or a mucilage phase, d1) separation of the free water phase containing hydrated mucilage and/or a mucilage phase, d2) separation of the mucilage-poor lipid phase.

Therefore, one embodiment of the present invention is a method for purifying a lipid phase and/or for separating mucilage from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage and a mucilage phase, d1) separation of the mucilage-containing free water phase,
d1b) separation of the mucilage phase,
d2) separation of the mucilage-poor lipid phase.

When separated together with the water phase, the mucilage phase can be very easily separated, from the otherwise clarified oil phase, e. g., by means of a separating funnel, whereby only minor parts of the oil phase are co-separated. Separation of the hydrated mucilages from the residual water content and from the oil contained in the mucilage phase is very easy using a centrifugal separation technique, without resulting in a relevant emulsion of any of the obtainable phases. The phases, consisting of water, mucilages and oil, may e.g. be separated very easily in a decanter into three separate phases. A further advantage in the separation of the mucilage phase has been found in that macroscopically visible aggregates of mucilage produced by the action of the acidic or basic solutions of the invention after a spontaneous phase separation in the water phase and/or in the region of the phase boundary with the water phase, can be separated with the water phase. These aggregates can be separated very easily from this phase, e.g., by a skimmer. If such aggregates remain in the oil or in an emulsion, this can lead to a reduced separation efficiency when using a separator. Among others this may be caused by the fact that the aggregates are mixed when entering a separator or decanter and are finely distributed in the oil, which then makes their separation more difficult due to the small difference in density. Therefore, separation of the hydrated mucilages separately or together with the water phase prior to centrifugal phase separation of the clarified lipid phase is a particularly advantageous embodiment of the method.

Preferred is a method in which a method of accelerating the phase separation is used.

Preferred is a method in which hydrated and complexed mucins are separated by a phase separation acceleration method, these methods being sedimentation, a coalescence method or a centrifugal method.

Preferred is a process in which hydrated and complexed mucilages are separated by a phase separation process, these processes being sedimentation, coalescence or centrifugal processes, where mucilage concentrated at the phase boundary of the water phase to the oil phase are separated from the oil phase.

Preference is furthermore given to a process where in step c) phase separation of the phases and/or of the reaction mixture is initiated and/or accelerated by heating and/or a coalescence process and/or a centrifugal process.

Particular preference is furthermore given to a process where in step c) a sedimentative phase separation of the phases and/or of the reaction mixture is initiated and/or accelerated by heating and/or a coalescence process and/or a centrifugal process.

Therefore, one embodiment of the present invention is a method for purifying a lipid phase and/or for separating mucilages from a lipid phase comprising the following steps:
a) providing a lipid phase containing mucilage,
b) adding and admixing a water phase containing at least one acid- or base-forming compound having a volume ratio of >5% by volume between the volume of the water phase and the total volume of lipid phase and water phase before admixing the water phase,
c) sedimentative phase separation obtaining a free water phase containing hydrated muclages, whereby sedimentative phase separation of the phases and/or the reaction mixture is initiated and/or accelerated by heating and/or a coalescence process and/or a centrifugal process,
d1) separation of the free water phase containing the hydrated mucilage,
d2) separation of the mucilage-poor lipid phase.

Thus, one embodiment of the present invention relates to a method for purifying lipid phases and/or for separating mucilages from a lipid phase comprising the following steps:
a) providing a lipid phase containing mucilage,
b) adding and admixing a water phase containing at least one acid- or base-forming compound having a volume ratio of >5% by volume between the volume of the water phase and the total volume of lipid phase and water phase before admixing the water phase and/or a water volume ratio, assuring formation of a free water phase after the mixing process,
c) sedimentative phase separation obtaining a free water phase containing hydrated mucilages, whereby sedimentative phase separation of the phases and/or the reaction mixture is induced and/or accelerated by heating and/or a coalescence process and/or a centrifugal process,
d1) separation of the mucilage-containing water phase,
d2) separation of the mucilage-poor lipid phase.

In a particularly preferred embodiment of the process, a phase separator is used for separating the sedimentation which was obtained by means of the methods described herein for accelerating the sedimentation of the water and mucilage phases. This consists in the simplest case of a container (vessel) which has an inlet for the phases to be separated and at least 2 outlet ports, which are arranged at different heights from the bottom and by which the oil phase, the water phase and optionally the mucilage phase can be continuously or discontinuously removed to separate containers. Optionally, a visual check of the state of the phase boundaries is carried out to control the inflow and outflow quantities.

The lipid phases obtained by spontaneous phase separation have only a small residual content of mucilages which were hydratable by the process step carried out. It is in particularly advantageous that, since the largest part of the hydrated mucilages has already been removed, a substantially higher oil throughput through a separator, a centrifuge or a decanter can be achieved, while at the same time achieving a higher degree of efficiency of separating off the mucilages and residual water still present in the lipid phase, as is the case with a similar phase separation of emulsions that were produced with only a small water volume that have been admixed. In all emulsions prepared by a method according to the invention, the residual amount of hydrated mucilages and/or aqueous phase present in the lipid phases after spontaneous phase separation or after phase separation with a method for accelerated phase separation described herein could be separated by means of a centrifuge, separators or decanters resulting in a clear oil phase and a clear water phase, with a minimum content of solids and without emulsification. Thus, in one embodiment of the invention, a centrifugal phase separation for the separation of residual mucilage/water can be performed in step d2a).

Preference is given to a process for purifying lipid phases and/or for separating mucilages, in which, after a spontaneous separation of phases (phase separation) or by a process for accelerated separation of phases, the heavy and/or light phases obtained by a centrifugal process are emulsion-poor or emulsion-free and/or the obtained lipid phase is free of residual amounts of mucilage and water.

Such an efficient separation of hydrated mucilages and of water entrapped in the oil is not possible or possible only to a very small extent in emulsions in which no free water phase has been established due to an excess of the aqueous cleaning solution. Unless a free water phase has been formed spontaneously after preparing an emulsion with one of the aqueous basic or acidic solutions mentioned herein, virtually no mucilage/mucous substance phases separate or sedimenting mucilage aggregates are formed so that the hydrated mucilages cannot be separated off by means of a collecting or separating device. In a further preferred embodiment of the method, the lipid phase which is obtained in step d2) after sedimentation of the water phase or after separation of the water phase by a coalescence process, an ultrasonic process, an adsorption or filtration process and/or a centrifugal process, is immediately subjected to a further purification step, without a further separation of any residual amounts of hydrated mucilages and/or dissolved water which may still be present herein. It has been shown that the lipid phases obtained in this way contain only small residual amounts of hydrated mucilages and that they do not interfere with a further purification process and are transferred into the water phase as part of this purification stage. It has also been found that the small residual amounts of the aqueous basic or acidic solutions contained in a lipid phase obtained by sedimentation or one of the methods described above do not interfere when another acidic or basic compound that is used in the next purification step or an acidic or basic solution is introduced after a previous use of a basic or acidic solution with the process technology described herein. This highly advantageous aspect of the process according to the invention also results in a more economic process, since the lipid phases previously treated with an acidic or basic aqueous phase need not necessarily be fed to a centrifugal separation process for phase separation.

Preference is given to a process for the purification of lipid phases, in which a free water phase is formed/obtained by the addition of an acidic or basic aqueous solution to a lipid phase, after mixing with the lipid phase.

Preferred is a process for purifying lipid phases and/or separating mucilages, which comprises adding an acidic or basic aqueous solution to a lipid phase in a volume ratio that allows for complete hydration of all hydrophilic mucilages.

The complete hydration refers in each case to the hydration result which can be achieved with a specific compound and concentration in an aqueous medium. The acid- or base-forming compounds which can be used for carrying out the invention bring about a hydration of mucilage in different ways. For example, hydration may be based on a surfactant effect of the compound employed, or may be caused by an intermolecular energetic interaction or a chemical interaction of the compound employed with a mucilage or by a release/displacement/cleavage of compounds on mucilage or mucilage complexes. Therefore, the amount of water with which complete hydration is accomplished in the various compounds differs and must be determined. This is very easily performed using the test method for testing complete hydration described herein. It could be shown that, after a separation of mucous substances according to the invention, during the repeated execution of the test procedure of the lipid phase of step d2) no more hydration and separation of mucilage is possible. Here too, it can be recognized that sufficient hydration of the mucilage substances has taken place in the preceding process step. Therefore, another aspect of the present invention relates to a method for the complete hydration of mucilages in a lipid phase, where addition of an acidic or basic aqueous solution to a lipid phase in a volume ratio ensures complete hydration of all the mucilages that can be hydrated with the compound used.

Thus, one embodiment of the present invention is a method of purifying a lipid phase and/or separating lipid phase mucilages, comprising the following steps:

a) providing a lipid phase containing mucilage, b) complete hydration of the mucilage contained in the lipid phase of step a) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase.

A further embodiment of the present invention relates to a method for purifying a lipid phase and/or for separating mucilages from a lipid phase, comprising the following steps:

a) providing a lipid phase containing mucilage, b) complete hydration of the lipid phase from step a) contained mucilages by adding and admixing a water phase containing at least one acid- or base-forming compound having a volume ratio of >5% by volume between the volume of the water phase and the total volume of lipid phase and water phase before admixing the water phase and/or a water a volume ratio which allows the formation of a free water phase after admixing, c) sedimentary phase separation obtaining a water phase containing hydrated mucilage, d1) separation of the mucilage-containing water phase, d2) separation of the mucilage-poor lipid phase.

Preference is given to a process for purifying lipid phases and/or for separating mucilages, in which the addition of an acidic or basic solution to a lipid phase takes place in a volume ratio which, after mixing, allows formation of a free water phase and leads to a sedimentary separation of hydrated and/or complexed mucins/mucilages.

Surprisingly, it has also been found that the sedimentatively obtained free water phases containing acidic or basic compounds can be easily freed from dissolved hydrated mucilages contained therein and thereafter be reused for a separation process. Some of the hydrated mucilages have a lower and sometimes higher specific weight than water, so that they separate spontaneously on the surface of the water phase or at the bottom of the container. As a result, the mostly clear water phase can be recovered and reused. If finely divided particles are still present, these can be removed by conventional filtering techniques.

For the aqueous cleaning solutions thus recovered, a consistently high efficiency of the separation efficiency (i.e., the solutions could be recycled more than ten times) could be documented. When the separation efficiency decreases, further substance used for complexation should be added to the solution and dissolved therein. In the event that an accumulation (summing up) of inorganic and/or organic compounds occurs in these recovered aqueous solutions, these can be removed by suitable prior art processes. For example, an increase in the concentrations of alkaline earth ions, such as calcium or magnesium, which have been washed out of a lipid phase may be observed. Such ions can be removed, e.g., by an ion exchange method (ion exchange resins, electrophoresis) from an aqueous medium. Dissolved organic compounds may be removed from the aqueous medium, e.g., by adsorbents, e.g., activated carbon.

In a preferred embodiment of the method, the lipid phase which is obtained according to one of the method procedures according to the invention and after a sedimentary phase separation or after an accelerated phase separation as described herein, is filtered and/or mixed with a complexing agent or adsorbent. Surprisingly, it has been found that the mucilages remaining in the lipid phase and the amount of residual water can be completely removed by filtration or adsorption and/or complexing agents without subsequent centrifugal separation.

Suitable complexing or adsorbing agents include, but are not limited to, oxide compounds such as calcium oxide, magnesium oxide, aluminum oxide, zinc oxide, titanium oxide, silica oxide, iron oxide, copper oxide, barium oxide or manganese oxide. Particularly preferred are calcium oxide, magnesium oxide and aluminum oxide. Also suitable are silicates and phyllosilicates, these are preferably clays, in particular kaolin. Also preferred are zeolites and other silicatives. Preferred filter materials include, for example, cellulose compounds and Kieselguhr. Complexing agents include, for example, chelating agents, such as citric acid, tartaric acid or sodium ascorbate, and ionic compounds in which the cation and/or the anion contribute to complex formation. The complexing cations include, for example, calcium, aluminum, magnesium, copper, iron, manganese or zinc.

The complexing anions include, for example, sulfate, chloride, citrate, tartrate or acetate. The complexing agents also include polycarboxylic acids, such as EDTA. Addition of the complexing or adsorbing agents may be in the form of a powder, suspension or solution, and mixing with the lipid phase may be carried out by a blending method (e.g., stirring technique) known in the art. The required dosage of the complexing or adsorbent agent must be determined individually. This can be done by a test procedure to determine the amount beyond which there is no further adsorption or aggregation of mucilage and/or residual water. Ideally, the lipid phase is clear following such a reaction phase. The duration of the reaction phase is different for the different complexing or adsorbent agents and the lipid phases and must be determined individually. The purified lipid phases can then be decanted or filtered, and a separation of the complexing or adsorbent agent by centrifugal methods (e.g., by a separator) is also possible.

Preference is given to processes in which a lipid phase which, after addition of a basic or acidic aqueous solution according to the invention and after phase separation of the water/mucous phase(s), is treated with an adsorption, complexing and/or filtration agent in order to remove residual amounts hydrated mucilage and/or water. However, the treatment with the said means for removing residual amounts of hydrated mucilages and/or water can also be carried out after process step d2).

According to the invention, the object is also achieved by a method for purifying lipid phases containing mucilages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining a mucilage-containing water phase and a mucilage-poor lipid phase, d1) separation of the mucilage-containing water phase obtainable from c), d2) separation of the mucilage-poor lipid phase, obtainable from c), d2a) clarification of the lipid phase of process step d2) by adsorption, complexing and/or filtration agents, to remove residual amounts of mucilage and/or water.

One embodiment of the present invention is a method for purifying a lipid phase and/or for separating mucilage from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage, obtained from step c), d2) Separation of the mucilage-poor lipid phase, obtained from step c), d2a) clarification of the lipid phase of process step d2) by adsorption, complexing and/or filtration agents, to remove residual amounts of mucilage and/or water.

Preference is given to a process for purifying lipid phases and/or for separating mucous substances, in which the amount of an acidic or basic aqueous solution admixed to the lipid phase in a volume fraction is selected such large so that the residual water content of the sedimentively clarified lipid phase is <3% by weight, more preferably <1.5 wt. % and more preferably <0.5 wt. %. Thus, a method for purifying a lipid phase and/or for separating hydrated mucilages is preferred, wherein the water phase containing at least one acid- or base-forming compound is admixed to the lipid phase, so that the residual water content of the sedimentively clarified lipid phase is <3% by weight, more preferably <1.5% by weight and more preferably <0.5% by weight.

A particularly preferred embodiment of the present invention is a method for purifying a lipid phase and/or for separating mucilage from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase with a residual water content <3 wt. %.

A particularly preferred embodiment of the present invention is a method for purifying a lipid phase and/or for separating mucus from a lipid phase comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase with a residual water content of <3% by volume.

Preference is given to a process for purifying lipid phases and/or for separating mucilage/mucous substances, in which the amount of an acidic or basic aqueous solution admixed to the lipid phase in a volume fraction is large enough to accomplish spontaneous phase separation and the separated aqueous phases are used again to carry out the process. Thus, a method for purifying a lipid phase and/or for separating mucilage from a lipid phase is preferred, wherein the acidic or basic solutions obtained in step d1) are reused in the described method.

Thus, a preferred embodiment of the underlying invention is a method for purifying a lipid phase and/or for separating mucus/mucilages from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining a water phase containing hydrated mucilage, d1) separation of the mucilage-containing water phase, d2) separation of the mucilage-poor lipid phase, h) reuse of the acidic or basic aqueous solution obtained in step d1) in step b).

Thus, a preferred embodiment of the underlying invention is a method for purifying a lipid phase and/or for separating mucus/mucilages from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase, h) reusing the acidic or basic aqueous solution obtained in step d1) in step b).

A particularly preferred embodiment of the underlying invention is a method for purifying a lipid phase and/or for separating mucus/mucilages from a lipid phase, comprising the following steps:

a) providing a lipid phase containing mucilage, b) adding and admixing a water phase containing at least one acid- or base-forming compound having a volume ratio of >10% by volume between the volume of the water phase and the total volume of lipid phase and water phase before admixing the water phase c) sedimentary phase separation obtaining a free water phase containing hydrated mucilage, d1) separation of the mucilage-containing water phase, d2) separation of the mucilage-poor lipid phase, h) reusing the acidic or basic aqueous solution obtained in step d1) in step b).

Surprisingly, it has been found that mucilaginous substances which are hydrated with the processes according to the invention and are separated with step d1) form solid aggregates which bind only a small proportion of water and thus allow the acidic or base-containing aqueous solutions to be easily separated from the aggregates, which then contain almost no or no separated mucilage. This contributes significantly to the economization of the process according to the invention, since the disruption of an emulsion, as required in the processes of the prior art, is not necessary, since the water phase spontaneously separates from the forming aggregates. As a result, a greater proportion of the water phase for reuse can be recovered directly, with considerably less effort, such as, for example, by filtration, in comparison with processes in which emulsion disruption is required. A further aspect of the invention which results from this is that the nearly or completely emulsion-free water phases obtained in step d1) contain almost no or no neutral lipids. On the other hand, the separated hydrated mucilages are recovered in a water-poor and concentrated form and almost no or completely without neutral lipids. Therefore, the invention is also directed at the recovery of water-poor and neutral-fat-poor or neutral-fat-free mucilages. "Almost no" in this context means <5% by weight.

If necessary, a further purification step according to the invention can be carried out. A need for a further purification step is given when with one of the disclosed aqueous basic or acidic solutions mucilages can still be hydrated and/or separated. To demonstrate the separability of mucilage, the emulsion produced can be separated by means of a centrifugal separation technique. The detection of mucilage in the water phase can be done by visual inspection. The proof can also be done by analytical methods. After carrying out the method according to the invention, it is therefore possible to determine whether further mucilages can be separated from the lipid phase. If this is the case, the processes according to the invention can be carried out again on the lipid phases already purified by means of one of the processes according to the invention.

One embodiment of the underlying invention is thus a method for purifying a lipid phase and/or for separating mucilage from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase, i) determining whether further separability of mucilages from the lipid phase obtained from step d2) is possible and, in the event of further separability, re-applying the method to the lipid phase from step d2).

Another embodiment of the underlying invention is a method for purifying a lipid phase and/or for separating mucilage from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining a water phase containing hydrated mucilage, d1) separation of the mucilage-containing water phase, d2) separation of the muculage-poor lipid phase, i) determining whether further separability of mucilage from the lipid phase obtained from step d2) is possible and, in the event of further separability, re-applying the method to the lipid phase from step d2).

A further embodiment of the underlying invention is therefore a method for purifying a lipid phase and/or for separating mucous/mucilage substances from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining formation of a free water phase containing hydrated mucilage, d1) separation of the free water phase containing the hydrated mucilage, d2) separation of the mucilage-poor lipid phase, h) reusing the acidic or basic aqueous solution obtained in step d1) in step b), i) determining whether further separability of mucilage from the lipid phase obtained from step d2) is possible and, in the event of further separability, re-applying the method to the lipid phase from step d2).

Another embodiment of the underlying invention is a method for purifying a lipid phase and/or for separating mucilage from a lipid phase, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining formation of a free water phase containing hydrated mucilage, d1) separation of the mucilage-containing water phase, d2) separation of the mucilage-poor lipid phase.

h) reuse the acidic or basic aqueous solution obtained in step d1) in step b).

i) determining whether further separability of mucilage from the lipid phase obtained from step d2) is possible and, in the event of further separability, re-applying the method to the lipid phase from step d2).

In this embodiment, the steps h) and i) are interchangeable or can also be carried out in parallel. If further separability of mucilages from the lipid phase from step d2) is possible, re-application of the method to said lipid phase can be carried out using the already used or another acidic or basic solution (see step h)).

In another aspect of the invention, the hydration of mucilages allows them to be easily removed and separated from a lipid phase, whereby the separated mucilages can be recovered for further use. The organic compounds referred to herein as mucilage may be both: hydratable by a water phase and may be also be predominantly apolar. These hydratable mucilages include, but are not limited to, the following organic compound groups: waxes, wax acids, lignins, hydroxy and mycolic acids, fatty acids having aliphatic or cyclic hydrocarbon structures, such as shikimic acid or 2-hydroxy-11-cycloheptyl-linnicanoic acid, mannosteryl erythritol lipid, carotenoids and carotenoids, chlorophylls, and their degradation products, phenols, phytosterols, in particular β-sitosterol and campesterol and sigmasterol, sterols, sinapine, squalene. Phytoestrogens, e.g., isoflavones or lignans. Furthermore, steroids and derivatives thereof, such as saponins, glycolipids and glyceroglycolipids and glycerosphingolipids, furthermore rhamnolipids, sophrolipids, trehalose lipids, mannosterylerythritol lipids. Also polysaccharides, including pectins such as rhamnogalacturonans and polygalacturonic acid esters, arabinans (homoglycans), galactans and arabinogalactans, as well as pectic acids and amidopectins. Furthermore, phospholipids, in particular phosphotidylinositol, phosphatides, such as phosphoinositol, furthermore long-chain or cyclic carbon compounds, furthermore fatty alcohols, hydroxy and epoxy fatty acids. Likewise glycosides, lipo-proteins, lignins, phytate or phytic acid as well as glucoinosilates. Proteins, including albumins, globulins, oleosins, vitamins, e.g., retinol (vitamin A1) and derivatives such asretinoic acid, riboflavin (vitamin B2), pantothenic acid vitamin B5), biotin (vitamin B7), folic acid (vitamin B9), cobalamins (vitamin B12), calcitriol (vitamin D) and derivatives, tocopherols (vitamin E) and tocotrienols, phylloquinone (vitamin K) as well as menaquinone. Furthermore tannins, terpenoids, curcumanoids, xanthones. But also sugar compounds, amino acids, peptides, including polypeptides, but also carbohydrates, such as glucogen.

Another aspect of the underlying invention is therefore also directed at a method for obtaining lipid phase mucilage by the methods of the invention described herein. The hydrated mucilages can be isolated from said water phase after separation of the mucilage-containing water phase and the mucilage-poor lipid phase. In step c) the hydrated mucilages are transferred into a water phase and can be obtained from it in a step e).

A preferred embodiment of the present invention is therefore a method according to claim 1 for obtaining mucilages from a lipid phase, further comprising the following step:

e) separation of the mucilage from the free water phase containing the hydrated mucilage and obtainment of the mucilage.

The present invention is thus directed at a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining formation of a free water phase containing hydrated mucilage, d1) separation of the mucilage containing water phase, d2) separation of the mucilage-poor lipid phase.

The present invention is thus directed at a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining formation of a free water phase containing hydrated mucilage, d1) separation of the free water phase containing the hydrated mucilage, d2) separation of the mucilage-poor lipid phase.

e) separation of the mucilages from the free water phase containing the hydrated mucilages of step d1) and the obtainment of the mucilages.

The present invention is also directed at a process for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage, d2) separation of the mucilage-poor lipid phase, e) separation of the mucilages from the water phase of step d1) and the obtainment of the mucilage.

The present invention is also directed at a process for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining formation of a free water phase containing hydrated mucilage, d1) separation of the free water phase containing the hydrated mucilage, d2) separation of the mucilage-poor lipid phase, e) separation of the mucilage from the free water phase containing the hydrated mucilage and obtainment of the mucilage.

Step e) may also follow step d1) of the inventive methods described herein.

One embodiment of the present invention is a method for obtaining mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, and/or a water volume ratio which allows the formation of a free water phase after admixing c) sedimentary phase separation obtaining formation of a free water phase.

d1) separation of the free water phase containing the hydrated mucilage, d2) separation of the mucilage-poor lipid phase, e) separation of the mucilage from the free water phase containing the hydrated mucilage and obtainment of the mucilage.

An embodiment of the present invention is also a process for obtaining mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing c) sedimentary phase separation obtaining formation of a free water phase containing hydrated mucilage, d1) separation of the mucilage-containing water phase, d2) separation of the mucilage-poor lipid phase, e) separation of the mucilage from the mucilage-containing water phase and obtainment of the mucilage.

One embodiment of the present invention is thus a method for obtaining mucilages from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, that ensures complete hydration of hydratable mucilage, c) sedimentary phase separation obtaining a free water phase containing hydrated mucilage, d1) separation of the mucilage-containing water phase, d2) separation of the mucilage-poor lipid phase, e) separation of the mucilage from the mucilage-containing water phase and obtainment of the mucilage.

A further embodiment of the present invention is thus a method for purifying lipid phases and/or for separating mucous/mucilage substances from a lipid phase comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, which ensures the complete hydration of hydratable mucilages, c) sedimentary phase separation obtaining formation of a free water phase containing hydrated mucilage, d1) separation of the free water phase containing the hydrated mucilage, d2) separation of the mucilage-poor lipid phase, e) separation of the mucilage from the mucilage-containing water phase and obtainment of the mucilage.

One embodiment of the present invention is a process for obtaining mucilage, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining formation of a mucilage-containing water phase and a mucilage-poor lipid phase, c1) clarifying the lipid phase of process step c) by a coalescence and/or centrifugal process, d1) separation of the mucilage-containing water phase, d2) separation of the mucilage-poor lipid phase.

One embodiment of the present invention is therefore a method for obtaining lipid phase mucilages, comprising the following steps:

a) providing a lipid phase containing mucilage, a1) investigating the hydratability of the mucilages present in the lipid phase of step a) by admixing increasing volumes of water with at least one acid- or base-forming compound until a free water phase is formed after the mixing process, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after admixing, c) sedimentary phase separation obtaining a free water phase containing hydrated mucilage, d1) separation of the mucilage-containing water phase, d2) separation of the mucilage-poor lipid phase, e) separation of the mucilage from the mucilage-containing water phase and obtainment of the mucilage.

Another embodiment of the present invention is a method for obtaining lipid phase mucilage comprising the following steps:

a) providing a lipid phase containing mucilage, a1) investigating the hydratability of the mucilages present in the lipid phase of step a) by admixing increasing volumes of water with at least one acid- or base-forming compound until a free water phase is formed after admixing, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase.

e) separation of the mucilage from the free water phase containing the hydrated mucilage and obtainment of the mucilage.

Therefore, one embodiment of the present invention is a method for obtaining lipid phase mucilage comprising the following steps:

a) providing a lipid phase containing mucilage, b) complete hydration of the lipids contained in step a) mucilage by adding and admixing a water phase containing at least one acid- or base-forming compound having a volume ratio of >5% by volume between the volume of the water phase and the total volume of lipid phase and water phase before admixing the water phase c) sedimentative phase separation obtaining a free water phase containing the hydrated mucilage, d1) separation of the free water phase containing the hydrated mucilage, d2) separation of the mucilage-poor lipid phase, e) separation of the mucilage from the free water phase containing the hydrated mucilage and obtainment of the mucilage.

Another embodiment of the present invention relates to a method for obtaining lipid phase mucilage, comprising the following steps:

a) providing a lipid phase containing mucilage, b) complete hydration of the mucilage-containing lipid phase from step a) by adding and admixing a water phase containing at least one acid- or base-forming compound having a volume ratio of >5% by volume between the volume of the water phase and the total volume of lipid phase and water phase before admixing the water phase and/or a water volume ratio which allows the formation of a free water phase after the mixing process, c) sedimentary phase separation obtaining a free water phase containing hydrated mucilage, d1) separation of the mucilage-containing water phase, d2) separation of the mucilage-poor lipid phase, e) separation of the mucilage from the mucilage-containing water phase and obtainment of the mucilage.

The present invention is thus directed at a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio which allows the formation of a free water phase after the mixing process by means of a stirring and/or an intensive mixing procedure, so that a complete hydration of all hydratable mucilage with the process step is achieved.

c) sedimentary phase separation obtaining formation of a free water phase containing hydrated mucilage, d1) separation of the mucilage-containing water phase, d2) separation of the mucilage-poor lipid phase, e) separation of the mucilage from the mucilage-containing water phase and obtainment of the mucilage.

A further embodiment of the present invention therefore relates to a method for obtaining lipid phase mucilage, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process by means of a stirring and/or intensive mixing procedure, so that a complete hydration of all hydaratable mucilages can be achieved with the process step, c) sedimentary phase separation obtaining a free water phase containing hydrated mucilage, d1) separation of the mucilage-containing water phase, d2) separation of the mucilage-poor lipid phase, e) separation of the mucilage from the mucilage-containing water phase and obtainment of the mucilage.

Another embodiment of the invention is a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process being mixed by means of an intensive mixing procedure until spontaneous formation of a free water phase after mixing, c) sedimentary phase separation obtaining formation of a free water phase containing hydrated mucilage, d1) separation of the mucilage-containing water phase, d2) separation of the mucilage-poor lipid phase, e) separation of the mucilage from the mucilage-containing water phase and obtainment of the mucilage.

Another embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, being mixed by means of an intensive mixing procedure until a free water phase spontaneously forms after mixing, c) sedimentary phase separation obtaining formation of a free water phase containing hydrated mucilage, d1) separation of the free water phase containing the hydrated mucilage, d2) separation of the mucilage-poor lipid phase, e) separation of the mucilage from the free water phase containing the hydrated mucilage and obtainment of the mucilage.

Another embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process c) sedimentary phase separation obtaining a mucilage-containing free water phase and a mucilage-poor lipid phase, d1) separation of the mucilage-containing water phase obtainable from c), d2) separation of the mucilage-poor lipid phase, obtainable from c), d2a) clarification of the lipid phase of process step d2) by adsorption, complexing and/or filtration agents, for removal of residual amounts of mucilage and/or water, e) separation of the mucilage from the mucilage-containing water phase and obtainment of the mucilage.

Another embodiment of the present invention is a method for obtaining lipid phase mucilage comprising the following steps a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage obtained from step c), d2) separation of the mucilage-poor lipid phase, obtained from step c), d2a) clarification of the lipid phase of process step d2) by adsorption, complexing and/or filtration agents, for removing residual amounts of mucilage and/or water, e) separating the mucilages from the free water phase containing the hydrated mucilage, and obtaining the mucilage.

Another embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, being mixed by means of an intensive mixing procedure until a free water phase spontaneously forms after mixing, c) sedimentary phase separation obtaining a free water phase containing hydrated mucilage, d1) separation of the free water phase containing the hydrated mucilage, d2) separation of the mucilage-poor lipid phase, e) separation of the mucilage from the free water phase containing the hydrated mucilage and obtainment of the mucilage.

Another embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process c) sedimentary phase separation obtaining a mucous-containing free water phase and a mucilage-poor lipid phase, d1) separation of the mucilage-containing water phase obtainable from c), d2) separation of the mucilage-poor lipid phase, obtainable from c), d2a) clarification of the lipid phase of process step d2) by adsorption, complexing and/or filtration agents, for removal of residual amounts of mucilage and/or water, e) separation of the mucilage from the mucilage-containing water phase and obtainment of the mucilage.

Another embodiment of the present invention is a method for obtaining lipid phase mucilage comprising the following steps a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage obtained from step c), d2) separation of the mucilage-poor lipid phase, obtained from step c), d2a) clarification of the lipid phase of process step d2) by adsorption, complexing and/or filtration agents, for removing residual amounts of mucilage and/or water, e) separating the mucilages from the free water phase containing the hydrated mucilage, and obtaining the mucilage.

In one embodiment of the present invention, a method for obtaining mucilages from a lipid phase comprises the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentative phase separation obtaining a free water phase containing hydrated mucilages, heating and/or accelerating the sedimentative phase separation by heating and/or a coalescence process and/or a centrifugal process of the phases and/or the reaction mixture, d1) separation of the free water phase containing the hydrated mucilage, d2) separation of the mucilage-poor lipid phase, e) separation of the mucilage from the free water phase containing the hydrated mucilage and obtainment of the mucilage.

Thus, one embodiment of the present invention relates to a method for obtaining lipid phase mucilage, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio which allows the formation of a free water phase after the mixing process, c) sedimentative phase separation obtaining a free water phase containing hydrated mucilages, heating and/or accelerating the sedimentative phase separation by heating and/or a coalescence process and/or a centrifugal process of the phases and/or the reaction mixture, d1) separation of the mucilages-containing water phase, d2) separation of the low-mucus lipid phase, e) separation of the mucilage from the mucilage-containing water phase and obtainment of the mucilage.

A preferred embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase with a residual water content of <3% by weight, e) separation of the mucilage from the free water phase containing the hydrated mucilage and obtainment of the mucilage.

A preferred embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process, c) sedimentary phase separation obtaining formation of a free water phase containing hydrated mucilage, d1) separation of the mucilage-containing water phase, d2) separation of the mucilage-poor lipid phase with a residual water content of <3% by volume, e) separation of the mucilage from the mucilage-containing water phase and obtainment of the mucilage.

Therefore, one embodiment of the present invention is a method for obtaining lipid phase mucilages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage, d2) separation of the mucilage-poor lipid phase, d2a) clarification of the lipid phase of process step d2) by a coalescence and/or centrifugal process.

Another embodiment of the present invention is a method for obtaining mucilages from lipid phases, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process, c) sedimentary phase separation obtaining a free water phase containing hydrated mucilages, d1) separation of the free water phase containing the hydrated mucilage, d2) separation of the mucilage-poor lipid phase, d2a) clarification of the lipid phase of process step d2) by a coalescence and/or centrifugal process.

A preferred embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining formation of a free water phase containing hydrated mucilage, d1) separation of the free water phase containing the hydrated mucilage, d2) separating the mucilage-poor lipid phase, said lipid phases being subjected to one or more further purification steps without the use of a centrifugal separation process, with residual amounts of mucilage and/or water still present therein, e) separation of the mucilage from the free water phase containing the hydrated mucilage and obtainment of the mucilage.

Another preferred embodiment of the present invention is a method for obtaining lipid phase mucilage comprising the steps of:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, which allows the formation of a free water phase after the mixing process c) sedimentary phase separation obtaining a free water phase containing hydrated mucilage, d1) separation of the mucilage-containing water phase, d2) separating the mucilage-poor lipid phase, said lipid phases being subjected to one or more further purification stages without the use of a centrifugal separation process, with residual amounts of mucilage and/or water still present therein, e) separation of the mucilage from the mucilage-containing water phase and obtainment of the mucilage.

Thus, a preferred embodiment of the underlying invention is a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio that allows the formation of a free water phase after the mixing, c) sedimentary phase separation obtaining a free water phase containing hydrated mucilage, d1) separation of the mucilage-containing water phase, d2) separation of the mucilage-poor lipid phase, e) removal of the mucilage from the mucilage-containing water phase and obtainment of the mucilage, h) reuse of the acidic or basic aqueous solution obtained in step d1) in step b).

Thus, a preferred embodiment of the underlying invention is a method for obtaining lipid phase mucilage comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free water phase containing hydrated mucilage, d1) separation of the free water phase containing the hydrated mucilage, d2) separation of the mucilage-poor lipid phase, e) separation of the mucilage from the free water phase containing the hydrated mucilage and obtainment of the mucilage, h) reuse of the acidic or basic aqueous solution obtained in step d1) in step b).

The hydratable mucilages are preferably waxes, wax acids, lignins, hydroxy- and mycolic acid, fatty acids, mannosterylerythritol lipid, carotenes and carotenoids, chlorophylls, and their degradation products, furthermore phenols, phytosterols, in particular beta-sitosterol and campesterol, as well as sigmasterol, sterols, Sinapine, squalene, phytoestrogens, such as isoflavones or lignans, steroids and their derivatives such as saponins, furthermore glycolipids and glyceroglycolipids and glycerosphingolipids, furthermore rhamnolipids, sophrolipids, trehalose lipids, mannosterylerythritol lipids, polysaccharides, pectins such as rhamnogalacturonans and polygalacturonic acid esters, arabinans (homoglycans), galactans and arabinogalactans, pectic acids and amidopectins, phospholipids, phosphotidylinositol, phosphatides such as phosphoinositol, long chain or cyclic carbon compounds, fatty alcohols, hydroxy fatty acids, epoxy fatty acids, glycosides, liporoteins, lignins, phytate, phytic acid, glucoinosilates, proteins, albumins, globulins, oleosins, vitamins, e.g., retinol (vitamin A1) as well as derivatives, e.g., retinoic acid, riboflavin (vitamin B2), pantothenic acid (vitamin B5), biotin (vitamin B7), folic acid (vitamin B9), cobalamine (vitamin B12), calcitriol (vitamin D) as well as derivatives, tocopherols (vitamin E), tocotrienols, phylloquinone (vitamin K), menaquinone, tannins, terpenoids, curcumanoids, xanthones, sugar compounds, amino acids, peptides, polypeptides, carbohydrates, such as glucogen. Particularly preferred are phytosterols, sterols, squalene, glycolipids, glyceroglycolipids.

Preference is given to a method for purifying lipid phases and/or for separating mucilages, in which an acidic or basic aqueous solution has a volume fraction that is large enough such that when mixed with the lipid phase a product loss (neutral lipids) due to extraction of the lipid phase into a water phase is minimized. Therefore, a method for obtaining mucilages from a lipid phase is preferred in which an acidic or basic aqueous solution of the lipid phase is admixed in step b) so that a product loss (neutral lipids) of the lipid phase by extraction into a water phase is minimized.

Preference is given to a process for purifying lipid phases and/or for separating mucous substances, in which an acidic or basic aqueous solution has a volume fraction that is large enough such that when admixed to the lipid phase product loss (neutral lipids) due to extraction of the lipid phase into a water phase is minimized. Therefore, a method is preferred for obtaining mucilages from a lipid phase in which an acidic or basic aqueous solution is admixed to the lipid phase, so that a neutral-fat-poor mucilage phase is obtained. Thus, it is preferred to obtain a neutral-fat-poor mucilage phase in step d1). Neutral-fat-poor means in this case preferably <5% by weight, more preferably <3% by weight and more preferably <1.5% by weight of neutral fats.

A preferred embodiment of the present invention relates to a process for the purification of lipid phases and/or for the separation of mucilages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation with formation of a free, neutral-fat-poor water phase containing hydrated mucilages, d1) separation of the free water phase containing the hydrated mucilage, d2) separation of the mucilage-poor lipid phase.

e) separation of the mucilage from the free water phase containing the hydrated mucilage and obtaining the neutral-fat-poor mucilage.

Another preferred embodiment of the underlying invention is a method for purifying lipid phases and/or for separating mucilages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio, that allows the formation of a free water phase after mixing, c) sedimentary phase separation obtaining a water phase containing hydrated mucilage, d1) separation of the mucilage-containing water phase, d2) separation of the mucilage-poor lipid phase, e) separation of the mucilage from the mucilage-containing water phase and the obtainment of the neutral-fat-poor mucilage.

A particularly preferred embodiment of the present invention relates to a method for obtaining mucilages from lipid phases, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) sedimentary phase separation obtaining a free, neutral-fat-poor water phase containing hydrated mucilages, d1) separation of the free water phase containing the hydrated mucilage, d2) separation of the mucilage-poor lipid phase.

e) separation of the mucilages from the free water phase containing the hydrated mucilages and obtaining the neutral-fat-poor mucilage.

Another preferred embodiment of the underlying invention is a method for obtaining mucilages from lipid phases, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio that allows the formation of a free water phase after the mixed process, c) sedimentary phase separation obtaining a free water phase containing hydrated mucilage, d1) separation of the mucilage-containing water phase, d2) separation of the mucilage-poor lipid phase, e) separation of the mucilage from the mucilage-containing water phase and the obtainment of the neutral-fat-poor mucilage.

Mucilage-poor means herein that preferably <5% by weight, more preferably >3% by weight and more preferably <1.5% by weight of hydratable mucilages are present in the lipid phase.

Neutral-fat-poor means here preferably <5% by weight, more preferably <3% by weight and more preferably <1.5% by weight of neutral fats are present.

Preference is given to a process for the purification of lipid phases, in which an acidic or basic aqueous solution is admixed to the lipid phase with a volume fraction that enables spontaneous phase separation and/or a process for accelerating the phase separation can be performed, in which case the obtained lipid phases are subjected to one or more further purification steps without the use of a centrifugal separation process with residual amounts of mucilage and/or water contained therein.

One embodiment of the present invention is a method for purifying a lipid phase and/or for separating mucilage from a lipid phase in two or more stages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase, c) phase separation obtaining a free water phase containing hydrated mucilage, d1) separation of the free water phase containing the hydrated mucilage, d2) separation of the mucilage-poor lipid phase, wherein the lipid phase obtained from d2) is subjected to one or more further purification steps without the use of a centrifugal separation process, with residual amounts of mucilage and/or water still present therein.

A further embodiment of the present invention is a method for purifying a lipid phase and/or for separating mucus/mucilage from a lipid phase in two or more stages, comprising the following steps:

a) providing a lipid phase containing mucilage, b) adding and admixing a water phase containing at least one acid- or base-forming compound having a volume ratio of >5% by volume between the volume of the water phase and the total volume of lipid phase and water phase before admixing the water phase and/or a water volume ratio that allows the formation of a free water phase after the mixed process, c) sedimentary phase separation obtaining a free water phase containing hydrated mucilage, d1) separation of the mucilage-containing water phase, d2) separation of the mucilage-poor lipid phase, wherein said lipid phases are subjected to one or more further purification stages without the use of a centrifugal separation process, with residual amounts of mucilage and/or water still present therein.

The method according to the invention can be carried out as a single process step or individual process embodiment or combined with further process steps or process embodiments or other process steps according to the invention and combined with processes from the prior art in different process sequences. The investigation methods specified herein make it possible to make a selection or combination of individual or several process steps/stages or process implementations. Economics and the effectiveness of the individual process step but also the entire process arrangement, i.e. all process stages, have to be taken into consideration for the selection of suitable parameters (these are in particular: concentration of the compounds used in the aqueous solutions, volume ratio in which the aqueous solution is added to the oil phase, temperature of the reaction mixture) for the process steps/stages.

Significant influencing factors for economic efficiency are the duration of the procedure as well as the costs of the process implementation. The overall process must also be geared to the requirement for the quality of the final product. Therefore, the selection of a suitable process method as well as the process parameters suitable for each process stage must be made taking into consideration the overall process. Since the duration of the process has a decisive influence on the economics of the overall process, the time required for the formation of a free water phase or the fall below a specific water content in the oil phase in step c) can also be used to decide the suitability of a process step. Particularly suitable are process embodiments in which, within the first 60 minutes after an admixture of the water phase into the lipid phase, a visible free water phase has separated from the resulting emulsion. Furthermore, process embodiments are particularly suitable in which the residual water content is <0.8% by weight 4 hours after admixture of a water phase into the lipid phase. From the above-mentioned aspects, it is shown that selection of a method arrangement or the process parameters such that the phase separation is as rapid as possible is advisable. It has been found that selecting an amount (volume) of water to be added that is 5-15% by volume higher than the amount of water to be added as required to meet the aforementioned criteria can significantly improve process economics. Surprisingly, it has been found that by combining process embodiments of the aqueous purification process as described herein, a better quality of the obtainable products, such as e.g. the purified oil or fat fraction and the separated mucilage, can be achieved, if the cleaning is carried out with one of the methods of the invention. Thus it could be shown that, for example, in oils which had been treated with a 3- or 4-stage purification process according to the invention, the separation efficiency and the product qualities were markedly improved if the purification was performed according to the invention in the individual aqueous purification stages using a large volume of the aqueous solutions such that a free water phase formed spontaneously by a sedimentative separation of phases as compared to methods in which identical aqueous solutions were added but a volume of 1-3 vol % of the lipid phases was added. Thus, by a 3-stage purification procedure, lipid phases were prepared which contained <1 mg/kg/phosphorus, <0.5 mg/kg of Na, K, Mg, Ca and/or Fe ions and less than 0.2% by weight of free fatty acids. Further, the loss of neutral fats by discharge into one of the aqueous solutions was significantly lower and less than 1% by weight, compared to processes in which a small addition amount of the aqueous solutions were used. On the other hand, it was possible to obtain mucilage phases which were virtually free or nearly free of neutral fat admixtures and in a water-poor and aggregated form which is readily filterable. This facilitates further purification of the resulting mucilage phases.

It has thus been possible to show that phospholipids, here in particular phophotidylcholine and phosphoinositols, but also glycolipids and also glyceroglycolipids, dyes, such as chlorophylls, and also antioxidants, such as, for example, phenolic acids, can be obtained in their chemically unchanged form from these phases. The purification of the resulting mucilage can then be carried out by prior art methods. Such techniques are, for example, extracting the lipophilic mucilage into suitable solvent phases or phase mixtures. This is advantageously done after removal of residual water from the separated mucilage phases, which can be done for example by means of vacuum drying. When using various solvent systems, for example a protic and an apolar solvent, different classes of compounds of the mucilages can be separated from each other. The substance classes contained in the solvent phases can in turn be separated from one another by means of chromatographic methods into different subclasses, for example via a different adsorbability and a subsequent elution by means of one or different solvent media, whereby highly pure fractions are obtained. In this case, preference is given to a purity of the mucilage compound for the respective substance class of preferably >60% by weight, more preferably >70% by weight, more preferably >80% by weight, even more preferably >90% by weight and most preferably >95% by weight. Surprisingly, it has been found that the separated and recovered mucilage are not chemically altered by the separation and recovery process. It could thus be shown that, in particular, glycolipids and glyceroglycolipids were not or only to a small extent hydrolyzed. The proportion of hydrolyzed forms was less than 5% by weight. In application experiments it was possible to show that the phospholipids, glycolipids and glyceroglycolipids obtained from the inventive process procedure had surfactant properties which corresponded to those of reference products which are obtainable in the usual way in the art. It has also been shown that compounds such as polyphenols, fatty alcohols or steryl glycosides are chemically unaltered and thus retain their functional properties. This is especially true for anti-oxidative properties. Furthermore, it could be shown that no transisomerization took place at the double bonds of fatty acids or at fatty acid residues obtained from the mucilage phases, provided that no temperature increase to >75° C. occurred during the purification stages. Thus, with the process of the invention mucilages or classes of mucilages can be obtained in high purity and with a high functionality and without chemical alteration. Corresponding effects could be found for the obtainable purified oil phases. In addition to a reduction in mucilage, there was also a reduction in compounds in the purified lipid phases that did not correspond to a neutral lipid, such as, e.g. alkaline earth metal ions or other inorganic compounds. As a result, high-purity lipid phases were obtained which had a proportion of neutral fats of preferably >95% by weight, more preferably >97% by weight, more preferably >98% by weight, even more preferably >99% by weight and most preferably >99.5% by weight. Conversely, the resulting lipid phases treated with one or more of the process steps of the invention had a residual amount of mucilages that was <5% by weight of mucilage, more preferably <3% by weight, more preferably <2%, even more preferably <1% by weight, and most preferably <0.5% by weight of mucilage. Furthermore, in lipid phases in which no trans-fatty acids could be detected initially, there were no trans-fatty acids detectable in the purified lipid phases after carrying out the purification steps according to the invention. For lipid phases in which trans-fatty acids were already present before purification, their concentration was not changed by the treatment methods. Furthermore, no 3-MCPD esters were detected in the purified lipid phases of native oils. Thus, the aqueous cleaning process provides the possibility to provide a high purity triglyceride mixture (in the form of an oil or fat) that is free of trans-fatty acids and/or 3-MCPD esters. Preference is given to a method for purifying lipid phases, in which an acidic or basic aqueous solution is admixed to a lipid phase with a volume fraction that is so large that spontaneous phase separation is obtained and in which the resulting lipid phases contain no trans-fatty acids and/or MCPD esters.

Therefore, the inventive method is particularly suitable for multistage purification of oils and fats. It has been shown that the combination possibilities described above result in all cases in a better purification quality of oils and fats as well as in the recoverable neutral-fat-poor mucilage phases, compared to an application of the same purification sequence, in which a volume of the aqueous solutions of <5 vol % was added. As particularly practicable and applicable without prior knowledge of the mucilages and compounds present in the starting materials of the oils and fats, out of those possible process arrangements that have been described above, the following arrangements of process stages, have been proven to work:

III. first acid treatment, then base treatment, as well as

VI. repeated base treatment.

Particularly advantageous is the execution of process arrangement III., where in the first process stage, citric acid or phosphoric acid, in the second process stage carbonates or silicates and in the third process stage cationic guanidine and/or amidino group-containing compounds, in particular arginine, are used. However, the method can also be carried out with other acid or base compounds, as listed herein. In a further preferred embodiment, the purification process is carried out by using citric acid or phosphoric acid in the first process stage, carbonates in the second process stage and silicates in the third process stage. Here, the 2nd and the 3rd process stage can also be performed multiple times or the order of use is switched. Also advantageous is to carry out a combination of the process steps using method arrangement VI. in which silicates are used in the first process stage and carbonates in the second process stage, or these process stages are extended by a third process stage, in which cationic guanidine and/or amidino group-containing compounds, in particular arginine, are used. The process stages can be switched as desired and/or one or more stages can be repeated. Advantageously, with the embodiment according to the invention, lipid phases of different composition and with different concentrations of mucilages can be purified with aqueous solutions of these process stages; it is also possible to purify mucilages and make them obtainable, without prior knowledge of the specific composition and concentrations of the mucilage in the lipid phases. Such an approach is not possible with prior art processes because the compounds to be added are based on the given oil indices, such as the neutralization of acid groups with a base. The specific concentrations of the acid- or base-forming compounds which should preferably be present in the aqueous solutions of the methods of the invention are also freely variable in the ranges given herein, as the applicability of a method embodiment as well as suitable concentration of compounds and preferable water volume to be added can be determined by a simple test procedure, as described below.

Preference is given to a process for purifying lipid phases and/or for separating and obtaining mucous/mucilage substances from a lipid phase in two or more process stages, in which the following process steps are carried out in the respective process stage:
  a) providing a lipid phase containing mucilage,
  b) adding and admixing a water phase containing at least one acid- or base-forming compound having a volume ratio of >5% by volume between the volume of the water phase and the total volume of lipid phase and water phase before admixing the water phase
  c) phase separation to form a free water phase containing hydrated mucilage,
  d1) separation of the mucilage-containing water phase obtained from step c),
  d2) separation of the mucilage-poor lipid phase, obtained from step c),
  wherein for carrying out the second and further process stages in process step a), the lipid phase of process step d2) of the previously performed process step is used and in which one of the following process arrangements as described herein are used:
  I. sole acid treatment,
  II. sole base treatment,
  III. first acid treatment, then base treatment,
  IV. first base treatment, then acid treatment,
  V. repeated acid treatment,
  VI. repeated base treatment
  and in which in the procedural arrangements III. and IV. an acid and/or base treatment can be performed several times.

Particularly preferred is a multistage process embodiment in which an aqueous solution containing dissolved guanidine- and/or amidine-containing compounds is used in the final purification stage.

A multistage process arrangement is particularly advantageous when the lipid phase to be purified contains a particularly high concentration of mucilage which has a strong water binding capacity and at the same time a high lipophilicity. This is the case in particular with glycolipids, glyceroglycolipids and fatty alcohols and waxes. Particularly problematic are lipid phases in which, in addition to the aforementioned mucilage, additional emulsifiers are present, such as, for example, collagen, proteins or ionic surfactants. This applies, for example, to used edible fats or cutting and lubricating oils. It has been shown that such lipid phases, when an aqueous solution containing at least one of the acid- or base-forming compounds listed herein is admixed, generally results in highly viscous emulsions that could no longer be broken up by physical means when the water addition volume was <5 vol %. Only when using the process technology according to the invention was it possible to achieve a spontaneous onset of separation of phases and separation of the hydrated mucilages, whereby in some cases very large addition volumes of >100 vol % were required. Again, after completion of the phase separation the majority of the water phase obtained was clear and could be immediately reused for a process implementation. In such applications, mucilages, in which the total volume accounted for up to 32% by volume of the initial volume of the purified lipid phases could be separated. Again, the process could be carried out with minimal discharge of neutral lipids into the aqueous phases. Even with these lipid phases, an improvement of the oil quality parameters could be achieved. For example, in the case of a frying oil treated with a 4-stage purification process according to the invention, the following values were present after purification: phosphorus <0.5 mg/kg, calcium 0.03 mg/kg, iron 0.01 mg/kg, sulfur 0.01 mg/kg, 0.01% by weight free fatty acids. The viscosity was also significantly reduced (22 cSt).

The inventive method is characterized by its ease of implementation and easy controllability. Thus, a laboratory analysis of the lipid phase to be cleaned can even be completely foregone. In a preferred embodiment, the investigation for determining the purification process for a lipid phase is performed by a series of tests to determine which basic and acidic aqueous solutions as described result in formation of a free water phase following emulsion formation. Based on the formation of a mucilage phase and the phase separation behavior, it can be decided which solutions, which volume ratio between the lipid and the water phase, and which sequence for the aqueous purification process steps should be used. This results in considerable advantages for the process control. Thus, it can easily be detected by means of a preliminary investigation whether and to what extent a separation of hydratable mucous substances is possible and whether and in what time course the phases spontaneously separate. In a particularly advantageous manner in lipid phases, in which the majority of the hydrated mucilages are already separated by sedimentation or as a result of another separation method, the herein existing residual amounts of mucilage and water can be separated from the lipid phase at high throughput rates and high efficiency by centrifugal processes. In a particularly advantageous manner, centrifugal separation of the residual amounts of mucilages and water from a lipid phase obtained by the process (after spontaneous separation of phases (phase separation) or separation of phases (phase separation) by a process for accelerated phase separation) results in no emulsion formation of the thereby obtained phases. It is also advantageous that the mucilages that were hydrated and removed with the sedimented water phase can be separated from this phase with very simple techniques and be recovered as reusable (valuable) material. Furthermore, it is particularly advantageous in the process engineering that the water phases obtainable by sedimentation and by other methods disclosed herein, together with the dissolved basic and acidic compounds present herein, can be purified of the dissolved or complexed mucilages by simple measures and thus can be used for a renewed purification of a lipid phase and/or for the extraction of mucilage. As a result, wastewater streams are avoided in a particularly advantageous manner and the compounds used as well as the volume of water can be completely recycled and reused. In one type of process, even centrifugal separation processes for purifying lipid phases can be completely or partially dispensed with. Most advantageously, a one-step or multistep aqueous purification process, as practiced in accordance with the techniques described herein, may yield lipid phases depleted of hydratable mucilage which can decrease phosphorus-containing compounds to concentrations of less than 0.5 mg/kg and reduce the free fatty acids contained therein to values below 0.05% by weight. Advantageously, high-purity vegetable oils and edible fats which do not contain trans-fatty acids or 3-MCPD esters can be produced by the process according to the invention.

Methods

Test Method for the Complete Hydration of Mucilage.

The content of hydratable mucilages as well as the ratio of the different mucilages to one another varies to a considerable extent in the lipid fractions that can be treated by the method according to the invention. In addition, since the hydratability of the various mucilages differs according to the various acid- or base-forming compounds disclosed herein, preliminary testing is advisable prior to application of the method of the present invention, as it can be used to calculate whether and, if so, the amount of water to be added and the acid or base-forming compound to be used, the concentration of the acid-forming or base-forming compounds required and the sequence of purification stages to be carried out for the process according to different emphases (e.g., process economics or product quality). It is preferable to select a method by which the largest possible number of hydratable mucilages can be hydrated simultaneously. The potential of hydrating with one of the acidic or basic solutions according to the invention can be determined by the following experimental setup. The test method is directed at hydration of the mucilage(s) that are hydratable with the respective aqueous solution and the hydration ensures a sedimentative separation of the hydrated mucilage. To this end, both the volume ratio of the aqueous solutions added and the amount of compounds contained therein, which allows hydration of the mucilage, are crucial. Sufficient hydration is therefore present in particular when, in the case of a repetition of the identical process execution, even adding a larger volume or increasing the content of the compound (s) contained therein, it is no longer possible to hydrate and separate mucilages. In this case, the hydration is considered complete. In this respect, the terms "adequate hydration" and "complete hydration" are used synonymously. However, the term "complete hydration" also encompasses a process in which hydration is as complete as possible for all hydratable mucilages present in a lipid phase.

To determine a complete hydration of hydratable mucilages, the following experimental set-up can be chosen, which includes the following objectives:

a) Determination of the compound with which to prepare an acidic or basic solution and achieve hydration of the largest possible proportion of mucilage present in the lipid phase to be purified, and transfer them into the water phase. In this case, it may be necessary to determine the various concentrations of the compounds present. Samples are taken from the lipid phase to be purified, and an acidic or basic solution, each containing different compounds, is added and mixed into the respective samples. The added solutions each have the same concentration. In each case, the same stirring speed and the same temperature are used. Then, the amount of the separated mucilages from the samples is determined and compared with each other. The acidic or basic solution that resulted in the largest amount of mucilage to be separated is then used for process step c).

b) determination of the amount of water added regarding the selected acidic or basic solution in which, after mixing with the lipid phase to be purified during a sedimentation time (separation time), a free water phase is formed. This test step should be repeated if a suitable method to accelerate the phase separation is used in the investigation (see also Example 1). Re-examination should then be done with the selected accelerated phase separation method, as this may decrease or increase the required amount of water added for the selected acidic or basic solution.

The test procedure for complete hydration of mucilage should therefore include the following steps:

1. Determination of the duration of the sedimentation time (separation time) until a separation of phases (phase separation) and/or a separation of hydrated mucilages is achieved and/or 2. Test to accelerate the phase separation, as shown in the following (see below)

- Heating the reaction mixture, e.g., at 40°, 60° and 80° C. over the duration of, e.g., 5, 15 and 30 minutes, with or without a stirring and/or intensive mixing procedure;
- Introducing the reaction mixture into a cylindrical vessel having a high aspect ratio between height and width (for example >10);
- Passing the reaction mixture immediately after mixing or after a sedimentation time (separation time) through a coalescer;
- Passing the reaction mixture immediately after mixing or after a sedimentation time (separation time) through a hydrocyclone and/or decanter and/or separator;
- In appropriate cases, a combination of the acceleration methods can be performed.

The process according to the invention can be adjusted to various advantageous effects that can be achieved herewith. These can, among others, be directed at:

a) a simplified process or execution due to a smaller amount of water and/or mucilages that must be removed from an oil phase by centrifugal processes, b) a minor loss of product of the lipid phase into the separated water/mucilage phase (s) or a small product loss of the water/mucilage phase (s) into the oil phase, c) the required process time to carry out the process economically.

Therefore, the selection of a suitable method for the application can be made according to different selection criteria.

Criterions to use a method to accelerate the separation of phases (phase separation) in a process implementation include, among others, if there is a more rapid attainment of a), a predefined residual water content (with, for example, >10% time savings over spontaneous separation of phases (phase separation) in any container) in the lipid phase above the phase boundary or an emulsion layer and/or b), sedimentation of a phase with hydrated mucilage that does not progress further over time or there is any other process advantage present, for example, due to the application of a method for accelerating the phase separation.

Thus, one embodiment of the present invention relates to a method for purifying lipid phases and/or for separating mucilage from lipid phases, comprising the following steps:

a) providing a lipid phase containing mucilage, a2) Determination of at least one acid- or base-forming compound in order to prepare an acidic or basic solution, with which to hydrate and transfer the largest possible proportion of mucilage present in lipid phase of step a) into the water phase;

b) adding and mixing a water phase to the provided lipid phase according to step a), containing at least one acid- or base-forming compound, determined in step a2), wherein the volume ratio, volume of the water phase to the total volume of lipid phase and water phase before mixing the water phase, is at least >5 vol. %, c) phase separation obtaining a free water phase containing hydrated mucilage, d1) separation of the mucilage-containing water d2) separation of the mucilage-poor lipid phase.

Furthermore, the volume of water for the selected acidic or basic solutions for step c) that after mixing with the provided lipid phase from step a) results in the formation of a free water phase after a sedimentation time (separation time) can be determined by means of the methods described herein before step c) in step a3). For this purpose, samples are taken from the provided lipid phase. The test is not carried out with the entire lipid phase. Thus, another embodiment of the present invention relates to a method for purifying lipid phases and/or for separating mucous substances from lipid phases comprising the following steps:

a) providing a lipid phase containing mucilage, a3) determination of the water volume for the selected acidic or basic solution for step c) that after mixing with the lipid phase to be purified a free water phase forms after a sedimentation time (separation time), b) adding and mixing a water phase to the provided lipid phase according to step a), containing at least one acid- or base-forming compound, with a volume ratio determined according to step a3), wherein the volume ratio, volume of the water phase to the total volume of lipid phase and water phase prior to mixing the water phase, is at least >5% by volume, c) phase separation obtaining a free water phase containing hydrated mucilage, d1) separation of the mucilage-containing water phase, d2) separation of the mucilage-poor lipid phase.

The steps a2) and a3) can also be combined with one another in one of the methods according to the invention described herein Thus, another embodiment of the present invention relates to a method for purifying lipid phases and/or for separating mucilages from lipid phases comprising the following steps:

a) providing a lipid phase containing mucilage, a2) determination of an acid- or base-forming compound in order to prepare an acidic or basic solution, with which to hydrate and transfer the largest possible proportion of mucilage present in the lipid phase provided in step a) into the water phase a3) determination of the water volume for the selected acidic or basic solution for step c) in which, after mixing with the lipid phase to be purified, a free water phase is formed after a sedimentation time (separation time), b) adding and mixing a water phase to the provided lipid phase according to step a), containing at least one acid- or base-forming compound, determined according to step a2), with a water volume ratio determined according to step a3), wherein the volume ratio, volume of the water phase to the total volume lipid phase and water phase before mixing the water phase, is at least >5% by volume c) phase separation obtaining a free water phase containing hydrated mucilage, d1) separation of the mucilage-containing water phase, d2) separation of the mucilage-poor lipid phase.

Methods and Processes for Executing Method Step b)

The basic solutions used in process step b) are preferably prepared with the following compounds:

sodium hydroxide, potassium hydroxide, aluminum hydroxide, ammonium hydroxide, carbonates such as sodium carbonate, sodium hydrogen carbonate, sodium bicarbonate, potassium carbonate and potassium hydrogen carbonate, silicates such as sodium metasilicate, sodium orthosilicate, sodium disilicate, sodium, trisilicate and potassium silicate, furthermore acetates such as sodium acetate, borates such as sodium borate, amidino- and/or guanidine-containing compounds such as arginine, according to the formula given in the definitions section, and mixtures of the aforementioned compounds and with other compounds. Also suitable are calcium hydroxide, sodium sulfate, potassium sulfate, calcium sulfate, sodium phosphate, potassium phosphate, calcium phosphate, sodium citrate, potassium citrate, calcium citrate, aluminum citrate, and mixtures thereof or herewith. Preference is given to sodium carbonate, sodium hydrogen carbonate, sodium bicarbonate, sodium metasilicate, amidino and/or guanidine group-containing compounds, in particular arginine. But other base-forming compounds can be used as well as combinations with these as well as with the aforementioned.

Preferred acids for the preparation of acidic solutions are in particular phosphoric acid, sulfuric acid, acetic acid, citric acid and oxalic acid. But other acids and combinations of acids can be used.

Compounds which are present as solids are first dissolved in water using suitable methods. All compounds used in process step b) are present in dissolved form. The water phases which can be used for this purpose can be deionized water, city water or industrial water. The compounds which can be selected can be used in pure form or as mixtures.

The basic aqueous phase to be added in step b) preferably has a pH in the range between 7 and 14, more preferably between 8 and 13, more preferably between 9.0 and 12. The acidic aqueous phase to be added in step b) preferably has a pH in the range between 6.9 and 1, more preferably between 5 and 1.5 and most preferably between 3 and 1.8. The pH of the aqueous solutions used for the process should preferably result from the compounds used. However, the pH may be adjusted, if necessary, by adding, for example, an acid, a base, or a buffer.

If necessary, the pH can be adjusted by adding, e.g., a base, an acid, or a buffer.

The appropriate concentrations of the compounds employed can be determined by the test methods described herein. Preferred are concentrations between 0.001 and 5 molar, more preferably between 0.5 and 2 molar, and most preferably between 0.8 and 1.5 molar. This corresponds to preferred weight concentrations of between 0.01 and 40% by weight, or until reaching the solubility limit. More preferably, weight concentrations of the compounds are between 0.1 and 25% by weight and more preferably between 0.5 and 20% by weight.

The temperature of the aqueous phases used in step b) is, in principle, freely selectable, but is preferably based on the result of the study on the hydration of mucilages described herein. Preferably, the temperature is between 0° and 120°

C., more preferably 20 between 15° and 90° C., and more preferably between 25° and 75° C.

In principle, any method of mixing liquids can be used. Since the phases to be mixed are immiscible, for hydration it is necessary to establish the largest possible interface between the fluids in the lipid phase. Therefore, mixing methods which ensure the formation of a large interface are advantageous. Thus, methods which allow an intensive introduction of the aqueous liquid to be mixed into the lipid phase are preferable. Methods that allow intensive mixing results are based in particular on the generation of cavitations.

The addition of the aqueous phases into the lipid phases can take place in any manner. Thus, for example, the aqueous phase can be added continuously or discontinuously, dropwise or in a stream or jet, or the entire volume of the aqueous phase can be added in one portion. It is preferable to add the entire amount of the aqueous solution to be added in one portion. The mixing device can be started during the addition of the aqueous solution or even afterwards. The mixing time depends on the process parameters and the type of mixing procedure used and must be adapted based on the achieved hydration result. A mixing duration between 1 second and 60 minutes should be chosen, more preferably between 1 minute and 30 minutes and further between 3 minutes and 15 minutes. The temperature at which the mixing takes place depends on the result of the studies on the hydration of the mucilage. In principle, a temperature range between 0° and 120° C. is preferred, more preferably between 15° and 90° C. and most preferably between 25° and 75° C.

Methods and Processes for Executing Method Step c)

The phase separation of the mixed water and lipid phases from process step b) can be carried out in the same container in which the mixture and/or reaction phase has taken place or in another container. It is advantageous to perform the phase separation in a container having at least one inlet (e.g., for the emulsion) and at least 2 separate outlets (e.g., for the lipid and water phases, respectively). The container may have any shape, whereby advantageous are containers with a ratio >1 between the container height, or filling height, and the container width, or area of the phase boundary. Further advantageous is a conical shape of the container bottom. It is advantageous to set up an optical/visual assessment in the container in order to assess the emulsion or the level of the phase boundary that forms. For this, among others, an inspection glass (viewing glass) in the container wall is suitable. Particularly advantageous is the observation of the boundary area between the forming water/mucous phase and the lipid phase, e.g., through an inspection glass, which is located in this area. Furthermore, it is advantageous to have an inspection glass at the bottom of the container for detection of a free water phase. Also advantageous is the possibility to control the temperature of the container. Furthermore measuring instruments can also be mounted in the container wall, such as instruments to determine the turbidity present in a liquid or the water content. Advantageously, the container should have one or more test outlets through which a sample can be taken from the phases that have been formed. On the basis of such samples used for analytics, for example, by a centrifugation or an analytical method (e.g., Karl Fischer water content determination), it can be determined if the phase separation is sufficient and the phases can be fed to the next step. The individual parameters (e.g., water content in the lipid phase, mucilage content in the lipid phase, mucilage content in the water phase, completeness of the phase separation or completeness of the separation of hydrated mucilaginous substances into the water phase) and parameter limits indicating a termination of process step c) are determined by the test procedure for complete hydration of mucilage. In general, however, it can be assumed that there is sufficient phase separation if the water content in the lipid phase is <0.8% by weight. The inlet to add the emulsion or, if process step b) is also carried out in the container, the inlets for the lipid and the water phases, may be located at any point of the container. Preferred is an inlet which is located at the level of a phase boundary that is ultimately formed or slightly above it. This arrangement is particularly suitable for continuous process control. Furthermore, for continuous process management, an outlet for the clarified lipid phase is preferably located in the upper region of the container. The outlet for the clarified lipid phase in a discontinuous process is preferably located above the phase boundary that is formed. The outlet for the water phase is preferably at the lowest point of the container or in the lower region. Optionally, the container has more outlets, e.g., below the phase boundary or at the lowest point of the container for removal of mucilage. In a further advantageous embodiment, the container has an overflow or a separation device for the removal of mucilage floating on the surface. It is also advantageous to provide interfaces which are located inside the container and contribute to the separation of phases (phase separation). In an advantageous embodiment, the container is pressure stable, thus, allowing the system to be placed under pressure.

The level of the phase boundary can be determined and adjusted by selecting the water volume to be added and the settling behavior of the water/mucilage phase can be determined by the test method for complete hydration of mucilage. Alternatively, the level of the phase boundary can also be adjusted by subsequent introduction of a water phase. In a continuous process, the level of the phase boundary can be kept constant by a metered discharge of the water phase.

The process step c) can be configured as a continuous or discontinuous process. In a batch process, the container is filled with a defined volume. The emulsion remains in the dormant state and/or under low agitation until reaching the predefined parameter limits in the container. Subsequently, the phases are discharged via the outlets provided for this purpose, wherein preferably first the clarified lipid phase is discharged. In a continuous process, an emulsion from process step b) is introduced during the sedimentation time of an emulsion already present in the container. Introduction of the emulsion is preferably performed with a laminar flow. At the same time or independently thereof, the already clarified lipid and/or water phases are discharged via one or more outlets.

Particularly preferred is the maintenance of a sedimentation time during which there is no or only slight agitation of the reaction mixture. A low laminar agitation can be achieved, for example, at a rotational speed of <30 rpm. The duration of the sedimentation time depends on the specific process conditions and can be determined, for example, by the methods described herein. Preferred is a duration of the sedimentation time between 10 seconds and 7 days, more preferred between 5 minutes and 48 hours, and more preferred between 15 minutes and 6 hours. The temperature at which process step c) is carried out depends on the determined process conditions. In principle, a temperature range between 0° and 120° C. is preferred, more preferably between 15° and 90° C. and most preferably between 25° and 75° C.

Method for Accelerating the Phase Separation.

The object of the method according to the invention is to hydrate mucilage present in a lipid phase as completely as possible in order to thereby transfer the mucilage(s) into a water phase, which simplifies the further purification of both, the mucilages and the purified lipid phases. The purpose of the acid-forming or base-forming compounds which can be used for this purpose is to mediate, bring about and/or effect a hydration and/or complexation and/or chemical modification of the mucilage. As a result, there are mucilages, which have such a large hydrate shell (water jacket) and/or are complexed with one of the compounds and/or with each other or are structurally altered, so that they dissolve out of the lipid phase and can be removed from the lipid phase by physical means, e.g. by gravity. This separation according to the method of the invention takes place spontaneously and sedimentatively. The time required to complete the phase separation or sedimentation of hydrated/complexed mucilage may vary considerably, depending on the composition, amount and type of mucilage. Therefore, methods which accelerate the separation of phases (phase separation) can be used. For this purpose, methods are suitable in which 1) the physicochemical interactions between the water phase and the lipid phase mucilages are made possible and/or improved, e.g., by means of heating of the lipid phase, the water phase and/or the reaction mixture possible (thermo-reaction method);

2) a phase formation is promoted, e.g., by heating the emulsive mixture (thermal separation process) or adhesion of phases to surfaces, resulting in coalescence of adherent droplets (coalescence process) or by high-energy vibration (e.g., ultrasound, electromagnetic waves) promoting association of phase droplets (coalescence);

3) centrifugal methods are used to enable phase unification by gravity (gravitational method).

Since the possible methods for accelerating the phase separation are based on different physical principles, it may be useful to combine these methods with each other directly and/or consecutively. For example, increasing the temperature of the reaction mixture (thermo-reaction process), followed by a coalescence process and a gravitational process.

Methods and Processes for Executing Method Step d)

The lipid and water phases produced by phase separation in process step c) can be passed through the corresponding outlets from the container, in which step c) was performed, either directly into a further container as a final product or into a container for further purification of the phases. It may be appropriate to clean the phases from particulate aggregates of hydrated mucilage, e.g., by passing them through a filter. Furthermore, it may be necessary to perform a further phase separation of one or both of the phases obtained. This can be done with methods known in the art for phase separation of liquid/liquid and liquid/solid mixtures. However, preference is given to processes which effect a phase separation via the existing density difference of the liquids by means of a centrifugal acceleration. Therefore, preferred embodiments, which can be additionally carried out in process step d), are a separation by means of centrifuges, separators or decanters. The selection of the suitable method depends on the volume or the required throughput of the phases, the viscosity of the lipid phase and the density difference between the water or the lipid phase and the volume of the water phase added. The temperature of the phases to be separated is in principle freely selectable, preferred are temperatures between 10° C. and 80° C., more preferably between 20° C. and 65° C. and most preferably between 25° C. and 40° C. The centrifugal acceleration is preferably selected between 2,000 g and 12,000 g, more preferably a centrifugal acceleration between 4,000 g and 10,000 g. Preferably, centrifugation is to be carried out for 2 to 15 minutes, more preferably for 8 to 12 minutes. The dwell time in a separator or decanter is preferably 2 to 60 seconds, more preferably 10 to 30 seconds. A particularly preferred embodiment is the use of a plate-separators and a trikanter. If a centrifugal phase separation was performed in step C) already, this can be carried out with the identical parameters and value ranges given here.

Methods and Procedures for Performing Process Step e)

The mucous mucilage substances separated with the water phase and/or from the lipid phase can have a different degree of hydration, ranging from a liquid mucous phase up to low-water solid aggregates. Using centrifugal separation techniques, these phases can be easily separated from the water phase. If the separation of water-poor aggregates is desired, aggregation of the hydrated mucilaginous substances can be carried out in the aqueous phase using methods from the prior art. Suitable for this are, among others, complexing agents as disclosed herein. Preferred are electrolyte compounds such as $CaCl_2$ or $MgCl_2$, or organic acids and combinations of these compounds. Further, separation is also possible by adsorbents, e.g., diatomaceous earth. For example, aggregated or adsorbed mucilages can be separated from the clarified water phase by suitable filters or filter media. The mucilages removed from the aqueous medium are preferably stored cool until further use. Preference is given to obtain dehydrated forms the mucilage phases, which can be carried out, for example, by means of vacuum or freeze-drying. The mucilages obtained are then available as anhydrous or water-poor aggregate masses or powder.

Testing for a Process Suitability

When examining the suitability of individual process stages in a multistage cleaning process, the effects on process economics and product quality must be taken into account. For the selection of suitable compounds and their processual use, it is appropriate to take into account the time required for a free water phase to form and the amount of residual water in the oil phase, which are determined by the previously described test method for the complete hydration of mucilage and the investigations of the method for accelerating the phase separation. Furthermore, the method should in particular ensure that the desired specification of the final product is achieved; this applies in particular to the oil indices. The concentration for phosphorus should be <1.0 mg/kg, for calcium <0.3 mg/kg, for iron <0.1 mg/kg, for free fatty acids <0.2% by weight.

Another parameter for the suitability of one or more process stages is the overall process duration, since this has a significant influence on the economics of the process. Therefore, particularly those process steps are suitable in which a rapid separation of phases (phase separation) can be accomplished after an aqueous solution is admixed to the lipid phase; this is preferably the case when a free water phase of the emulsion settles spontaneously within the first 60 minutes and becomes visually recognizable. Alternatively, the water content remaining in the oil phase after a separation time of 4 hours can be used to test suitability to perform the next process step. The residual water content should be <0.8% by weight.

DEFINITIONS

Measurements

All measurements described herein, where relevant to the outcome and unless otherwise specified, are performed under standard conditions, i.e., at a temperature of 25° C. and a pressure of 101.3 kPa.

Acids and Bases

Acids are referred to here as compounds which are capable of donating protons to a reaction partner, particularly in water.

Accordingly, the term bases refers to compounds capable of accepting protons, especially in aqueous solutions.

Carbonate

Herein, "carbonates" means a salt which, upon dissociation in water, forms carbonate ($CO_3^{2-}$) or bicarbonate ($HCO_3^{-}$).

Silicates

"Silicates" refers to a salt which upon dissociation in water forms metasilicate ($SiO_3^{2-}$), orthosilicate ($SiO_4^{4-}$), disilicate ($Si_2O_5^{2-}$), or trisilicate ($Si_3O_7^{2-}$).

Lipid Phases

Lipid phase are summarized herein as organic carbon compounds which are in liquid or liquefiable form. The term as used herein includes mixtures of biological, synthetic or fossil origin, e.g., being obtained from plants, algae, animals and/or microorganisms or can be obtained by extraction from rocks or by synthetic methods and having a water content of <20% and a content of lipophilic substances, comprising, e.g., monoacylglycerols, diacylglycerols and/or triacylglycerols and/or aliphatic, cyclic or heterocyclic hydrocarbons which total >70 wt.-% or >75 wt.-% or >80 wt.-% or >85 wt.-% or >90 wt.-% or >95 wt.-%. For example, the lipid phases may be extracts of oleaginous plants and microorganisms, such as rape seed, sunflower, soya, camelina, jatropha, palms, castor, but also algae and microalgae, as well as animal fats and oils. It is irrelevant whether the lipid phase is a suspension, emulsion or colloidal liquid. If the lipid phases are extracts or extraction phases of lipoid substances from a previous separation or extraction, the lipid phase can also consist of >50% of organic solvents or hydrocarbon compounds. Preferred lipid phases are vegetable oils, in particular pressing and extraction oils of oil plant seeds. However, animal fats are also preferred. But also included are non-polar aliphatic or cyclic hydrocarbon compounds. Preferred lipid phases are characterized in that >95% of the compounds are apolar. In another embodiment, the lipid phase to be purified according to one of the methods disclosed herein is a vegetable oil or animal fat for the food industry. The lipid phases, as defined herein, include, but are not limited to: acai oil, acrocomia oil, almond oil, currant seed oil, borage seed oil, rapeseed oil, cashew oil, castor oil, coconut oil, coriander oil, corn oil, cottonseed oil, kramben oil, linseed oil, grapeseed oil, hazelnut oil, other nut oils, hemp seed oil, jatropha oil, jojoba oil, macadamia nut oil, mango seed oil, mustard oil, olive oil, palm oil, palm kernel oil, palm oil, peanut oil, pecan oil, pine nut oil, pistachio oil, poppy seed oil, rice germ oil, thistle oil, camellia oil, sesame oil, rhea butter oil, soybean oil, sunflower oil, tall oil, tsubaki oil, walnut oil, varieties of "natural" oils with altered fatty acid compositions, Neochloris oleoabundans oil, Scenedesmus dimorphus oil, Euglena gracilis oil, Phaeodactylum tricornutum oil, Pleurochrysis carterae oil, Prymnesium parvum oil, Tetraselmis chui oil, Tetraselmis suecica oil, Isochrysis galbana oil, Nannochloropsis salina oil, Botryococcus braunii oil, Dunaliella tertiolecta oil, Nannochloris oil, Spirulina oil, Chlorophyceae oil, Bacillia rophyta oil, a mixture of the aforementioned oils and animal oils (especially marine oils), algae oils, oils from bran production, e.g., rice bran oil and biodiesel. The lipid phases also include product phases which arise during a synthesis or a transesterification process of lipids, for example during the production of biodiesel or ester oils. Also, lipid phases derived from disposal or waste utilization, for example, from grease traps. This also applies to used edible fats, fats and oils from carcass processing, oils and fats from technical applications or used lubricating/separating agent preparations, which fall under the definition mentioned herein. The lipid phase also includes distillation products, such as those produced in the production of refined oils from mineral oils, and oils obtained by means of extractive processes (e.g., essential oils).

Carboxylic Acids

Carboxylic acids are organic compounds which carry one or more carboxyl groups. A distinction is made between aliphatic, aromatic and heterocyclic carboxylic acids. Aliphatic forms of carboxylic acids, also called alkanoic acids, are fatty acids and are further listed in the following paragraph.

Fatty Acids

In general, fatty acids are aliphatic carbon chains with at least one carboxylic acid group. The carbon atoms may be linked with single bonds (saturated fatty acids) or with double bond bridges (unsaturated fatty acids); these double bonds may be in a cis or trans configuration. As defined herein, fatty acids are such compounds having more than 4 consecutive carbon atoms besides the carboxyl group. Examples of linear saturated fatty acids are nonanecarboxylic acid, dodecanoic acid, tetradecanoic acid, hexadecanoic acid (palmitic acid), octadecanoic acid (stearic acid), n-eicosanoic acid (arachidic acid) and n-docosanoic acid. Examples of monoolefinic fatty acids are myristoleic acid, palmetoleic acid, petroselinic acid, oleic acid, elaidic acid, dicelic acid and the euruca acid. Examples of polyolefinc fatty acids are linoleic acid, linolenic acid, punicic acid, arachidonic acid and nervonic acid. Fatty acids can also carry functional groups such as vernolic acid, ricinoleic acid and lactobacillic acid. The functional groups herein include terminal cyclic carbon radicals.

As examples of the term "fatty acids" as used herein the following compounds should be mentioned: hexanoic acid, octanoic acid, decanoic acid, dodecanoic acid, tetradecanoic acid, hexadecanoic acid, heptadecanoic acid, octadecanoic acid, eicosanoic acid, docosanoic acid, tetracosanic acid, cis-9-tetradecenoic acid, cis-9-hexadecenoic acid, cis-6-octadecenoic acid, cis-9-octadecenoic acid, cis-11-octadecenoic acid, cis-9-eicosenoic acid, cis-11-eicosenoic acid, cis-13-docosenoic acid, cis-15-tetracenoic acid, t11-octadecenoic acid, t3-hexadecenoic acid, 9,12-octadecadienoic acid, 6,9,12-octadecatrienoic acid, 8,11,14-eicosatrienoic acid, 5,8,11,14-eicosatetraenoic acid, 7,10,13,16-docosatetraenoic acid, 9,12,15-octadecatrienoic acid, 6,9,12,15-octadecatetraenoic acid, 8,11,14,17-eicosatetraenoic acid, 5,8,11,14,17-eicosapentaenoic acid, 7,10,13,16,19-docosapentaenoic acid, 5,8,11-eicosatrienoic acid, taxoleic acid, pinolenic acid, sciadic acid, 6-octadecanoic acid, 9-octadecanoic acid, 6-octadecene-9-amino acid, 5,8,11,14-eicosatetrai acid, retinoic acid, isopalmitic acid, pristanoic acid, phytanic acid, 11,12-methylene-octadecanoic acid, 9,10-methylene-hexadecanoic acid, coronaric acid, (R, S)-liponic acid, (S)-liponic acid, (R)-lipoic acid, tariric acid, santalbic acid, stearolic acid, pyrulic acid, crepenoic acid, heisteric acid, ETYA, cerebronic acid, hydroxynvonic acid, ricinoleic acid, lesquerolic acid, brassylic acid, thapsic acid, phytic acid, sinapinic acid, cinnamic acid and trihydroxybenzoic acid.

Guanidino- and Amidino-Group Containing Compounds

Guanidino- and amidino-group-containing compounds and guanidine and/or amidine compounds are used synonymously herein.

The guanidino group is the chemical residue $H_2N-C(NH)-NH-$ and its cyclic forms, and the amidino group is the chemical residue $H_2N-C(NH)-$ and its cyclic forms (see examples below). Preference is given to guanidino compounds which, in addition to the guanidino group, have at least one carboxylate group (—COOH). It is further preferred if the carboxylate group(s) is at least one carbon atom separated from the guanidino group. Preference is also given to amidino compounds which in addition to the amidino group have at least one carboxylate group (—COOH). Furthermore, it is preferred if the carboxylate group(s) is/are separated by at least one carbon atom from the amidino group. Particularly preferred are arginine and arginine derivatives.

Arginine derivatives are defined as compounds having a guanidino group and a carboxylate group or an amidino group and a carboxylate group, wherein the guanidino group and carboxylate group or the amidino group and carboxylate group are at least one carbon atom apart, i.e. at least one of the following groups should be between the guanidino group or the amidino group and the carboxylate group: —CH2-, —CHR—, —CRR'—, wherein R and R' are independent from each other and represent any chemical residues. Of course, the distance between the guanidino group and the carboxylate group or the amidino group and the carboxylate group can also be more than one carbon atom, for example in the following groups —(CH2)n-, —(CHR)n-, —(CRR')n-, where n=2, 3, 4, 5, 6, 7, 8 or 9, as is the case, e.g., with amidinopropionic acid, amidinobutyric acid, guanidinopropionic acid or guanidinobutyric acid. Compounds having more than one guanidino group and more than one carboxylate group are, for example, oligoarginine and polyarginine. The following compounds are examples of preferred compounds having a guanidino group or an amidino group and a carboxylate group.

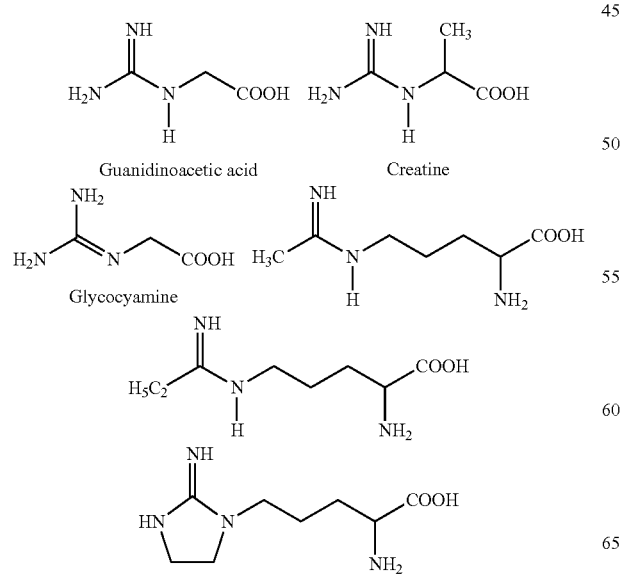

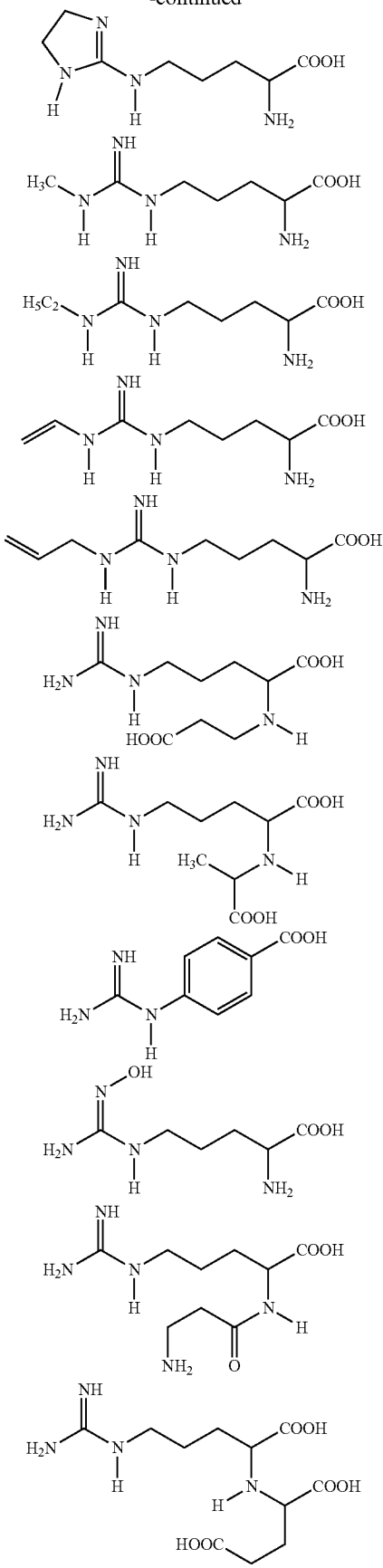

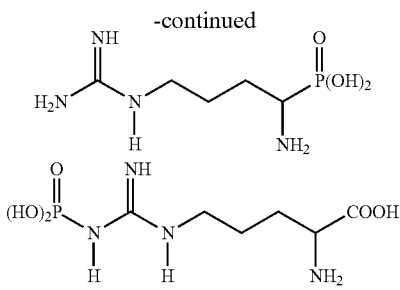

Preferred arginine derivatives are compounds of the following general formula (I) or (II)

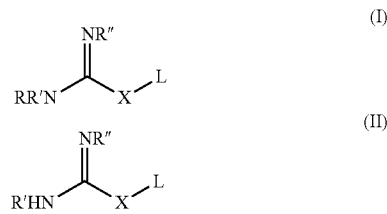

whereby

R', R", R'" and R"" represent independently of each other: —H, —OH, —CH=CH$_2$, —CH$_2$—CH=CH$_2$, —C(CH$_3$)=CH$_2$, —CH=CH—CH$_3$, —C$_2$H$_4$—CH=CH$_2$, —CH$_3$, —C$_2$H$_5$, —C$_3$H$_7$, —CH(CH$_3$)$_2$, —C$_4$H$_9$, —CH$_2$—CH(CH$_3$)$_2$, —CH(CH$_3$)—C$_2$H$_5$, —C(CH$_3$)$_3$, —C$_5$H$_{11}$, —CH(CH$_3$)—C$_3$H$_7$, —CH$_2$—CH(CH$_3$)—C$_2$H$_5$, —CH(CH$_3$)—CH(CH$_3$)$_2$, —C(CH$_3$)$_2$—C$_2$H$_5$, —CH$_2$—C(CH$_3$)$_3$, —CH(C$_2$H$_5$)$_2$, —C$_2$H$_4$—CH(CH$_3$)$_2$, —C$_6$H$_{13}$, —C$_7$H$_{15}$, cyclo-C$_3$H$_5$, cyclo-C$_4$H$_7$, cyclo-C$_5$H$_9$, cyclo-C$_6$H$_{11}$, —PO$_3$H$_2$, —PO$_3$H$^-$, —PO$_3^{2-}$, —NO$_2$, —C≡CH, —C≡C—CH$_3$, —CH$_2$—C≡CH, —C$_2$H$_4$—C≡CH, or —CH$_2$—C≡C—CH$_3$,
or R' and R" together form one of the following groups: —CH$_2$—CH$_2$—, —CO—CH$_2$—, —CH$_2$—CO—, —CH=CH—, —CO—CH=CH—, —CH=CH—CO—, —CO—CH$_2$—CH$_2$—, —CH$_2$—CH$_2$—CO—, —CH$_2$—CO—CH$_2$— oder —CH$_2$—CH$_2$—CH$_2$—;

X represents —NH—, —NR""—, —O—, —S—, —CH$_2$—, —C$_2$H$_4$—, —C$_3$H$_6$—, —C$_4$H$_8$— or —C$_5$H$_{10}$— or a C1 to C5 carbon chain which may be substituted with one or more of the following residues: —F, —Cl, —OH, —OCH$_3$, —OC$_2$H$_5$, —NH$_2$, —NHCH$_3$, —NH(C$_2$H$_5$), —N(CH$_3$)$_2$, —N(C$_2$H$_5$)$_2$, —SH, —NO$_2$, —PO$_3$H$_2$, —PO$_3$H$^-$, —PO$_3^{2-}$, —CH$_3$, —C$_2$H$_5$, —CH=CH$_2$, —C≡CH, —COOH, —COOCH$_3$, —COOC$_2$H$_5$, —COCH$_3$, —COC$_2$H$_5$, —O—COCH$_3$, —O—COC$_2$H$_5$, —CN, —CF$_3$, —C$_2$F$_5$, —OCF$_3$, or —OC$_2$F$_5$;

L represents a hydrophilic substituent selected from a group consisting of: —NH$_2$, —OH, —PO$_3$H$_2$, —PO$_3$H$^-$, —PO$_3^{2-}$, —OPO$_3$H$_2$, —OPO$_3$H$^-$, —OPO$_3^{2-}$, —COOH, —COO$^-$, —CO—NH$_2$, —NH$_3^+$, —NH—CO—NH$_2$, —N(CH$_3$)$_3^+$, —N(C$_2$H$_5$)$_3^+$, —N(C$_3$H$_7$)$_3^+$, —NH(CH$_3$)$_2^+$, —NH(C$_2$H$_5$)$_2^{30}$, —NH(C$_3$H$_7$)$_2^+$, —NHCH$_3$, —NHC$_2$H$_5$, —NHC$_3$H$_7$, —NH$_2$CH$_3^+$, —NH$_2$C$_2$H$_5^+$, —NH$_2$C$_3$H$_7^+$, —SO$_3$H, —SO$_3^-$, —SO$_2$NH$_2$, —CO—COOH, —O—CO—NH$_2$, —C(NH)—NH$_2$, —NH—C(NH)—NH$_2$, —NH—CS—NH$_2$, or —NH—COOH, Volume Fraction The terms volume fraction (water volume fraction) and volume ratio (water volume ratio) are used synonymously herein. The volume fraction or the volume ratio is defined as the quotient of the volume of the water phase and the total volume of lipid phase and water phase before the water phase is mixed in.

A volume fraction or volume ratio of the water phase of 5% by volume results accordingly, if, for example, in 95 L lipid phase, the admixture of 5 L water phase will take place.

Process Arrangement, Process Stage and Procedure Stage

The term "process arrangement" as used herein refers to a sequence of individual process steps or procedure stages, respectively.

The terms "process stage" and "procedure stage" are used interchangeably herein. A process or procedure stage comprises the process steps or procedure steps of a process embodiment.

The terms "process step" and "procedure step" are used interchangeably herein. The terms process step and procedure step relate to the individual steps of one of the embodiments of the method according to the invention.

Mixing and Homogenizing

The term "mixing", which is used synonymously with the term "admixing", is understood as a process which leads to contact of phases and/or substances, whereby a homogeneous or inhomogeneous continuous or discontinuous phase arises in which the mixed substances/compounds coexist. Since the mixing result depends considerably on the miscibility of the substances/compounds on the one hand and the intensity of the mixing process on the other hand; a further distinction is made herein between a stirring entry and an intensive mixing procedure. Herein, the term "stirred introduction" or "mixing introduction" summarizes all mixing processes in which substances/compounds are brought into contact with one another by means of laminar or turbulent flows. By the terms homogenizing, dispersing, intensive mixing, intensive admixture, intensive mixer and intensive mixing procedure, as used interchangeably herein, methods are summarized that are suitable for generating cavitations in fluids with generation of nano-scaled surfaces between two fluids. In principle, a distinction can be made between four process groups: rotor-stator, high-pressure, ultrasound and membrane systems. The simplest variant of a rotor-stator system is the stirrer in a container. Further developments of the rotor-stator systems are toothed-wheel dispersing machines and colloid mills, which are distinguished by their ability to produce clearly defined stresses. High-pressure homogenizers are used in particular when very high specific energy inputs are required. High-pressure homogenizers essentially consist of a high pressure pump and a comminution unit. As high-pressure pumps, piston pumps which produce pressures between 50 and 10,000 bar are usually used for homogenization. Through the use of intensive mixers very small droplet sizes can be achieved, depending on the individual fluid, it is between 0.1 and 10 micrometers on average, while the droplet sizes are usually larger with the use of a stirred introduction.

Hydration of Mucilage

The term "hydration" as used herein means attachment of water molecules to a compound or compound aggregate. This may be due to intermolecular bonding energies and/or arising by including the compound/complex in a water micelle. Thus, as used herein, the terms hydration or hydratability are understood to mean the binding of individual water molecules or the formation of a water envelope at or around mucilage compounds and/or aggregates thereof. The presence of hydration of mucilages which may be present in a lipid phase can be recognized, e.g., by a clouding of the lipid phase after a water admixture. Such turbidity can be quantified by measurement methods such as turbidimetry. For the determination of droplet sizes, among others, a dynamic laser scattering method (DLS) can be used.

The term "hydrated mucilage" as used herein summarizes the mucilages as defined herein which, as a result of one of the methods of the present invention, have attachment of water molecules and/or are included in a water micelle as previously described.

The term "mucilage aggregates" as used herein refers to contiguous structures of hydrated mucilages that are linked together by intermolecular bonding energies and/or complex formation and can be recognized by the naked eye.

By the term "mucilage phase" as used herein is meant a contiguous/coherent liquid phase of hydrated mucilages located in the free water phase, which is in the free water phase and/or is at the phase boundary to the lipid phase.

Thus, a "mucilage-containing water phase" is a free water phase in which hydrated mucilages may be present in a continuous and/or discontinuous form.

Complete hydration means that 90%, preferably 92%, more preferably 95%, more preferably 98% and most preferably 99% by weight of the hydratable mucilages are hydrated in the provided lipid phase.

Hydratable Mucilage

The term "hydratable mucilages" refers to mucilages that can bind water molecules or that can form a water envelope around it and/or around its aggregates.

Reaction Mixture

The term "reaction mixture" as used herein means a lipid/water phase which has been prepared using an aqueous solution according to the invention and by means of any desired mixed procedure.

Emulsion

The term "emulsion" as used herein means mixtures of water and oil or fat which may be in the form of a water-in-oil or oil-in-water emulsion in any weight ratio. The term "emulsion-poor phase" is understood as meaning aqueous phases or lipid phases in which less than 5% by weight of water is in the lipid phase or less than 5% by weight of neutral lipids is present in the water phase.

Free Water Phase

The term "free water phase" as used herein means a volume fraction of water or an aqueous solution which is emulsion-free or emulsion-poor (low in emulsions). Emulsion-poor means that less than 5% by weight, preferably less than 4% by weight, particularly preferably less than 3% by weight, more preferably less than 2% by weight and most preferably less than 1% by weight are neutral fats forming an oil/water (O/W) emulsion herein. The free water phase as referred to herein forms below the lipid phase and distinctly differs in appearance from the lipid phase and has a measurable water content of >70% by weight, preferably >75% by weight, more preferably >80% by weight, more preferably >85%, more preferably >90% by weight and most preferably >95% by weight. The water phase can be completely free of suspended matter or turbidity or be present as a turbid solution. Preferably, it is clear or slightly to moderately turbid. The turbidity may be caused by hydrated and aggregated mucilage present in particulate form. The turbidity can be quantified for example by turbidimetry. Preference is given to FTU values of <50 of the free water phase for detecting the presence of a free water phase.

Phase Separation

The term "phase separation", which is used synonymously with the term "separation of phases", denotes the process of forming at least 2 liquid and/or solid phases which were previously mixed with one another and were present as an emulsion. The phases that are present after a phase separation preferably consist of >90% by weight of the same class of compounds, i.e. a water or lipid phase. However, the term separation of phases also refers to the deposition of hydrated mucilages from an emulsion which may be in the form of a contiguous liquid phase or in the form of a discontinuous solid phase.

Separation Procedure

Basically, sedimentation describes the movement of disperse particles in a gas or liquid, usually under the influence of gravity or centrifugal force due to their higher density. Magnetic or electrostatic fields can also cause sedimentation processes.

The term "sedimentative phase separation" includes phase separation by gravity (gravitational field), heating, coalescing, ultrasonic and/or centrifugal procedures. Under the term "sedimentative phase separation" is also understood that a phase separation is accomplished by the gravitational field which is also be assisted or accelerated by heating, coalescence, ultrasound and/or a centrifugal processes. Preferably, the term "sedimentative phase separation" as used herein refers to the process of separation of phases resulting from density differences.

The term "centrifugal phase separation" as used herein refers to an apparatus separation of phases using centrifugal acceleration. It comprises in particular methods known to the person skilled in the art using centrifuges, decanters and preferably separators.

Since the reaction mixture principally consists of liquid phases with different densities, a phase separation by sedimentation, in principle, is possible. If the hydrated organic compounds to be separated do not spontaneously dissolve out the lipid matrix completely, the separation efficiency (phase separation efficiency) and rate of phase separation can be increased by means of tensile and compressive forces. This is easily possible according to the prior art by means of a simple centrifuge or a separator suitable for this purpose. The use of positive or negative pressure is also possible. Separators and decanters are systems in which equal or non-uniform rotating discs or plates or drums which provide tensile or centrifugal forces and in addition a simultaneous pressure build-up. The advantage of using separators is that they can be used for continuous phase separation. Therefore, a particularly preferred embodiment for phase separation of lipid phases which are clarified by sedimentation already is to perform a phase separation with a separation apparatus. For the preferred phase separation by a separator, systems having a flow rate greater than 3 $m^3/h$, more preferably >100 $m^3/h$, and most preferably >400 $m^3/h$, are preferred. The temperature of the reaction mixture to be separated can in principle correspond to that which has been selected for the preparation thereof. However, it may also be advantageous to vary the temperature and to choose a higher temperature, if e.g. thereby the efficiency of the separation tool is increased, or a lower temperature, e.g. if thereby the extraction efficiency of the water phase is increased. In general, a temperature range between 15 and 50° C. is preferred, more preferably from 18 to 40° C., and most preferably between 25 and 35° C. The dwell time in a separation apparatus or a centrifuge depends essentially on the apparatus-specific properties. In general, the lowest possible dwell time in a separation apparatus is economically preferred, such a preferred dwell time for a separation separator is <10 minutes, more preferably <5 minutes, and most preferably <2 minutes. For centrifuges, a preferred dwell time is <15 minutes, more preferably <10 minutes, and most preferably <8 minutes.

The selection of the centrifugal acceleration depends on the density difference of the two phases to be separated and must be determined individually. Preferably, acceleration forces are between 1,000 and 15,000 g, more preferably between 2,000 and 12,000 g, and most preferably between 3,000 and 10,000 g.

Preference is given to a separation into an oil and a water phase in which an oil and a water phase, which is present in >90% by volume, more preferably >97% by volume and most preferably >99% by volume, are obtained as a pure oil or water phase, respectively.

Mucilage

The term "mucilage" summarizes organic compounds, which are present in the different lipid phases and have water-binding properties and is therefore bound or can bind water molecules upon contact with water, whereby they are hydratable, and an emulsion is formed. In this case, not meant are mucilages which may be in the lipid phase and readily extracted and separable by addition of pure water (neutral pH, ion-poor) or which can even be separated by centrifugal separation techniques. Rather, the mucilage meant herein bind water thereby forming an emulsion. However, under appropriate circumstances, as described herein (e.g., by hydration, due to treatment with any of the aqueous solutions containing an acid or alkali described herein), these mucilages may also be converted/transferred into a water phase. Examples of the mucilages herein include:

"Phospholipids" as used herein are amphiphilic lipids containing a phosphate group and belonging to either the phosphoglycerides or the phosphosphingolipids. Furthermore, acid glycoglycerolipids such as sulfoquinovosyldiacylglycerol or sulfoquinovosyldiacylglycerol.

"Phosphoglycerides" (also referred to as glycerophospholipids or phosphoglycerolipids) consist of a diacylglyceride whose remaining terminal hydroxy group is attached to a phosphate residue which is either not further modified (phosphatidic acid) or esterified with an alcohol. The most common members of the latter group are phosphatidylcholines (also called lecithins), phosphatidylethanolamines and phosphatidylserines.

By the term "glycolipid" as used herein is meant compounds in which one or more monosaccharide residues are joined by a glycosidic bond to a hydrophobic acyl residue. These include glyceroglycolipids and glycerosphingolipids, furthermore rhamnolipids, sophrolipids, trehalose lipids, mannosterylerythritol lipids, as well as sphingolipids.

"Glycophosphatidylinositols" are compounds in which saccharides are glycosidically linked to the inositol group of phosphatidylinositols.

Under the term mucilage belong also organic compounds such as waxes, wax acids, lignins, hydroxy and mycolic acids, fatty acids with aliphatic or cyclic hydrocarbon structures, such as shikimic acid, or 2-hydroxy-11-cycloheptylundecanoic acid, mannosterylerythritol lipid, carotenes and carotenoids, chlorophylls, and their degradation products, phenols, phytosterols, in particular β-sitosterol and campesterol and sigmasterol, sterols, sinapine, squalene.

Phytoestrogens, e.g., isoflavones or lignans. Furthermore, steroids and their derivatives, such as saponins. Also polysaccharides, including pectins such as rhamnogalacturonans and polygalacturonic acid esters, arabinans (homoglycans), galactans and arabinogalactans, as well as pectic acids and amidopectins. Furthermore, long-chain or cyclic carbon compounds, also fatty alcohols, hydroxy and epoxy fatty acids. Likewise glycosides, lipo-proteins, lignins, phytate or phytic acid as well as glucoinosilates. Proteins, including albumins, globulins, oleosins, vitamins, e.g., retinol (vitamin A1) and derivatives such as retinoic acid, riboflavin (vitamin B2), pantothenic acid (vitamin B5), biotin (vitamin B7), folic acid (vitamin B9), cobalamines (vitamin B12), calcitriol (vitamin D) and derivatives, tocopherols (vitamin E) and tocotrienols, phylloquinone (vitamin K) as well as menaquinone. Furthermore tannins, terpenoids, curcumanoids, xanthones. But also sugar compounds, amino acids, peptides, including polypeptides, but also carbohydrates, such as glucogen.

Applications

The method of the present invention is applicable to all lipid phases as defined herein which contain hydratable mucilages that can be separated using the methods of the present invention. The applicability of the method can be easily checked by a test method described herein. Here, the presence of hydratable mucilages, as defined herein, is a determinant of applicability. This applies in particular to oils and fats of plant or animal origin. These include in particular edible oils, cosmetic oils, base oils, lubricating oils, technical oils. However, the lipid phases can also come from a technical process, examples of which are lipid phases, which arise in the context of a biodiesel production or in the production of an ester oil. Other applications include extracts, such as essential oils. Furthermore, lipid phases can be treated with the method according to the invention, which have a mineral origin, e.g., there is an applicability in particular in distillates of fossil crude oils. However, the method is also applicable to contaminated oils and fats, as is the case with used edible fats or fats and oils which have been used for technical applications. The process is also of particular value for oil/water mixtures collected from, for example, separators or collectors, and wastewater streams.

The inventive method is characterized by a low expenditure on equipment, so that this can be implemented in small and mobile systems, which, especially in the field of recovery of oils and fats from secondary and/or waste streams, makes the method economically feasible.

DESCRIPTION OF THE FIGURES

FIG. 1: shows Table 1a of Example 1.
FIG. 2: shows Table 1b of Example 1.
FIG. 3: shows Table 2 of Example 4.
FIG. 4: shows Table 3 of Example 5.

EXAMPLES

Measurement Methods

Figure 5:
FIG. 5: shows rapeseed oil, which was mixed with a 10 wt % metasilicate solution at a water volume ratio of 35% by volume and at a reaction temperature of 60° C. for 15 minutes after a settling (separation) time of 2 days. The clear water phase (below) contains hydrated and complexed mucilaginous substances, which settled to the bottom of the container, and partly float as small or large aggregates in the water phase and form a sharp phase boundary to the crystal-clear oil phase.
Figure 6:
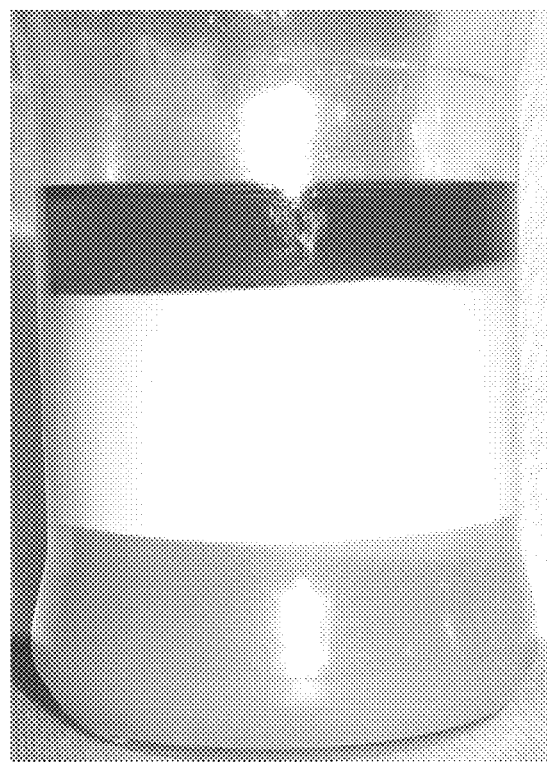
FIG. 6: shows a sample after a 2 hour sedimentation separation of Experiment 7 that was taken from the area of phase separation 1 hour after mixing soybean oil with sodium carbonate (concentration 20% by weight, volume ratio 35% by volume, reaction at 60° C.) in the second stage of the process. The floating oil phase (water content 0.6% by weight) is only slightly turbid and delimited by a sharp phase boundary from the underlying continuous mucilage phase. The latter is distinguished by a sharp phase boundary from the slightly turbid free water phase, which has a neutral fat content of 0.8% by weight.

The following measuring methods were used in the context of the exemplary embodiments described below:

The content of phosphorus, calcium, magnesium and iron in the lipid phase was determined by means of ICP OES (Optima 7300, PerkinElmer, Germany). Values in mg/kg (or in ppm).

The proportion of free fatty acids in the lipid phase was determined by means of a methanolic KOH titration with a Titroline 7000 titrator (SI-Analytics, Germany) values in % by weight (g/100 g).

The water content in the lipid phase, which is also referred to herein as oil moisture (content), was determined by means of an automatic titration according to the Karl Fischer method (Titroline 7500 KF trace, SI-Analytics, Germany), values in % by weight (wt %).

The qualitative detection of glycoglycerolipids and glycosphingolipids was carried out by atomic emission spectroscopy and thin layer chromatography. In the case of the latter, a separation into different classes of compounds with subsequent differentiation of the present sugar residues can be achieved. A close and sharp limitation of the bands that are displayed indicates a high degree of uniformity of the compounds present therein, while broad and unsharp bands indicate a heterogeneity of the compounds and in particular of the sugar residues and thus it is suitable for the detection of hydrolysis. Thin-layer chromatography was carried out with silica gel G plates. The separation is carried out with a mixture of chloroform/acetone/water (30/60/2). The development was carried out with a naphthyl ethylene diamine reagent, which dyes the sugar residues of the glycerolipids.

The qualitative and quantitative detection of carboxylic acids was carried out by gas chromatography.

The analysis of 3-MCPD was carried out by mass spectroscopy. Sample preparation and analysis were performed as described in the following: Zhou Y, Wu Z, Li C. Coupling neutral desorption sampling to dielectric barrier discharge ionization mass spectrometry for direct oil analysis. Anal. Methods, 2014, 6: 1538-1544.

The pH was determined with a glass capillary electrode (Blue-Line, ProLab 2000, SI-Analytics, Germany).

All solutions containing the compounds according to the invention or guanidine or amidine group-containing compounds were dissolved in an ion-poor or an ion-free water phase.

Example 1

Investigation of the Procedure Feasibility

Samples of 200 ml of rapeseed oil with the following characteristics: phosphorus 158 mg/kg, calcium 33 mg/kg, free fatty acids 1.6% by weight were each mixed in a glass beaker with one of the aqueous solutions according to Table 1 with a magnetic stirrer for 15 minutes at 500 rpm. Examination series were carried out at 25°, 40°, 60° and 80° C. Each series of experiments was repeated 4 times. The samples were then placed in a reparatory funnel and the course of the phase separation was visually tracked. When a water phase became visible in the area of the container bottom, the time required for this was recorded. For each series of tests, a centrifugal clarification of the oil phases, which had formed after 1, 2, 3 and after 4 hours, was performed. The oil phases were centrifuged at 3,600 rpm for 3 minutes, then. The amount of the separated water phase was determined and the quantity ratio to the oil phase was calculated. Subsequently, samples were taken from the oil phase to determine the residual water content.

The water phases previously separated from the oil phases were centrifuged together with the hydrated mucilages contained therein. Thereafter, the volume of the resulting free and clear water phase was determined and the separated and condensed mucilage mass was subjected to freeze-drying and then weighed.

The results are numerically listed in Table 1. With an addition volume of the basic aqueous solutions of 3% and 5%, there was practically no spontaneous phase separation within the given time at low temperature. At higher added water volume ratios, the rate and completeness of spontaneous phase separation increased rapidly, with rapid and complete separation of mucilage into the water phase. Increasing the concentration of the basic compounds had little effect on the rate of separation of phases and the amount of separated mucilages. An increase in the temperature of the reaction mixture accelerated the phase separation and resulted in an increase in the amount of separated mucilage as compared to a lower temperature process at the same water addition ratio.

Example 1a

In a comparative experiment for separation of phases by means of centrifugal separation processes, similar to the experimental procedure of Example 1, investigations were carried out using 500 kg of rapeseed oil in each case. For this purpose, the oils were mixed with sodium carbonate solutions with the following concentrations and the volume was added by means of an in-line rotor-stator mixer: A) concentration 10% by weight/volume addition 10% by volume; B) concentration 10% by weight/volume addition 20% by volume. After mixing and formation of an emulsion, 100 l each was placed in 4 storage containers (VB 1 to VB 4) and 100 l in a sedimentation tank with a conical container bottom and longitudinal inspection glasses in the sidewall region. The emulsions of the reservoir were fed to a plate separator after a separation phase (sedimentation time) (SP). The separated phases were again taken up in separate containers. The following experimental procedures were carried out: V1) emulsion A), SP 1 minute; V2) Emulsion A), SP 120 minutes; V3) Emulsion B), SP 1 minute; V4) Emulsion B), SP 120 minutes. Samples from emulsions A) and B), which were in the sedimentation tank, were examined concerning the separation of phases (visualization of a free water phase/formation of mucous aggregates) at the identical time points of the sedimentation times. The neutral lipid content in the separated heavy phases and the free water phases of the sedimentation tank as well as the water content in the separated light phases and the oil phases in the sedimentation tank at the time of the separation were determined.

Results: After a separation time of 1 minute, no free water phase had separated from the emulsions in the sedimentation tank. By centrifugation no separation of phases was accomplished 1 minute after preparing emulsions A) and B); both the heavy and the light phases emerged as a viscous emulsion. Accordingly, the water content in the light phases was 8.3% by weight and 14.5% by weight, respectively, and the triglyceride content in the heavy phases was 86% by weight and 78% by weight, respectively. After a separation time of 120 minutes, only a small amount of a free water phase had settled in the sedimentation tank containing emulsion A, with a mucilage layer contained therein, while in the sedimentation tank containing emulsion B), the oil phase was only moderately turbid and a clear water phase had settled on the bottom of the container with mucilage aggregated therein. In the centrifugal phase separation of emulsion A), which was conducted after 120 minutes, the light and heavy phases were still significantly emulsive, the water content in the light phase was 3.2% by weight and the neutral fat content in the heavy phase was 6.8% by weight. After the centrifugal separation of emulsion B), which was done after 120 minutes, the light phase was only slightly turbid, the water content was 0.8% by weight and the heavy phase was partly clear after settling with aggregated mucilages contained therein, the neutral fat content being 1.3% by weight.

Example 2

Investigation of the Effects of Hydration of Mucilage on the Separation Efficiency For the investigations cold pressed oils of rapeseed (RÖ) and sunflower seeds (SBÖ) were used with the following parameters: for RÖ: phosphorus content 6.2 ppm (6.2 mg/kg), calcium 28 ppm (28 mg/kg), iron 1.8 ppm (1.8 mg/kg), free fatty acids 1.1% by weight, and for SBÖ: phosphorus content 8.2 ppm (8.2 mg/kg), calcium 30 ppm (30 mg/kg), iron 2.2 ppm (2.2 mg/kg), free fatty acids 1.3 wt.-%. All raw oils were clear.

To carry out the experiment, a preliminary study was performed to examine the hydratability of the mucilages present in the oils with the compounds citric acid, sodium carbonate, sodium metasilicate, sodium hydroxide and arginine in various process arrangements according to the method described in Example 1. The selection criteria used were the rate of phase separation and the effectiveness of hydration to obtain the largest possible amount of mucilage. It was found that the sequence of the procedure with citric acid (concentration 8.5% by weight, volume ratio 15% by volume, reaction at 25° C.), followed by sodium carbonate (concentration 5% by weight, volume ratio 30% by volume, reaction at 60° C.) and then of arginine (concentration 0.1 molar, volume ratio 15% by volume, reaction at 40° C.) for the treatment of rapeseed oil and with the sequence of the process arrangement with sodium carbonate (concentration 5% by weight, volume ratio 20% by volume, reaction at 30° C.), followed by sodium metasilicate (concentration 10% by weight, volume ratio 35% by volume, reaction at 60° C.) and then arginine (concentration 0.2 molar, volume ratio 20% by volume, reaction at 25° C.) for the treatment of sunflower oil resulted in the best possible process conditions. In experiment A), in each case 300 l of oil (RÖ series A1, SBÖ series A2) was treated according to the selected scheme; the aqueous solutions were added to the oil phases in one portion and then mixed with a propeller stirrer for 15 minutes (measured from the beginning of the solution volume input or once the intended reaction temperature had been attained) in a heatable vessel, which was tapered at the bottom. The container walls were equipped with a long inspection glass, which allowed assessment of the reaction mixture and the formation of a phase boundary. After mixing, the reaction mixture was allowed to rest for 60 minutes and then the water phase that had formed was removed until the clearly visible phase boundary reached a predefined level in the vessel. The predefined phase boundary level was 5 cm below a vessel outlet through which the clarified oil phase was drained after level adjustment. A sample was centrifuged in order to determine the residual water content and the amount of separable solids in the clarified oil phases. If predominantly solids could be separated, the oils were clarified with a decanter (Trikanter Z23-3/441, Flottweg, Germany) and if it was possible to separate predominantly a free water phase, the oils were clarified in a separator (CSA1-06-475, Westfalia, Germany). Subsequently, the oils were added to another similar reaction vessel and, as described above, the next treatment step was carried out. In a comparative experiment (B), the rapeseed oil (test series B1) and the SBÖ (test series B2) were treated according to the following scheme: B1: citric acid (concentration 8.5% by weight, volume ratio 1% by volume, reaction at 25° C.), followed by sodium carbonate (concentration 15% by weight, volume ratio 3% by volume, reaction at 60° C.) and then arginine (concentration 0.3 molar, volume ratio 3% by volume, reaction at 40° C.); B2: sodium carbonate (concentration 15% by weight, volume ratio 2% by volume, reaction at 30° C.), followed by sodium metasilicate (concentration 20% by weight, volume ratio 3% by volume, reaction at 60° C.) and then arginine (concentration 0.5 molar, volume ratio 2% by volume, reaction at 25° C.). The mixing conditions were the same as those in experimental series A; immediately after the mixing, the resulting emulsions were separated with the separator. After the last treatment step, samples were taken for the determination of the oil indices in all treatment series. In test series A, the contents of the vessel were drained via a botton drain after removing the clarified oil phase. The liquid volume, consisting of the remaining water phase, which also predominantly contained the dissolved mucilage and an emulsion layer consisting of hydrated mucilage and an oil layer, was filled into an hourglass-shaped container made of acrylic glass and after a separation time of 15 to 60 minutes (after clarification of the aqueous solution), the free water phase was discharged through an outlet in the container bottom until the phase boundary was in the tapered region of the container. Through an outlet in the container placed above the tapered region, the oil phase was drained off with the hydrated mucilages contained therein and clarified with a laboratory decanter (Lemitec, MD 60, Germany); subsequently the reaction mixture of the same treatment stage was admixed to the resulting oil phases in a repetition of this process stage. The water phases obtained in each case contained aggregates of the hydrated mucilages, which floated on the solution and could be easily separated with a sieve filter. The free water phases were used again in subsequent repetitive studies. The separated mucilage masses of test series A, as well as the aqueous phase obtained in the separation in test series B, were washed out exhaustively with organic solvent (hexane) and the amount of neutral fats extractable therewith was determined. The final oil phases obtained after the last treatment step were subjected to vacuum drying. The energy required was determined. The mucilage phases were dried in a vacuum dryer, dissolved in a solvent mixture and fractionated by column chromatography. The fractions were analyzed by GC and DC. The oils were tested for oil characteristics and the presence of trans-fatty acids and 3-MCPD esters.

Results: After hydration and sedimentation of the mucilage and phase separation, the oil phases clarified after treatment with citric acid and with sodium metasilicate were clarified with a decanter and the remaining clarified oil phases with a separator of remaining water/mucilage residues. The resulting oil phases had a slight haze. The resulting heavy phases (water or solid phases) were without apparent oil content. The generated emulsions of test series B were clarified with the separator. The resulting oil phases were markedly turbid; the heavy phases (water phase) were present as oil-in-water emulsions. Analysis of the oils obtained after the last treatment step gave the following results for RÖ: Method A: Phosphorus content 0.8 ppm (or 0.8 mg/kg), calcium <0.5 ppm (<0.5 mg/kg), iron <0.5 ppm (<0.5 mg/kg), free fatty acids 0.05% by weight; Method B: Phosphorus content 1.2 ppm (1.2 mg/kg), calcium 0.8 ppm (0.8 mg/kg), iron <0.5 ppm (<0.5 mg/kg), free fatty acids 0.18% by weight. SBÖ treated with method A had the following contents: phosphorus <0.5 ppm (<0.5 mg/kg), calcium <0.5 ppm (<0.5 mg/kg), iron <0.5 ppm (<0.5 mg/kg), free fatty acids 0.07% by weight and for test series B: phosphorus content 1.0 ppm (1.0 mg/kg), calcium 0.9 ppm (0.9 mg/kg), iron <0.5 ppm (<0.5 mg/kg), free fatty acids 0.2% by weight.

The separated mucilage phases of test series A contained a mass fraction of neutral fats of 0.2% by weight, while the water phases of test series B had a mass fraction of neutral fats of 12% by weight. The energy requirement for the final drying of the oil phases was lower by 35% (RO) and 42% (SBÖ) for the oils of test series A than for the corresponding oils of test series B. In the oils, no trans-fatty acids or 3-MCPD esters could be detected. Thin layer chromatography (TLC) analysis showed bands in all samples corresponding to digalactosyl and monogalactosyl diglycerides as well as steryl glycosides. These were sharply delimited and compatible with low-hydrolysis fractions of these compounds.

Example 3

Studies on Hydration Efficiency

Soybean oil with the following characteristics: phosphorus content 18.2 ppm (18.2 mg/kg), calcium 36 ppm (36 mg/kg), iron 2.8 ppm (2.8 mg/kg), free fatty acids 1.4 wt %, was subjected to a preliminary study on the hydratability of mucilages contained herein. For this purpose, the following compounds were used in the form of aqueous solutions with different concentrations and volumes at different reaction temperatures: hydrochloric acid (HCl), phosphoric acid, citric acid, sodium hydrogen carbonate, sodium metasilicate, sodium borate, sodium hydroxide, arginine. As a practicable method arrangement for the purification, several process arrangements were found suitable, of which 4 were selected for the experiments:

Experimental series 1a: phosphoric acid (concentration 10% by weight, volume ratio 10% by volume, reaction at 20° C.), then sodium bicarbonate (concentration 15% by weight, volume ratio 30% by volume, reaction at 60° C.), followed by arginine (concentration 0.3 molar, volume ratio 10% by volume, reaction at 35° C.); Experimental series 2a: citric acid (concentration 8.4% by weight, volume ratio 15% by volume, reaction at 25° C.), then sodium carbonate (concentration 15% by weight, volume ratio 30% by volume, reaction at 60° C.), followed by arginine (concentration 0.3 molar, volume ratio 15% by volume, reaction at 35° C.); Experimental series 3a: sodium carbonate (concentration 10% by weight, volume ratio 30% by volume, reaction at 20° C.), then sodium metasilicate (concentration 15% by weight, volume ratio 20% by volume, reaction at 60° C.), followed by arginine (concentration 0.2 molar, volume ratio 10% by volume, reaction at 40° C.); Test series 4a: sodium borate (concentration 10% by weight, volume ratio 25% by volume, reaction at 20° C.), then sodium metasilicate (concentration 20% by weight, volume ratio 30% by volume, reaction at 70° C.), followed by arginine (concentration 0.5 molar, volume ratio 10% by volume, reaction at 40° C.). The mixing procedure of the water phases with the oil phases was carried out as in Example 2, whereby identical containers were also used; the separation time was set to 60 minutes. The clarification of the oil phases after the separation time was carried out with a centrifuge (2,000 rpm for 5 minutes). In a further series of experiments, the soybean oil was treated with the same process stages as described in the abovementioned test procedure, and the same concentrations of the compounds in the aqueous solutions and the same reaction temperatures as being used, but the volume fraction of the aqueous solutions was limited to 3 vol % at all process stages. In these experiments (test series 1b, 2b, 3b and 4b), a centrifugal clarification was carried out immediately after stirring. After centrifugation, 1,000 ml of each of the resulting oil phases were separated and subjected to a renewed treatment with the aqueous solution, according to the process step previously carried out, but with an added water volume fraction equal to the corresponding process stages 1a, 2a, 3a and 4a, respectively. The re-treated oil phases resulting from experiment 1a to 4a were given the designation 1a" to 4a" and the re-treated oil phases from test series 1b-4b were designated 1b" to 4b". The amounts of hydrated mucilage substances which could be discharged with the water phases were separated from the water phases by centrifuging the sedimented water phases and the dry weight of the condensed mucilage masses was determined after drying of the mucilage masses. In the final oil phases, drying and laboratory analysis were carried out as in Example 2.

Results: The sedimentation-clarified oil phases of test series 1a to 4a were slightly turbid, while the oil phases of test series 1b to 4b were emulsions. After centrifugation, the oil phases of test series 1a to 4a were slightly turbid to clear, while the oil phases of test series 1b to 4b remained slightly or moderately turbid. In the cleared oil phases of series 1a to 4a, which were again treated with the same aqueous solution as previously (series 1a" to 4a"), there was no or only a minimal amount of visible mucilage in the water phases, all of which remained clear. On the other hand, in all experiments of the test series 1b" to 4b", clearly visible amounts of mucilage were transferred from the oil phases to the water phases. The amount of mucilaginous material (dry weight) which could be recovered by re-treatment with a water phase was 0.01 to 0.03% by weight in comparison with the treated oil mass in tests 1a" 0.01 to 0.03% by weight, in tests 2a" 0.02 to 0.04% by weight, in test 3a" 0.01 to 0.03% by weight and in studies 4a" 0.03 to 0.06% by weight and in studies 1b" 1.2 to 2.1% by weight, in studies 2b" 1.8 to 2.5% by weight, in the investigations 3b" 2.9 to 3.5% by weight and in the investigations 4b" 2.8 to 3.5% by weight.

For the oil phases obtained from the test series after the last treatment step, the following parameters were determined: Test series 1a: Phosphorus content 0.7 mg/kg, calcium <0.5 mg/kg, iron <0.5 mg/kg, free fatty acids 0, 07% by weight; Test series 2a: Phosphorus content 0.5 mg/kg, calcium <0.5 mg/kg, iron <0.5 mg/kg, free fatty acids 0.04% by weight; Test series 3a: Phosphorus content <0.5 mg/kg, calcium <0.5 mg/kg, iron <0.5 mg/kg, free fatty acids 0.007% by weight; Test series 4a: Phosphorus content 0.9 mg/kg, calcium 0.7 mg/kg, iron <0.5 mg/kg, free fatty acids 0.09% by weight; Experimental series 1b: Phosphorus content 1.2 mg/kg, calcium 0.9 ppm (mg/kg), iron <0.5 mg/kg, free fatty acids 0.1% by weight; Test series 2b: Phosphorus content 1.0 mg/kg, calcium 0.6 mg/kg, iron <0.5 mg/kg, free fatty acids 0.07% by weight; Test series 3b: Phosphorus content 0.8 mg/kg, calcium 0.9 mg/kg, iron <0.5 mg/kg, free fatty acids 0.11% by weight; Test series 4b: Phosphorus content 1.5 mg/kg, calcium 1.5 mg/kg, iron 0.5 mg/kg, free fatty acids 0.17 wt %. No trans-fatty acids or 3-MCPD esters could be detected in the treated oil fractions. Thin-layer chromatographic analysis of the separated and fractionated mucilages revealed bands in all samples that corresponded to digalactosyl and monogalactosyl diglycerides and to steryl glycosides. These were sharply delimited and compatible with low-hydrolysis fractions of these compounds.

Example 4

Investigation of the Effects of the Admixing Procedure of Aqueous Solutions

The experimental arrangements of test series 2a and 3a of Example 3 were repeated with the identical soybean oil, wherein the admixing procedure in a series of experiments was carried out with a propeller mixer (study I.2.a. and I.3.a.) as described above and in another series of experiments with an intensive mixer (Ultrathurrax T18, Germany, 20,000 rpm for 5 minutes) (study II.2.a. and II.3.a.). In a preliminary study (Investigation VI.2.a. and VI.3.a. or V-II.2.a and V-II.3.a.) the minimum required volume of water or the water volume ratio, respectively, was determined for each of the purification stages which is necessary so that a free water phase settles spontaneously during the settling time and during the course of a phase separation within 60 min. The values were determined for the reaction temperatures 25°, 40° and 60° C.; the reaction conditions are listed in Table 2. For the main studies, which were carried out with an oil volume of 2.000 ml each, the following process steps were selected on the basis of the preliminary test results, for test series I.2.a.: citric acid (concentration 8.4% by weight, volume ratio 25% by volume, reaction at 25° C.), then sodium carbonate (concentration 20% by weight, volume ratio 20% by volume, reaction at 60° C.), followed by arginine (concentration 0.3 molar, volume ratio 20% by volume, reaction at 40° C.); for test series II.2.a.: citric acid (concentration 8.4% by weight, volume ratio 35% by volume, reaction at 25° C.), then sodium carbonate (concentration 20% by weight, volume ratio 30% by volume, reaction at 60° C.), followed by arginine (concentration 0.3 molar, volume ratio 20% by volume, reaction at 40° C.); for test series I.3.a.: sodium carbonate (concentration 10% by weight, volume ratio 30% by volume, reaction at 40° C.), then sodium metasilicate (concentration 15% by weight, volume ratio 10% by volume, reaction at 60° C.), followed by arginine (concentration 0.2 molar, volume ratio 25% by volume, reaction at 25° C.) and for the test series II.3.a.: sodium carbonate (concentration 10% by weight, volume ratio 40% by volume, reaction at 40° C.), then sodium metasilicate (concentration 15% by weight, volume ratio 15% by volume, reaction at 60° C.), followed by arginine (concentration 0.3 molar, volume ratio 30% by volume, reaction at 25° C.), The water phases obtained after the separation of the oil phases were centrifuged and the condensed mucilage phases were dried and weighed. The total weight of the mucilage dry masses obtained in the individual test series was determined.

Results: The determined water volume ratios and process conditions, in which a free water phase was formed within a sedimentation time of 60 minutes, or in which a phase separation took place, are listed in Table 2. The mucilaginous dry masses obtained from the individual test series were 54 g and 56 g for the test series I.2.a. and I.3.a., respectively, and 55 g and 57 g for the test series II.2.a. and II.3.a.

Example 5

Studies on Emulsion Separation

Rapeseed press oil with the following characteristics: phosphorus content 56.2 mg/kg, calcium 38 mg/kg, iron 3.8 mg/kg, free fatty acids 1.8% by weight, was used for the following experiments. First a preliminary study according to that in Example 1 was done. From those results process steps were selected that are suitable for a process implementation and in which it is possible to achieve a spontaneous phase separation within 30 minutes after the admixture of the water phase to the lipid phase, with an added water volume between 15 and 35 vol % and during which an increase in temperature of the reaction mixture could be performed, but no further measures were carried out to accelerate the phase separation. These conditions were fulfilled, among others, in the process arrangement V1: 1. Citric acid (concentration 8.4% by weight, volume ratio 30% by volume, reaction at 25° C.), 2. sodium carbonate (concentration 10% by weight, volume ratio 30% by volume, reaction at 60° C.), 3. arginine (concentration 0.3 molar, volume ratio 15% by volume, reaction at 40° C.) and in the process arrangement V2: 1. Sodium bicarbonate (concentration 15% by weight, volume ratio 35% by volume, reaction at 25° C.), 2. sodium metasilicate (concentration 10% by weight, volume ratio 30% by volume, reaction at 60° C.), 3. arginine (concentration 0.3 molar, volume ratio 20% by volume, reaction at 25° C.). In the main experiment, each 3,000 kg of the crude oil were treated with the 1st process stage of the process arrangement V1 and V2, wherein the water phases were admixed with a propeller stirrer for 15 min. The oil phases clarified by sedimentation after a separation time of 30 minutes were passed through a separator (FPC 6, 7000 rpm, Pieralisi Germany) at a volume flow rate of 200 l/h. Of the oil phases obtained, 1,000 kg were separated from each of the reaction conditions for the secondary test (N2). The main experiment with process stage 2 was carried out with the remaining oil phase under the aforementioned process conditions. From the oil phases which were obtained after spontaneous clarification and separation of the residual water/mucilage phases with the separator after the 2nd treatment stage, 1,000 kg from each of the reaction conditions were separated for secondary experiments (N3). The remaining oil phase was treated with the 3rd stage of the process using the above process conditions.

For mixtures that were heated, the oil and water phases were heated before addition and the preselected temperature was maintained until the end of the mixing procedure. Additional tests were carried out to determine the separability and separation efficiency of the emulsions, which resulted from the respective treatment stages by the addition of different water volume fractions (volume ratios) of the respective aqueous solutions used. From each 1,000 kg of the crude oil (experiment N1) or the pre-cleaned oils for the additional experiments N2 and N3, the oils were mixed with the following added water volume ratios (volume ratios) of the respective process stages in individual tests of 100 kg each: 2.5% by volume, 5% by volume, 7.5% by volume, 10% by volume, 15% by volume, 20% by volume, 25% by volume, 30% by volume, 35% by volume and 40% by volume. The aqueous solutions of the respective treatment stages were mixed using otherwise identical application conditions as in the main experiment. After 30 minutes, the clarified oils or emulsions were passed through the separator. The separation of the water/mucilage phase was carried out with the identical setting for all separations. Samples for determining the water content were taken from the oil phases immediately before and after the separator phase separation. The oil phases obtained in the main trial after the third stage of the process were examined with regard to the oil characteristics. The water phases separated with the separator were examined for the content of separated neutral fats. This was conducted by hexane extraction. The amount of neutral lipids was determined by evaporating the hexane phase and weighing the residue.

Results: (Numerical results of the secondary experiments are summarized in Table 3) In the main test, an optimal separation of the water/mucilage substance phases by means of sedimentation and treatment with a separator could be achieved with the preselected process sequences or process stages. The oil phase, which was obtained after the third stage of the process arrangement V1, had the following characteristics: Phosphorus content 0.8 mg/kg, calcium <0.5 mg/kg, iron <0.5 mg/kg, free fatty acids 0.03 wt %, and for the oil phase, obtained after the third stage of the process with the method arrangement V2: phosphorus content 0.5 mg/kg, calcium <0.5 mg/kg, iron <0.5 mg/kg, free fatty acids 0.01 wt %.

In the additional experiments, it was found that for emulsions which were produced in the first process stage of process arrangement V1 with an added water volume of ≤5% by volume, no or a minimal amount of a free water phase was present in the reaction vessel after the first 30 minutes. In the 1st stage of the process arrangement V2, a free water phase was only recognizable after an added water volume of more than 20% by volume after 30 min. The sedimentative separation of still existing emulsions was not successful or only incomplete in emulsions in which no free water phase had settled. In emulsions of this kind, even after treatment with a separator, a water content of >2% was present in the oil phase. For oils treated with a larger volume of added water, the water content in the oil phase was significantly lower in both instances: before and after passage through the separator as compared to experiments where a smaller volume of added water was used. In the 2nd process stage of the process arrangement V1 and V2, a free water phase was recognizable only after the volume of added water was 25 or 20 vol %, respectively, after 30 min. Corresponding to the results of the 1st stage, there was a high water content in the oil phase before and after passing through the separator in experiments where a small added water volume ratio (added water volume ratio) had been used. In general, the oil phases to which a small portion of an added water volume had been admixed had a significantly greater turbidity after 30 minutes than the reaction mixtures in which a larger volume of water had been admixed. In the 3rd stage, a similar tendency was shown, but a free water phase formed with all volumes of added water ratios. Oils that had a lower water volume fraction (water volume ratio) had a higher water content in the oil phase before and after the separator treatment than oil phases that had a larger volume of added water. The separated water phases had a significantly larger proportion of oil when the oil phases were mixed with a small volume of water than was the case with separations in which a larger volume of added water (water volume ratio) was admixed to the oil phases.

Example 6

Investigation of Sedimentation Procedure

Camelina press oil with the following characteristics: phosphorus content 26.2 mg/kg, calcium 18 mg/kg, iron 1.8 mg/kg, free fatty acids 1.1% by weight was used for the following experiment. In a preliminary study carried out according to that in Example 1, the following compounds were tested: HCl, citric acid, sodium bicarbonate, sodium hydroxide, sodium carbonate, sodium borate, sodium metasilicate. For the experimental procedure, the process arrangement identified as suitable was: 1. HCl (concentration 10% by weight, volume ratio 30% by volume, reaction at 25° C.), 2. sodium borate (concentration 15% by weight, volume ratio 35% by volume, reaction at 60° C.), 3. arginine (concentration 0.3 molar volume ratio 20 vol %, reaction at 40° C.). In this process arrangement a free water phase formed within 15 minutes after the admixing of the water phases, which was done as in Example 5, and in the course the spontaneous phase separation advanced to form a mucilage layer in the region of the phase boundaries. For each stage of the process arrangement, the time period within which, after completion of the mixing process of the water phase into the oil phase, the water content in the oil phase had dropped to a value below 1% by weight was determined on the basis of a 20 kg batch (process variant A). In 2 parallel runs, the phase separation was accelerated after an initial settling phase of 15 minutes, on the one hand by a coalescence process by passing the forming oil phase continuously through a quartz sand bed (mean grain size 1 mm, volume 21) (process variant B) and on the other hand by transferring the oil phase through pack (volume 11) made of glass wool (borosilicate glass, fiber thickness 11 μm) (process variant C) at a flow rate of 1.5 l/min. After filtering, the phases were collected in another container with a conical bottom and the water content in the oil phase was determined. When the specified water content was exceeded, the oil phase was again transferred from the collecting container and fed through the coalescer. The clarified oil phases, which had a residual water content of <1%, were then treated with the next process stage. After the third stage of the process, samples were taken for the determination of the oil characteristics of the three process variants. The water phases of the respective process stages were combined and passed through a sieve fabric (sieve mesh size 80 μm) after 24 h to separate aggregated mucilage. The separated mucilage fractions were spread on a mesh and then dried.

Results: A sedimentative clarification of the oil phase from the admixed water phase to a residual water content of <1% by weight could be achieved in all process stages. The periods of time (sedimentation time) for these were the following: 1st stage 60 minutes, 2nd stage 180 minutes; 3rd stage 135 minutes. Using the coalescing process, the time required to reach a residual water amount of <1% by weight could be reduced: for process variant B: 1st stage 40 minutes, 2nd stage 120 minutes, 3rd stage 60 minutes and for the process variant C: 1st stage 40 minutes, 2nd stage 60 minutes and 3rd stage 30 minutes. After the third stage of the process, the following oil characteristics were present: process arrangement A: Phosphorus content 0.9 mg/kg, calcium <0.5 mg/kg, iron <0.5 p mg/kg pm, free fatty acids 0.1% by weight; Process arrangement B: Phosphorus content 0.9 mg/kg, calcium <0.5 mg/kg, iron <0.5 mg/kg, free fatty acids 0.09% by weight; process arrangement C: Phosphorus content 0.8, calcium <0.5 mg/kg, iron <0.5 mg/kg, free fatty acids 0.07 wt %.

Example 7

Large-Scale Application of the Aqueous Extraction Process.

6,000 kg of soybean oil with the oil indices: phosphorus 42 ppm (mg/kg), calcium 7.4 ppm (mg/kg), magnesium 3.1 ppm (mg/kg), iron 1.6 ppm (mg/kg), free fatty acids 1.05% by weight, was subjected to a preliminary investigation according to Example 1, whereby a clarification of the oil phase from the water phase resulting in a residual water content of 1% by weight within 30 minutes was chosen to be the essential selection criterion. Further selection criteria included the separation efficiency and the economic efficiency of the process. For the preselected criteria, the following procedure was selected for the given oil: 1st stage: sodium hydroxide (concentration 1N, volume ratio 35% by volume, reaction at 40° C.), 2nd stage: sodium carbonate (concentration 20% by weight, volume ratio 35% by volume, reaction at 60° C.), 3rd stage arginine (concentration 0.3 molar volume ratio 25 vol %, reaction at 40° C.). The crude oil (feed tank 1) and the aqueous phase of stage 1 (feed tank 2) were adjusted to the respective reaction temperature by means of a heat exchanger. The mixture of the two phases was carried out with an in-line rotor-stator shear mixer (Fluco DMS 35 2.2/26-10, Fluid Kotthoff, Germany). The rotation frequency of the rotor-stator dispersing tool was set to 2,500 rpm. The oil and water phases were continuously fed by progressing cavity pumps (PCM EcoMioneau C, type MM25C6S, as well as type MM1C12S, Germany) in a metering ratio that can be set by a converter. An inflow volume of the oil phase was adjusted to 3 $m^3$/h. The water phase was added through a Y-tube at the entrance of the dispersing tool; the dose ratio was set as indicated above. After the intensive mixing procedure, the resulting water-in-oil emulsion was led through a conduit and introduced into storage tank 3, which served as the reaction and settling tank, through the inlet E1 mounted at a height of 1 meter above the sight glasses with a laminar flow profile. This storage tank had a conical bottom with the drain A1 and a sight glass area in the lower part of the container and a sight glass area which was at the height level of drain A2. Storage tank 3 had a height of 15 meters and a diameter of 40 cm. Above the sight glasses, there were concentrically arranged stainless steel half shells in the interior, which extended over the entire container area. 50 cm below the upper edge of the storage tank 3 was outlet A3, through which the clarified oil phase was continuously fed into a pipeline. The oil phase which was discharged from outlet A3 was collected into a vessel, from which it was pumped by means of a feed pump (delivery rate of 3 $m^3$/h) into a plate separator (AC 1500-430 FO, Flottweg, Germany), having a drum speed of 6,600 rpm; the maximum centrifugal acceleration was 10,000 g. The oil phase clarified by the separator was pumped via a pipeline into storage tank 4. From storage tank 4, the oil phase was used for the second process stage, which was conducted with an identical apparatus design and, with the exception of the heating temperature of the oil and water phases, with the same process conditions as in the previously performed process stage. The water/oil emulsion that was mixed with the water phase (from feed tank 5) was introduced into feed tank 6 via inlet E1. The sedimentively clarified oil phase from storage tank 6 was conducted into storage tank 7 after mechanical clarification by the separator (sequence as above). The oil phase herein was treated with process stage 3 using an identical apparatus design and, with the exception of the heating temperature of the oil and water phases (from receiver tank 8), with the same process conditions as in the previous process stage. The water/oil emulsion after admixture of the water phase was introduced into storage tank 9 via inlet E1. The sedimentively clarified oil phase from storage tank 9 was transferred into storage tank 10 after mechanical clarification by the separator (sequence as above).

Reservoir tanks 3, 6 and 9 were open at the top and had an overflow device that allowed any foam which floats at the top of the oil phase to be separated off and collected. The thus separated oil/foam mixture was separated by means of a decanter centrifuge (Lemitec, MD 60, Germany) into an oil and a mucilage phase; the separated oil was then fed again to the same treatment stage. During the introduction of the oil/water emulsions into storage tanks 3, 6 and 9, the free water phase was continuously or discontinuously discharged through outlet A2 of storage tanks 3, 6 and 9 so that the phase boundaries were kept at a constant level at the height of sight glass area. The forming aggregated mucilage phase was discharged during the course of the experiments together with the water phase. The drained water phases were introduced into separate collection vessels and filtered after a separation time of 6 hours and then fed to the process stage storage tanks 2, 5 and 8 respectively. Samples for analysis were taken from the final oil fraction and from the separated mucilaginous phases.

Results: A sedimentative phase separation could be achieved in all 3 process stages, the residual water content of the oils, which derived from processes A3, was <1% by weight. The oil in storage tank 10 had the following oil indices: phosphorus 0.8 ppm (mg/kg), calcium <0.05 ppm (mg/kg), magnesium <0.05 ppm (mg/kg), iron 0.01 ppm (mg/kg), free fatty acids 0.07% by weight. From the water phases of the respective process stages, which were obtained by sedimentation and phase separation with the separator and were collected in a settling tank, the hydrated mucilages could be separated by filtration after a settling time of 6 hours. The mucilage phases were condensed with a decanter, the resulting mucilage masses had a wet weight of 62 kg in the 1st stage, 86 kg in the 2nd stage and 25 kg in the 3rd stage. No trans-fatty acids or 3-MCPD esters could be detected in the oils Example 8

Investigation on the Separation and Extraction of Mucilage.

For the investigation, 2 kg each of dry matter of an algae culture (AK) and of avocado fruit pulp (AF), each of which was in powdered form, were used. Extraction of lipophilic ingredients has been accomplished by various mixtures consisting of an alcohol (e.g., methanol), a fatty acid methyl ester (e.g., C8 or C16), and either a paraffinic oil or an alkane mixture (e.g., petroleum ether). Batches with 150 g each of the starting materials were added to 200 ml of the extraction mixtures and mixed for 24 h at 40° and 60° C. under exclusion of air. Subsequently, solids were separated by centrifugation. The dark green (AK) or green-brown (AF) strongly turbid extraction mixtures were examined with regard to the suitability of one of the methods according to the invention according to Example 1. The following process arrangements were found to preferable to achieve a particularly product-sparing processes: AK: 1. phosphoric acid, added volume 5-10% by volume; 2. sodium metasilicate (10% by weight), added volume 60-80% by volume; 3. sodium carbonate (10% by weight), added volume 50-70% by volume; 4. repetition of the 3rd process stage; AF: 1. citric acid (30% by weight), added volume 10-20% by volume, 2. 40 wt % sodium bicarbonate (15-25% by weight), added volume 80-120% by volume, 3. sodium metasilicate (10-20% by weight), added volume 40-70 vol %. 4. Arginine (0.2-0.4 mol/l), added volume 15-45 vol %, wherein the volume ratios of the added volume were first determined by a test according to Example 2. The aqueous solutions were admixed with an intensive mixer (Ultrathurrax, 18,000 rpm over 5 minutes); the purification steps were carried out at 25° C. After completion of the spontaneous phase separation in a reparatory funnel, the aqueous phases, together with the dissolved or suspended mucilages contained therein, were removed and the organic phase was freed from solids and water by means of centrifugation (3,800 g, 10 minutes). The water and solid phases were combined with the previously separated water phases. The solids contained in the water phases were separated by centrifugation (3,800 rpm, 10 minutes) and then dried in a vacuum oven. The dry masses were subsequently dissolved in solvent mixtures consisting of an alcohol (for example methanol or isopropyl alcohol) and a non-polar organic solvent (e.g. chloroform) and, if appropriate, another solvent (for example acetonitrile), and separation by column chromatography was carried out. The eluate fractions were analyzed for their composition and purity by thin layer chromatography (TLC) and high pressure liquid chromatography (HPLC). In one approach, the aqueous purification steps were carried out with 4 vol % addition volume, using the same process and reaction conditions.

Results: With the purification method according to the invention, the mucilages which were present in the lipid phases could for the most part be transferred into the water phases by means of a spontaneous phase separation; after centrifugation the lipid phases were practically free of emulsions. The aggregated mucilages were separated by centrifugation from the water phases, whereby the aqueous solutions could be used again for a purification process. The mucilages were dissolved in solvent mixtures after drying and fractionated by means of a chromatographic separation. Analysis of the fractions obtained showed that, among others, the following compounds were present: phospholipids (phosphatidylcholine, phosphoinositol), glucosphingolipids (glucosylceramides, glucocerebrosides), stigmasterol, camesterol, free fatty acids (stearic acid, oleic acid), tocopherol. The purity of the compounds in the individual fractions was between 75 and 96% by weight. In the lipid fractions treated in the comparative experiment with the same cleaning solutions using an addition volume of less than 5% by volume, there were, with the exception of the phosphoric acid purification step, emulsions which did not separate even after 48 h and which persisted after centrifugation in the form of an emulsive aqueous phase and emulsive lipid phase. As a result, the extraction of pure mucilage was not possible.

Example 9

A fatty acid methyl ester mixture (2,000 ml) which resulted from a microbial fermentation of vegetable and animal fats, with a proportion of fatty acid methyl esters of 92.1% by weight and a proportion of phospholipids, glycolipids, glucoglycerolipids, free fatty acids of 5.8% by weight, as well as methanol and water was used for the investigation, for the purpose of purification of the methyl ester fraction and to obtain the contained mucilage. A prexamination study on the suitability of a method according to the invention was carried out according to Example 1. Focusing on the recoverability of low-hydrolysis mucilaginous fractions, and at the same time obtaining a lipid phase with the lowest possible amount of residual mucilage, the following process steps were established: 1. sodium bicarbonate (15% by weight), added volume 45% by volume; 2. Sodium carbonate (20% by weight), addition volume 30% by volume, 3. Sodium metasilicate (10% by weight), addition volume 25% by volume, 4. Arginine (0.3 molar), addition volume 15% by volume. The mixing procedure in the 1st and 2nd stage was carried out with a stirrer, and in the 3rd and 4th stage with an intensive mixer (Ultrathurrax, 18,000 rev/min, 5 minutes). The purification steps were carried out at 25° C. After the mixing procedure, the reaction mixture was poured into a vessel having the shape of a reparatory funnel. After a sedimentation time of 6 hours, the free water phase and 100 ml of the lipid phase of the respective process stages located above this phase were discharged. Subsequently, the lipid phases in the process stages 1 to 3 were fed without further treatment to the subsequent treatment stage. After treatment step 4 and separation of the free water phase, the lipid phase was centrifuged (3,800 g, 10 minutes). The respectively obtained water phases were stored for 24 h at 10° C. Subsequently, these phases of process steps 2 and 3 were passed through a sieve (sieve mesh size 80 μm) and the retained aggregated mucilages subjected to vacuum drying. The free water phase of the 1st treatment step was titrated with HCl to a pH of 5, then an AlCl3 solution was added until complete aggregation of the dissolved mucilages was achieved. To the water phase of the 4th treatment step a CaCl2 solution was added until complete aggregation of the dissolved mucilages. The resulting water phases with aggregated mucilage were centrifuged and then the free water phase separated from the solid phase by decantation. The solid phases were dried as described. The individual dried solid phases were dissolved in solvent mixtures, e.g., isopropyl alcohol/acetone/n-heptane or methanol/water/HCl/chloroform or octanol/ethyl acetate/diethyl ether, suspended and separated from the solvent fractions by column chromatography or thin layer chromatography and eluted with suitable solvents. The purified lipid phases and the mucilage fractions obtained were analyzed by GC, HPLC, and TLC for the content of fatty acid methyl esters, free fatty acids, glycolipids, glyceroglycolipids (e.g., rhamnolipids), glycerosphingolipids, and tocopherol, phytosterols (sitosterol and campesterol), fatty alcohols, and waxes. Furthermore, the water content of the lipid phases was determined after separation of the free water phases. The water phases obtained after separation of the aggregated mucilage were reused for a subsequent similar experiment, as well as the water phases obtained thereafter for a further experiment.

Results: At all stages of the process there was a spontaneous separation of phases, with the formation of mucilage aggregates or highly hydrated mucilage substance phases, which were in the respective free water phases and could be separated therewith. Mucosal aggregates, which were still at the phase boundary or in the lowest layers of the lipid phase, could be completely separated. By re-sedimentation in a suitable vessel, separated lipid phases could be recovered without loss. The lipid phases of stages 1 to 3 obtained by sedimentation contained a water content of less than 1% by weight; in the final lipid phase (according to process stage 4) a water content of 0.1% by weight was present. In the final lipid phase there was a fatty acid methyl ester content of 99.6% by weight; the content of free fatty acids was <0.1% by weight. From the separated mucilage phases it was possible to fractionate glycolipids, glyceroglycolipids, glycerosphingolipids as well as tocopherol, phytosterols, fatty alcohols and waxes. The purity of the individual fractions was between 70 and 92% by weight. Because of the very narrow bands in the DC, an absence of hydrolysis of the glycolipids and glyceroglycolipids can be assumed.

In process stages repeatedly conducted using the recovered aqueous process solutions, a similar spontaneous phase separation, aggregation and separability of mucilage was obtained and the resulting fractions and the fatty acid methyl ester phases exhibited virtually identical purity.

Example 10

Investigation for the Purification of Used Cooking Fats and Recovery of Organic Compounds.

For the investigation, 1 kg each of different used cooking oils that had been obtained from restaurants were examined. The content of neutral fats was between 80 and 92% by weight and the content of free fatty acids ranged between 1.1 and 3.8% by weight. A study on the suitability of a method according to the invention was carried out according to Example 1. The choice was made for a process arrangement that saves as much time as possible and ensures the receipt of a lipid phase with the lowest possible amount of mucilage. For this purpose, the following process stages were defined: 1. Sodium bicarbonate (20% by weight), added volume 55% by volume; 2. sodium metasilicate (20% by weight), added volume 40% by volume; 3. sodium metasilicate (5% by weight)/sodium carbonate (5% by weight), added volume 15% by volume; 4. Arginine (0.2 molar), added volume 10 vol %. The mixing process of the 1st and 2nd stage was carried out with a stirrer, in the 3rd and 4th stage an intensive mixing procedure (Ultrathurrax, 18,000 rev/min, 5 minutes) was performed. The purification stages 1 and 4 were carried out at 25° C. and those of the process stages 2 and 3 at 60° C. After 30 minutes, the free water phase that had formed was separated and the lipid phase was centrifuged (4,000 g, 5 minutes). The lipid phases obtained after centrifugation were subjected to the next process step. The free water phases were also centrifuged and the resulting compacted mucilages separated and pooled with those obtained from the centrifugation of the lipid phases. The mucilage phases were dried in a vacuum oven and then suspended in solvent mixtures such as n-pentane/petroleum ether, octanol/chloroform, hexane/ethanol/water/citric acid. The solvent phases with mucilage dissolved therein were evaporated and the resulting solids were taken up in a suitable solvent and analyzed by GC, HPLC and DC for the determination of free fatty acids, glycolipids, glyceroglycolipids, glycerosphingolipids and tocopherol, phytosterols (sitosterol and campesterol), fatty alcohols. Further, the obtained precipitates were examined for composition and nitrogen content. Furthermore, the purified lipid phases were examined for the content of free fatty acids and alkaline earth metal ions and nitrogen-containing compounds. Results: In all cases a spontaneous separation of phases within the first few minutes was achieved with a multistage process arrangement, which was accompanied by an aggregation and sedimentation of mucilage. By means of centrifugation it was possible to obtain emulsion-poor or emulsion-free lipid phases, in the respective process stages, each having a reduced mucilage content. The final lipid phases had a neutral fat content of >99% by weight, the content of free fatty acids was <0.2% by weight and the content of 2-valent alkaline earth metals was <0.5 mg/kg. The separated mucilage substances could be separated into their substance classes, whereby they were present in a purity grade for the respective substance class (glycolipids, glyceroglycolipids, glycerosphingolipids as well as phytosterols) between 75 and 93 wt %. Furthermore, proteins could be obtained in aggregated form and collagens could be fractionated.

Example 11

Investigation on the Use of Obtained Mucilages

For the study, the mucilage fractions obtained in the study of Example 6 (stages of sodium borate and arginine) and Example 8 (avocado pulp, stages sodium carbonate/bicarbonate levels and arginine) were used. The mucilage agents obtained after sodium borate and sodium carbonate or sodium bicarbonate treatment were dried and sampled for analysis.

The solid mass was suspended in a citrate buffer and mixed therewith for 24 hours to a creamy consistency to reach a pH of 6.5. From this product fraction 1 (PF 1) samples were taken for the determination of hydrophilic/lipophilic balance (HLB), the analysis was carried out with an Asahipak GF-310 HQ multiple solvent GPC column.

The moist mucilage phases resulting from the arginine treatment stage were extracted with pentane (EP 1) and then adjusted to pH 2.5 with HCl. After this, renewed extraction with pentane (EP 2). The heptane phases EP 1 and 2 were freed from the solvent separately and the residual liquid phases were obtained as extraction products (EP) 1 and 2. From this, samples were taken for the analysis of the neutral fat content as well as the quantitative and qualitative fatty acid analysis.

There was a blinded examination (U 1) in 5 people regarding the skin uptake behavior and sensory effects of PF 1 when applied to the skin, compared to 3 commercially available oil-free or low-oil skin care products.

Results: PF 1 contained mainly glycolipids, glyceroglycolipid, glycerosphingolipids and phytosterols (total 92% by weight). The proportion of neutral lipids was 0.8% by weight. The HLB value range of the PF 1 was between 8 and 9. The PF 1 showed a very rapid and residue-free skin uptake behavior in U 1, which was completed in a shorter time than in the comparison products. The skin surfaces were then not greasy, while in non-oil-free comparison products, a fatty film remained. In all persons, the sensory feel after application of the PF 1 in U1 was perceived as more pleasant or stronger (in particular softness/moisture sensation) compared to the perception after application of the comparison products. The skin sensory characteristics were judged to be more pleasant and intense even 2 hours after application of PF 1 compared to application of the comparator formulations.

EP 1 contained 99% by weight trialcylglycerides. The mass ratio between EP 2 and EP 1 was 98.5% by weight. EP 2 contained 97.8% by weight of fatty acids, with a spectrum of different chain lengths typical for the starting materials. Among them were polyunsaturated fatty acids. In EP 1 and 2, no trans-fatty acids or 3-MCPD esters were detectable.

What is claimed is:
1. A method for purification of a lipid phase and/or for separation of mucilages from a lipid phase comprising the following steps:
  a) providing a lipid phase containing mucilages, wherein the lipid phase comprises a water content of <20% and a content of lipophilic substances of in total >70%,
  b) adding and admixing a water phase containing at least one acid- or base-forming compound having a volume ratio of >15% by volume between the volume of the water phase and the total volume of lipid phase and water phase before admixing the water phase,
  b') spontaneous formation of a free water phase with or without acceleration by warming, c) sedimentation-based phase separation obtaining formation of a free water phase containing hydrated mucilages, d1) separation of the free water phase containing the hydrated mucilages, and d2) separation of the low mucilage lipid phase.

2. The method according to claim 1, wherein after step b) a sedimentation-based phase separation under formation of a free water phase containing hydrated mucilages and formation of a mucilage phase takes place in step c').

3. The method according to claim 1, wherein in step c) a sedimentation-based phase separation is accelerated by warming the phases and/or by a coalescence method and/or by a centrifugal method.

4. The method according to claim 1, wherein a step a3) is performed before the step c):

a3) determining the water volume of the selected acidic- or basic solution for step c'), at which, after mixing with the lipid phase to be depleted, a free water phase is formed during a resting phase.

5. The method according to claim 1, wherein >20% by volume of the water phase containing at least one acid- and/or base-forming compound is added and admixed in step b).

6. The method according to claim 1, wherein the admixing of the water phase in step b) is performed by intensive-mixing, until formation of a free water phase is obtained spontaneously after the mixing.

7. The method according to claim 1, wherein after step d2), step d2a) is performed, wherein the lipid phase of method step d2) is clarified by adsorption, complexation and/or filtration agents, to remove residual amounts of mucilages and/or water.

8. The method according to claim 1, wherein after step c), step c1) is performed, wherein a lipid phase of method step c) is clarified by a coalescence and/or a centrifugal method and wherein in step d1) the separation of the mucilage-containing water phase, obtainable from step c1) is performed and wherein in step d2) the separation of the low mucilages lipid phase, obtainable from step c1) is performed.

9. The method according to claim 1, wherein in step c) the hydrated mucilages are transferred into a water phase and after step d1) or step d2) recovered therefrom in a step e) removal of the mucilages from the water phase containing the hydrated mucilages and obtaining the mucilages.

10. The method according to claim 1, wherein in step d1) a mucilage phase low in neutral fat is obtained, wherein a mucilage phase low in neutral fat is present, if the mucilage phase contains <5% by weight neutral fats.

11. The method according to claim 1, wherein in step d2) the residual water content in a clarified lipid phase is <3% by weight.

12. The method according to claim 1, wherein the lipid phases obtainable from step d2) with the residual amounts of mucilage and/or water still present therein are subjected to one or more further purification steps without use of a centrifugal separation method.

13. The method according to claim 1, wherein the acidic or basic aqueous solution obtained in step d1) is used again for carrying out the method.

14. The method according to claim 1 for multi-stage aqueous purification of lipid phases and/or for separation of mucilages from a lipid phase in two or more method stages, wherein the following steps are carried out in the respective process stage:

a) providing a lipid phase containing mucilages, wherein the lipid phase comprises a water content of <20% and a content of lipophilic substances of in total >70%, b) adding and admixing a water phase containing at least one acid- or base-forming compound having a volume ratio of >15% by volume between the volume of the water phase and the total volume of lipid phase and water phase before admixing the water phase, b') spontaneous formation of a free water phase with or without acceleration by warming, c) sedimentation-based phase separation obtaining formation of a free water phase containing hydrated mucilages, d1) separation of the free water phase containing the hydrated mucilages obtained from step c), and d2) separation of the low mucilage lipid phase obtained from step c), wherein the lipid phase of process stage d2) of the previously performed method process performance is used for carrying out the second and further method stages in process step a).

15. The method for obtaining mucilages from a lipid phase, comprising the following steps:

a) providing a lipid phase containing mucilages, wherein the lipid phase comprises a water content of <20% and a content of lipophilic substances of in total >70%, b) adding and admixing a water phase containing at least one acid- or base-forming compound having a volume ratio of >15% by volume between the volume of the water phase and the total volume of lipid phase and water phase before admixing the water phase, b') spontaneous formation of a free water phase with or without acceleration by warming, c) sedimentation-based phase separation obtaining formation of a free water phase containing hydrated mucilages, d1) separation of the free water phase containing the hydrated mucilages, d2) separation of the low mucilage lipid phase, and e) removal of the mucilages from the water phase containing the hydrated mucilages and obtaining the mucilages.

* * * * *